United States Patent
Thompson et al.

(10) Patent No.: US 12,126,194 B2
(45) Date of Patent: *Oct. 22, 2024

(54) ACCESSORIES WITH MAGNETIC ALIGNMENT COMPONENTS

(71) Applicant: Apple Inc., Cupertino, CA (US)

(72) Inventors: Paul J. Thompson, Mountain View, CA (US); Karl Ruben F. Larsson, Los Altos, CA (US); Aaron A. Oro, Palo Alto, CA (US); Timothy J. Rasmussen, San Jose, CA (US); Christopher S. Graham, San Francisco, CA (US); Eric S. Jol, San Jose, CA (US); Demetrios B. Karanikos, San Francisco, CA (US); Miranda L. Daly, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,413

(22) Filed: Jun. 26, 2023

(65) Prior Publication Data

US 2023/0336037 A1    Oct. 19, 2023

Related U.S. Application Data

(63) Continuation of application No. 17/028,275, filed on Sep. 22, 2020, now Pat. No. 11,710,989.
(Continued)

(51) Int. Cl.
*H02J 50/10* (2016.01)
*H02J 7/00* (2006.01)
(Continued)

(52) U.S. Cl.
CPC .......... *H02J 50/90* (2016.02); *H02J 7/00034* (2020.01); *H02J 7/0042* (2013.01); *H02J 7/02* (2013.01);
(Continued)

(58) Field of Classification Search
CPC ....................................... H02J 50/90
(Continued)

(56) References Cited

U.S. PATENT DOCUMENTS 8,073,324 B2    12/2011  Tsai
8,688,037 B2 *   4/2014  Chatterjee ............. G06F 1/1632
                                                  359/214.1
(Continued)

FOREIGN PATENT DOCUMENTS

CN    205670700 U    11/2016
CN    106877429 A     6/2017
(Continued)

OTHER PUBLICATIONS

"Machine Translation of TW M414057 U", Oct. 11, 2011, 6 pages.
(Continued)

*Primary Examiner* — Edward Tso
*Assistant Examiner* — Ahmed H Omar
(74) *Attorney, Agent, or Firm* — Kilpatrick Townsend & Stockton LLP

(57) ABSTRACT

A magnetic alignment system can include a primary annular magnetic alignment component and a secondary annular magnetic alignment component. The primary alignment component can include an inner annular region having a first magnetic orientation, an outer annular region having a second magnetic orientation opposite to the first magnetic orientation, and a non-magnetized central annular region disposed between the primary inner annular region and the primary outer annular region. The secondary alignment
(Continued)

component can have a magnetic orientation with a radial component.

20 Claims, 54 Drawing Sheets

Related U.S. Application Data

(60) Provisional application No. 63/061,752, filed on Aug. 5, 2020, provisional application No. 62/907,332, filed on Sep. 27, 2019.

(51) Int. Cl.
| | |
|---|---|
| *H02J 7/02* | (2016.01) |
| *H02J 50/80* | (2016.01) |
| *H02J 50/90* | (2016.01) |
| *H04B 5/70* | (2024.01) |
| *H04B 5/72* | (2024.01) |
| *H02J 50/50* | (2016.01) |
| *H02J 50/70* | (2016.01) |

(52) U.S. Cl.
CPC .............. *H02J 50/10* (2016.02); *H02J 50/80* (2016.02); *H04B 5/70* (2024.01); *H04B 5/72* (2024.01); *H02J 50/50* (2016.02); *H02J 50/70* (2016.02)

(58) Field of Classification Search
USPC ........................................................ 320/108
See application file for complete search history.

(56) References Cited

U.S. PATENT DOCUMENTS

| | | |
|---|---|---|
| 8,907,752 B2 | 12/2014 | Wodrich et al. |
| 8,988,041 B2 | 3/2015 | Yeh |
| 9,106,083 B2 | 8/2015 | Partovi |
| 9,112,364 B2 | 8/2015 | Partovi |
| 9,413,191 B2 | 8/2016 | Kim et al. |
| 9,627,130 B2 | 4/2017 | Golko et al. |
| 9,941,576 B2 | 4/2018 | Ito et al. |
| 10,044,229 B2 | 8/2018 | Partovi et al. |
| 10,153,666 B2 | 12/2018 | Lee et al. |
| 10,243,402 B2 | 3/2019 | Park et al. |
| 10,273,942 B2 | 4/2019 | Nakamura |
| 10,404,089 B2 | 9/2019 | Kasar et al. |
| 10,491,041 B2 | 11/2019 | Wittenberg et al. |
| 10,622,842 B2 | 4/2020 | Lee et al. |
| 11,342,800 B2 | 5/2022 | Oro et al. |
| 2009/0212637 A1 | 8/2009 | Baarman et al. |
| 2009/0278642 A1 | 11/2009 | Fullerton et al. |
| 2010/0081377 A1 | 4/2010 | Chatterjee et al. |
| 2012/0112553 A1 | 5/2012 | Stoner, Jr. et al. |
| 2012/0146576 A1 | 6/2012 | Partovi |
| 2012/0306440 A1 | 12/2012 | Yeh |
| 2013/0187596 A1 | 7/2013 | Eastlack |
| 2013/0260677 A1* | 10/2013 | Partovi ............... H02J 7/00302 455/41.1 |
| 2016/0094076 A1 | 3/2016 | Kasar et al. |
| 2016/0105047 A1 | 4/2016 | Cui |
| 2016/0128210 A1 | 5/2016 | Lee |
| 2016/0261133 A1 | 9/2016 | Wang |
| 2017/0005399 A1 | 1/2017 | Ito et al. |
| 2017/0070076 A1 | 3/2017 | Karanikos et al. |
| 2017/0149474 A1 | 5/2017 | Kim |
| 2018/0248406 A1 | 8/2018 | Bae et al. |
| 2018/0301936 A1 | 10/2018 | Lee et al. |
| 2019/0089188 A1 | 3/2019 | Chien et al. |
| 2019/0198212 A1 | 6/2019 | Levy |
| 2019/0363565 A1 | 11/2019 | Graham et al. |
| 2020/0346006 A1 | 11/2020 | Eigentler et al. |

FOREIGN PATENT DOCUMENTS

| | | |
|---|---|---|
| CN | 207442540 U | 6/2018 |
| CN | 208581077 U | 3/2019 |
| EP | 0823717 A2 | 2/1998 |
| JP | 2010527226 A | 8/2010 |
| JP | 2013120837 A | 6/2013 |
| JP | 2014128054 A | 7/2014 |
| JP | 3197750 U | 6/2015 |
| JP | 2015171166 A | 9/2015 |
| JP | 2017055645 A | 3/2017 |
| JP | 3213041 U | 10/2017 |
| JP | 6233504 B2 | 11/2017 |
| JP | 2018509128 A | 3/2018 |
| KR | 20170038656 A | 4/2017 |
| KR | 101790891 B1 | 10/2017 |
| TW | 414057 U | 10/2011 |
| TW | 201347349 A | 11/2013 |
| TW | 201711335 A | 3/2017 |
| WO | 2008137996 A1 | 11/2008 |
| WO | 2010129369 A2 | 11/2010 |
| WO | 2011156768 A2 | 12/2011 |
| WO | 2016053633 A1 | 4/2016 |

OTHER PUBLICATIONS

U.S. Appl. No. 17/028,231 , "Final Office Action", Oct. 26, 2022, 22 pages.
U.S. Appl. No. 17/028,231 , "Non-Final Office Action", Apr. 28, 2022, 18 pages.
U.S. Appl. No. 17/028,231 , "Notice of Allowance", Mar. 9, 2023, 9 pages.
U.S. Appl. No. 17/028,256 , "Final Office Action", Oct. 26, 2022, 22 pages.
U.S. Appl. No. 17/028,256 , "Non-Final Office Action", Apr. 28, 2022, 18 pages.
U.S. Appl. No. 17/028,256 , "Notice of Allowance", Mar. 3, 2023, 8 pages.
U.S. Appl. No. 17/028,275 , "Final Office Action", Nov. 25, 2022, 14 pages.
U.S. Appl. No. 17/028,275 , "Non-Final Office Action", May 12, 2022, 13 pages.
U.S. Appl. No. 17/028,275 , "Notice of Allowance", Mar. 10, 2023, 8 pages.
U.S. Appl. No. 17/028,295 , "Notice of Allowance", Jan. 13, 2022, 11 pages.
U.S. Appl. No. 17/028,310 , "Non-Final Office Action", Sep. 30, 2022, 32 pages.
U.S. Appl. No. 17/028,310 , "Notice of Allowance", Apr. 26, 2023, 8 pages.
U.S. Appl. No. 17/028,325 , "Non-Final Office Action", May 12, 2022, 21 pages.
U.S. Appl. No. 17/028,325 , "Non-Final Office Action", Nov. 25, 2022, 22 pages.
U.S. Appl. No. 17/028,325 , "Notice of Allowance", Apr. 13, 2023, 9 pages.
AU2020239723 , "First Examination Report", Aug. 19, 2021, 4 pages.
AU2020239723 , "Notice of Acceptance", Mar. 25, 2022, 3 pages.
AU2022204815 , "First Examination Report", Mar. 30, 2023, 4 pages.
AU2022204833 , "First Examination Report", Mar. 30, 2023, 3 pages.
EP20198834.2 , "Extended European Search Report", Feb. 19, 2021, 8 pages.
EP20198834.2 , "Office Action", Jun. 24, 2022, 5 pages.
IN202014041736 , "First Examination Report", Aug. 11, 2021, 6 pages.
IN202215009381 , "First Examination Report", Jan. 5, 2023, 6 pages.
IN202215009382 , "First Examination Report", Jan. 5, 2023, 6 pages.
JP2020-160758 , "Notice of Allowance", Oct. 21, 2022, 3 pages.
JP2020-160758 , "Office Action", Aug. 30, 2021, 23 pages.

(56) References Cited

OTHER PUBLICATIONS

JP2020-160758, "Office Action", Jun. 10, 2022, 4 pages.
KR10-2020-0124248, "Notice of Decision to Grant", Jun. 16, 2023, 5 pages.
KR10-2020-0124248, "Office Action", Aug. 29, 2022, 13 pages.
PCT/US2020/052004, "International Preliminary Report on Patentability", Apr. 7, 2022, 9 pages.
PCT/US2020/052004, "International Search Report and Written Opinion", Nov. 23, 2020, 15 pages.
PCT/US2020/052045, "International Preliminary Report on Patentability", Apr. 7, 2022, 9 pages.
PCT/US2020/052045, "International Search Report and Written Opinion", Dec. 23, 2020, 15 pages.
TW109133234, "Notice of Decision to Grant", May 1, 2023, 2 pages.
TW109133234, "Ofice Action", Jan. 25, 2022, 2 pages.
TW109133234, "Office Action", Jun. 2, 2021, 9 pages.
TW109133234, "Office Action", Sep. 28, 2022, 19 pages.
"Notice of Acceptance for Patent Application," mailed Sep. 27, 2023 from the Australian Government in Application No. 2022204833. 3 pages.
"Office Action," mailed Dec. 25, 2023 in Japanese Patent Application No. 2022-142221. 8 pages includes English translation.
"Office Action," mailed Dec. 5, 2023 from the Korean Patent Office in Application No. 10-2022-7006849. 21 pages includes English translation.
"Notice of Allowance," mailed Feb. 19, 2024 in Japanese Patent Application No. 2022-184250. 8 pages includes English translation of allowed claims.
"Office Action," mailed Mar. 26, 2024 in European Patent Application No. 20198834.2. 3 pages.
"Notice of Allowance" mailed Jun. 17, 2024 in Japanese Application No. JP2022-142221, 5 pages includes English translation.
"Office Action" mailed On Jun. 26, 2024 in Korean Application No. KR10-2024-0015869, 9 pages includes English translation.

* cited by examiner

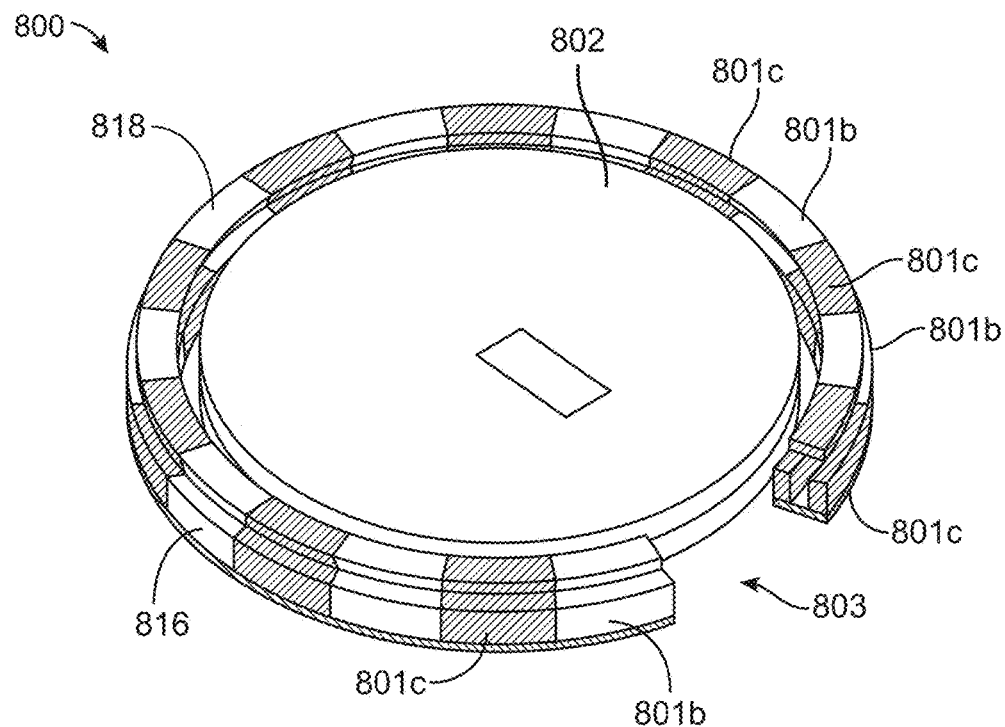
FIG. 8A
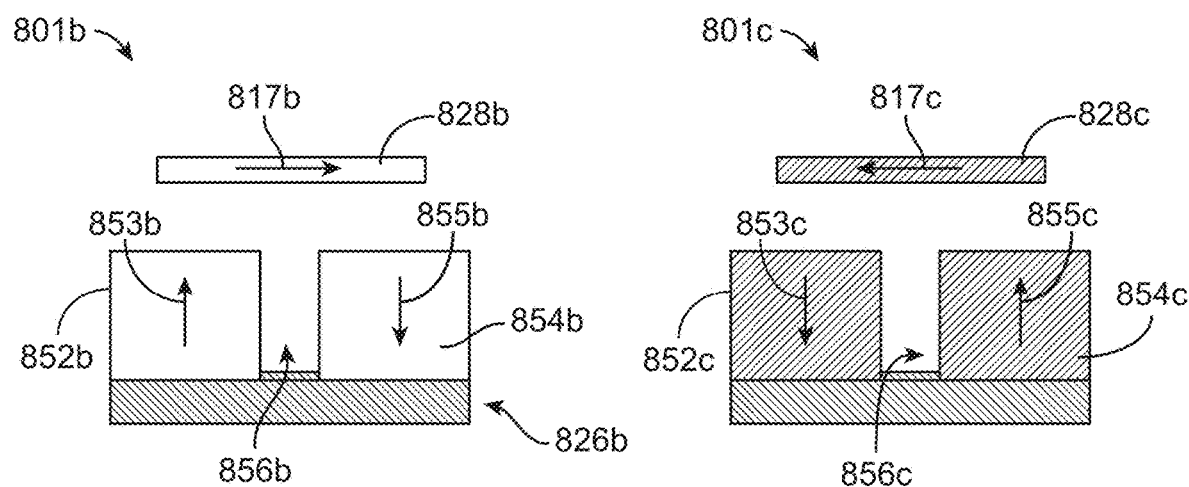
FIG. 8B
FIG. 8C

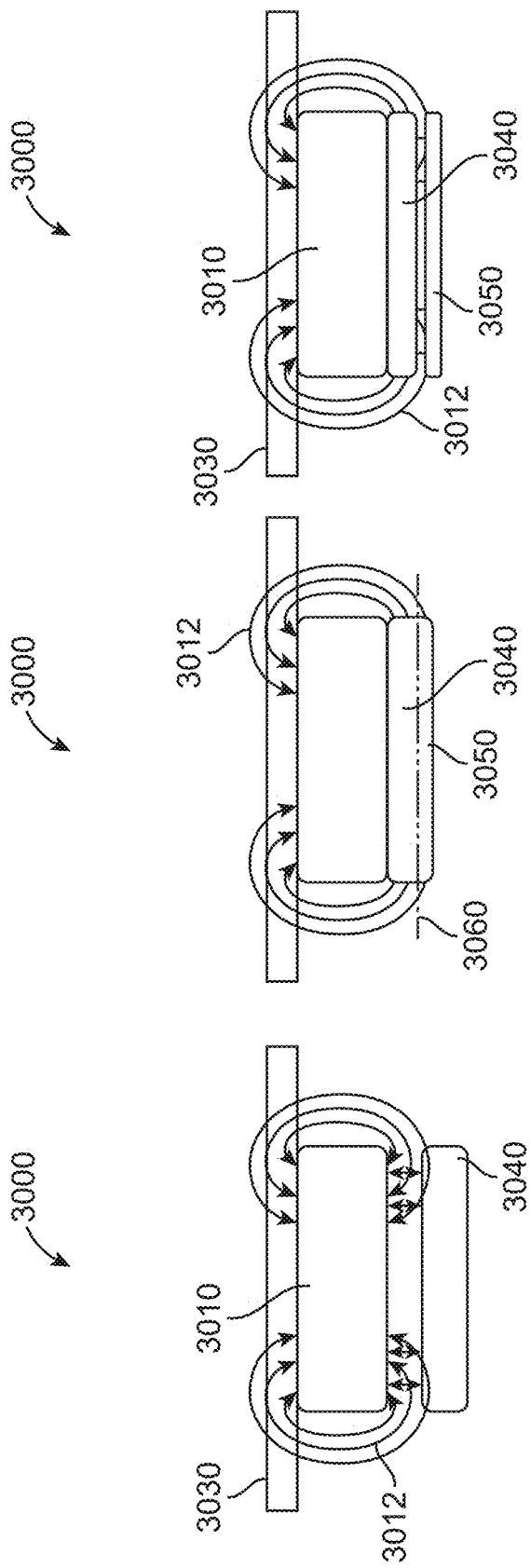

ACCESSORIES WITH MAGNETIC ALIGNMENT COMPONENTS

CROSS-REFERENCE TO RELATED APPLICATIONS

This application is a continuation of U.S. patent application Ser. No. 17/028,275, filed Sep. 22, 2020, which claims the benefit of U.S. Provisional Application No. 62/907,332, filed Sep. 27, 2019, and of U.S. Provisional Application No. 63/061,752, filed Aug. 5, 2020. The disclosures of each of these applications are incorporated by reference herein for all purposes.

The following U.S. patent applications filed on Sep. 22, 2020, also claim the benefit of the above-referenced provisional applications: U.S. patent application Ser. Nos. 17/028,231, 17/028,256, 17/028,295 (now U.S. Pat. No. 11,342,800), Ser. Nos. 17/028,310, and 17/028,325.

BACKGROUND

The present disclosure relates generally to consumer electronic devices and more particularly to magnetic alignment components and systems that facilitate establishing and maintaining a desired alignment between two (or more) devices, e.g., for purposes of enabling efficient wireless power transfer between the devices.

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector includes a cavity in the portable electronic device that provides an avenue via which dust and moisture can intrude and damage the device. Further, a user of the portable electronic device has to physically connect the charging cable to the receptacle connector in order to charge the battery.

To avoid such shortcomings, wireless charging technologies have been developed that exploit electromagnetic induction to charge portable electronic devices without the need for a charging cord. For example, some portable electronic devices can be recharged by merely resting the device on a charging surface of a wireless charger device. A transmitter coil disposed below the charging surface is driven with an alternating current that produces a time-varying magnetic flux that induces a current in a corresponding receiver coil in the portable electronic device. The induced current can be used by the portable electronic device to charge its internal battery. Some portable electronic devices have been designed to not only receive power wirelessly but also to transmit power wirelessly to other portable electronic devices, such as accessory devices.

SUMMARY

Among other factors, the efficiency of wireless power transfer depends on the alignment between the transmitter and receiver coils. For instance, a transmitter coil and receiver coil may perform best when they are aligned coaxially. Where a portable electronic device has a flat surface with no guiding features, finding the proper alignment can be difficult. Often, alignment is achieved by trial and error, with the user shifting the relative positions of the device and charger and observing the effect on charging performance. Establishing optimal alignment in this manner can be time-consuming. Further, the absence of surface features can make it difficult to maintain optimal alignment. For example, if the portable electronic device and/or charger are jostled during charging, they may be shifted out of alignment. For these and other reasons, improved techniques for establishing and maintaining alignment between electronic devices would be desirable.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory.

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. It should be understood that any device that has an annular alignment component might or might not also have a rotational alignment component, and rotational alignment components may be categorized as primary, secondary, or auxiliary depending on the type of device.

In some embodiments, magnetic alignment components can be fixed in position within a device housing. Alternatively, any or all of the magnetic alignment components in a device (including annular and/or rotational alignment components) can be made movable in the axial and/or lateral direction. A movable magnetic alignment component can allow the magnets to be moved (e.g., axially) into closer proximity to increase magnetic forces holding the devices in alignment or moved away from each other to reduce the magnetic forces holding the devices in alignment.

The following detailed description, together with the accompanying drawings, will provide a better understanding of the nature and advantages of the present invention.

BRIEF DESCRIPTION OF THE DRAWINGS

FIG. 8A shows a perspective view of a magnetic alignment system according to some embodiments, and FIGS. 8B and 8C show axial cross-section views through different portions of the system of FIG. 8A.

FIGS. 30A-30C illustrate moving magnets according to an embodiment of the present invention.

DETAILED DESCRIPTION

Figure 1:
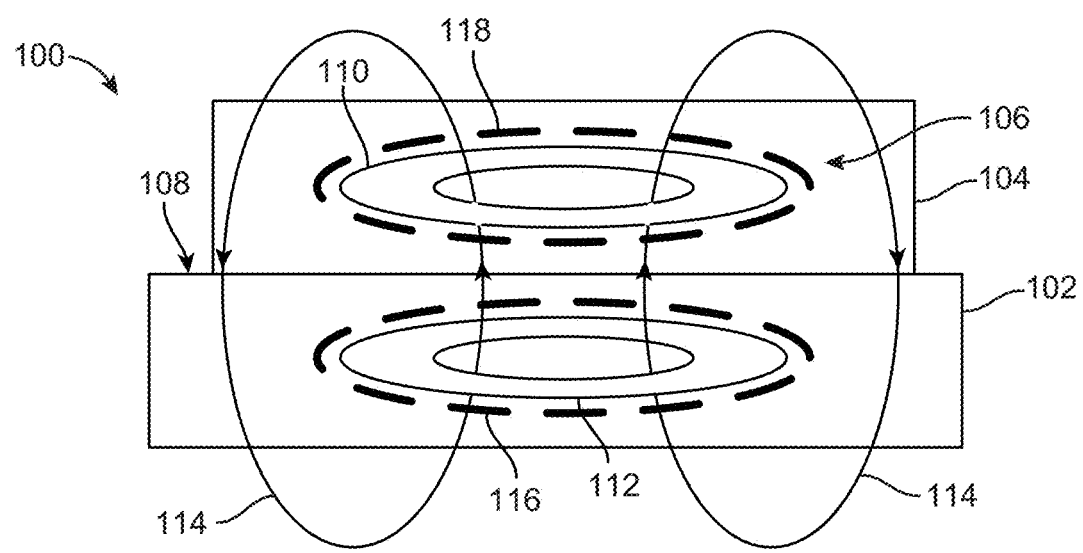
FIG. 1 shows a simplified representation of a wireless charging system incorporating a magnetic alignment system according to some embodiments.

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system may be said to be "attached" to each other.)

For purposes of the present description, a number of different categories of devices can be distinguished. As used herein, a "portable electronic device" refers generally to any electronic device that is portable and that consumes power and provides at least some interaction with the user. Examples of portable electronic devices include: smart phones and other mobile phones; tablet computers; laptop computers; wearable devices (e.g., smart watches, headphones, earbuds); and any other electronic device that a user may carry or wear. Other portable electronic devices can include robotic devices, remote-controlled devices, personal-care appliances, and so on.

An "accessory device" (or "accessory") refers generally to a device that is useful in connection with a portable electronic device to enhance the functionality and/or esthetics of the portable electronic device. Many categories of accessories may incorporate magnetic alignment. For example, one category of accessories includes wireless charger accessories. As used herein, a "wireless charger accessory" (or "wireless charger device" or just "wireless charger") is an accessory that can provide power to a portable electronic device using wireless power transfer techniques. A "battery pack" (or "external battery") is a type of wireless charger accessory that incorporates a battery to store charge that can be transferred to the portable electronic device. In some embodiments, a battery pack may also receive power wirelessly from another wireless charger accessory. Wireless charger accessories may also be referred to as "active" accessories, in reference to their ability to provide and/or receive power. Other accessories are "passive accessories" that do not provide or receive power. For example, some passive accessories are "cases" that can cover one or more surfaces of the portable electronic device to provide protection (e.g., against damage caused by impact of the portable electronic device with other objects), esthetic enhancements (e.g., decorative colors or the like), and/or functional enhancements (e.g., cases that incorporate storage pockets, batteries, card readers, or sensors of various types). Cases can have a variety of form factors. For example, a "tray" can refer to a case that has a rear panel covering the back surface of the portable electronic device and side surfaces to secure the portable electronic device in the tray while leaving the front surface (which may include a display) exposed. A "sleeve" can refer to a case that has front and back panels with an open end (or "throat") into which a portable electronic device can be inserted so that the front and back surfaces of the device are covered; in some instances, the front panel of a sleeve can include a window through which a portion (or all) of a display of the portable electronic device is visible. A "folio" can refer to a case that has a retention portion that covers at least the back surface (and sometimes also one or more side surfaces) of the portable electronic device and a cover that can be closed to cover the display or opened to expose the display. It should be understood that not all cases are passive accessories. For example, a "battery case" can incorporate a battery pack in addition to protective and/or esthetic features; a battery case can be shaped generally as a tray, sleeve, or folio. Other examples of active cases can include cases that incorporate card readers, sensors, batteries, or other electronic components that enhance functionality of a portable electronic device.

In the present description, a distinction is sometimes made between a "charge-through accessory," which is an accessory that can be positioned between a portable electronic device and a wireless charger device without interfering with wireless power transfer between the wireless charger device and the portable electronic device, and a "terminal accessory," which is an accessory that is not a charge-through accessory. A wireless charging accessory is typically a terminal accessory, but not all terminal accessories provide wireless charging of a portable electronic device. For example some terminal accessories can be "mounting" accessories that are designed to hold the portable electronic device in a particular position. Examples of mounting include tripods, docking stations, other stands, or mounts that can hold a portable electronic device in a desired position and/or orientation (which might or might not be adjustable). Such accessories might or might not incorporate wireless charging capability.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. (It will be apparent that an annular magnetic alignment component can also be used in a device that does not have an inductive charging coil.) In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory. (In this disclosure, adjectives such as "annular," "magnetic," "primary," "secondary" and "auxiliary" may be omitted when the context is clear.) The primary and secondary annular alignment components have magnetic orientations that are complementary, such that the primary and secondary annular alignment components can attract each other and attach devices containing these components in a desired alignment. For example, a primary annular alignment component can have a "quad-pole" magnetic configuration, with an inner annular region having a magnetic polarity in a first axial direction, an outer annular region having a magnetic polarity in a second axial direction opposite the first direction, and a central non-magnetized region between the inner annular region and the outer annular region. A secondary annular alignment component can have a radial magnetic configuration (e.g., with north pole oriented radially inward or radially outward, either exactly or approximately; examples are described below). When aligned, the primary and secondary annular alignment components can form a closed magnetic loop such that the DC magnetic flux is largely contained within the magnets. Alternatively, a secondary annular alignment component can also have a quad-pole magnetic configuration matching that of the primary annular alignment component. An auxiliary annular alignment component can operate as a "repeater" and can have a quad-pole configuration matching that of the primary annular alignment component.

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. The magnet(s) of a rotational alignment component can have complementary orientations, such the rotational alignment components in two devices can attract each other and attach the two devices containing these components in a desired rotational orientation. For example, a rotational alignment component can have a quad-pole configuration with a first magnetized region (e.g., extending along one side of a rectangular magnet) having a magnetic polarity in a first axial direction, a second magnetized region (e.g., extending along the opposite side of the rectangular magnet) having a magnetic polarity in a second axial direction opposite the first direction, and a central non-magnetized region. As another example, a rotational alignment component can have a triple-pole configuration with a first magnetized region (e.g., extending along one side of a rectangular magnet) having a magnetic polarity in a first axial direction, a second magnetized region (e.g., extending along the opposite side of the rectangular magnet) also having a magnetic polarity the first axial direction, a central magnetized region having a magnetic polarity in a second axial direction opposite the first direction, and non-magnetized regions between the central magnetized region and each of the first and second magnetized regions. Other magnetic configurations can be substituted. It should be understood that any device that has an annular magnetic alignment component might or might not also have a rotational magnetic alignment component, and rotational alignment components may be categorized as primary, secondary, or auxiliary, e.g., depending on the type of device.

In some embodiments, magnetic alignment components can be fixed in position within a device housing. Alternatively, any or all of the magnetic alignment components in a device (including annular and/or rotational alignment components) can be made movable in the axial and/or lateral direction. A movable magnetic alignment component can allow the magnets to be moved (e.g., axially) into closer proximity to increase magnetic forces holding the devices in alignment or moved away from each other to reduce the magnetic forces holding the devices in alignment.

Accordingly, while the following description focuses on specific examples incorporating various combinations of components, it should be understood that any device can have has an annular magnetic alignment component, which can be, for example, any of the primary, secondary, or auxiliary annular magnetic alignment components described herein. Further, any device that has an annular magnetic alignment component can also have a rotational magnetic alignment component, which can be, for example, any of the rotational magnetic alignment components described herein.

1. Primary and Secondary Annular Magnetic Alignment Components

1.1. Overview of Magnetic Alignment Systems

FIG. 1 shows a simplified representation of a wireless charging system 100 incorporating a magnetic alignment system 106 according to some embodiments. A portable electronic device 104 is positioned on a charging surface 108 of a wireless charger device 102. Portable electronic device 104 can be a consumer electronic device, such as a smart phone, tablet, wearable device, or the like, or any other electronic device for which wireless charging is desired. Wireless charger device 102 can be any device that is configured to generate time-varying magnetic flux to induce a current in a suitably configured receiving device. For instance, wireless charger device 102 can be a wireless charging mat, puck, docking station, or the like. Wireless charger device 102 can include or have access to a power source such as battery power or standard AC power.

To enable wireless power transfer, portable electronic device 104 and wireless charger device 102 can include inductive coils 110 and 112, respectively, which can operate to transfer power between them. For example, inductive coil 112 can be a transmitter coil that generates a time-varying magnetic flux 114, and inductive coil 110 can be a receiver coil in which an electric current is induced in response to time-varying magnetic flux 114. The received electric current can be used to charge a battery of portable electronic device 104, to provide operating power to a component of portable electronic device 104, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 112 and 110. According to some embodiments, magnetic alignment system 106 can provide such alignment. In the example shown in FIG. 1, magnetic alignment system 106 includes a primary magnetic alignment component 116 disposed within or on a surface of wireless charger device 102 and a secondary magnetic alignment component 118 disposed within or on a surface of portable electronic device 102. Primary and secondary alignment components 116 and 118 are configured to magnetically attract one another into an aligned position in which inductive coils 110 and 112 are aligned with one another to provide efficient wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

1.2. Magnetic Alignment Systems with a Single Axial Magnetic Orientation

Figure 2A:
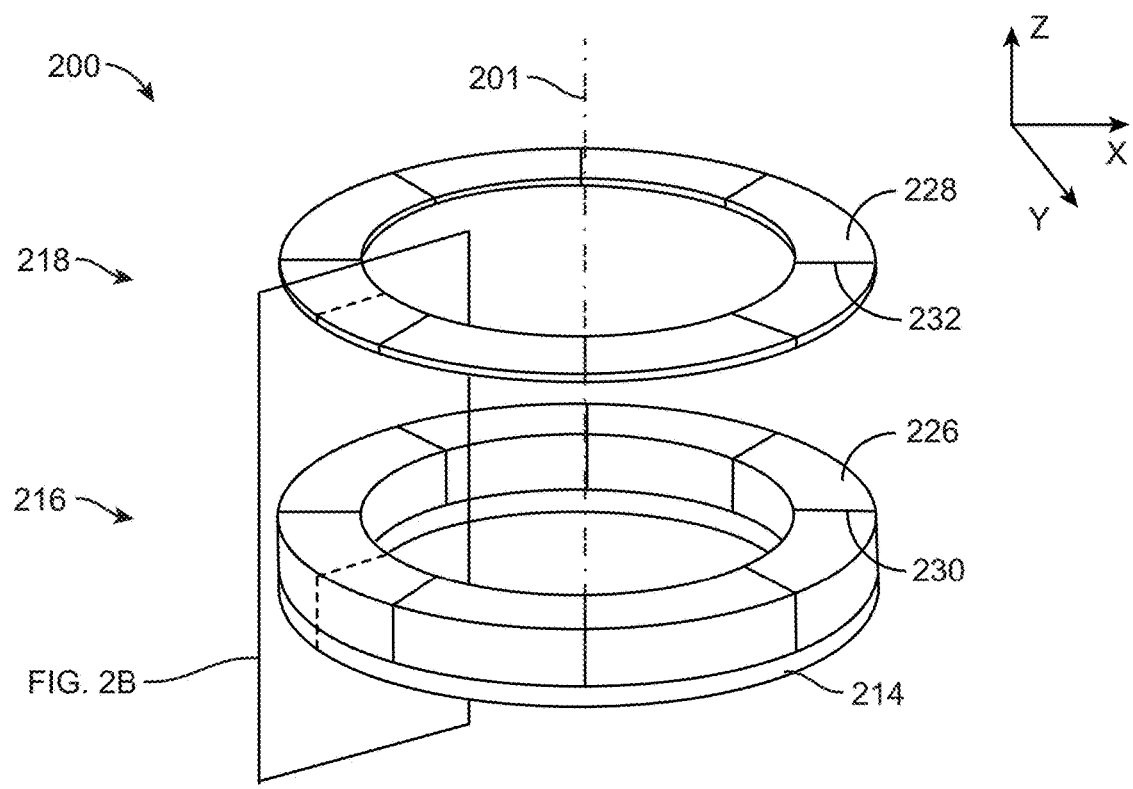
FIG. 2A shows a perspective view of a magnetic alignment system according to some embodiments.
Figure 2B:
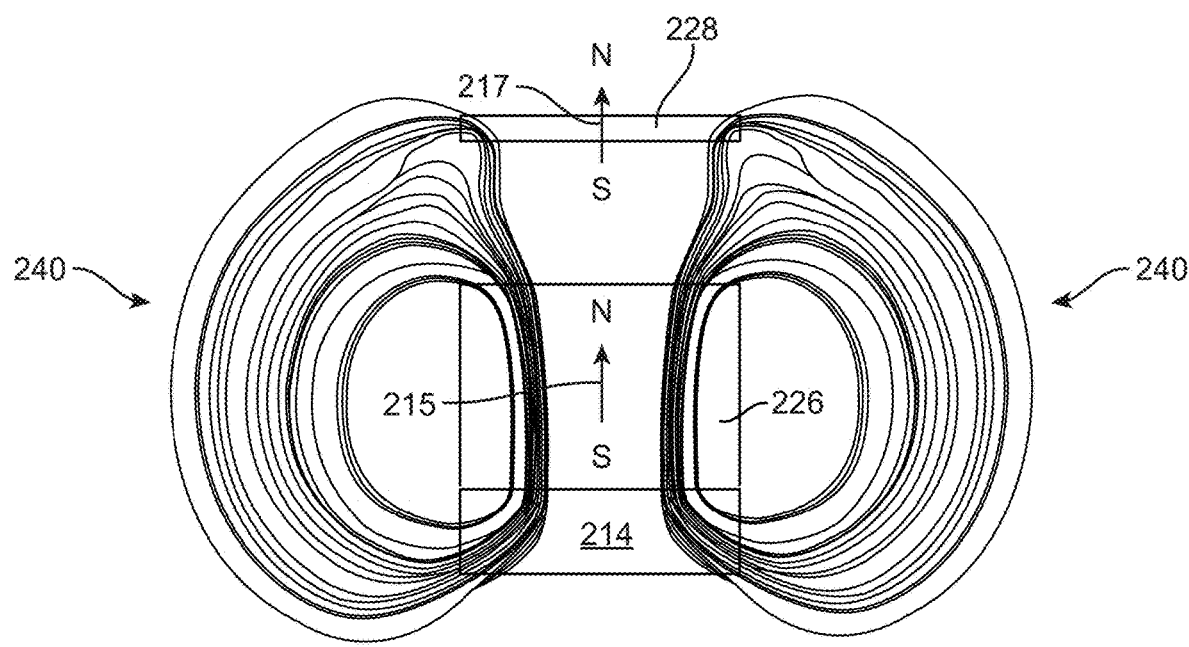
FIG. 2B shows a cross-section through the magnetic alignment system of FIG. 2A.

FIG. 2A shows a perspective view of a magnetic alignment system 200 according to some embodiments, and FIG. 2B shows a cross-section through magnetic alignment system 200 across the cut plane indicated in FIG. 2A. Magnetic alignment system 200 can be an implementation of magnetic alignment system 106 of FIG. 1. In magnetic alignment system 200, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 201 of magnetic alignment system 200, and a transverse plane (also referred to as a "lateral" or "x" or "y" direction) is defined to be normal to axis 201. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (The terms "top" and "bottom" may be used in reference to a particular view shown in a drawing but have no other significance.)

As shown in FIG. 2A, magnetic alignment system 200 can include a primary alignment component 216 (which can be an implementation of primary alignment component 116 of FIG. 1) and a secondary alignment component 218 (which can be an implementation of secondary alignment component 118 of FIG. 1). Primary alignment component 216 and secondary alignment component 218 have annular shapes and may also be referred to as "annular" alignment components. The particular dimensions can be chosen as desired. In some embodiments, primary alignment component 216 and secondary alignment component 218 can each have an outer diameter of about 54 mm and a radial width of about 4 mm. The outer diameters and radial widths of primary alignment component 216 and secondary alignment component 218 need not be exactly equal. For instance, the radial width of secondary alignment component 218 can be slightly less than the radial width of primary alignment component 216 and/or the outer diameter of secondary alignment component 218 can also be slightly less than the radial width of primary alignment component 216 so that, when in alignment, the inner and outer sides of primary alignment component 216 extend beyond the corresponding inner and outer sides of secondary alignment component 218. Thicknesses (or axial dimensions) of primary alignment component 216 and secondary alignment component 218 can also be chosen as desired. In some embodiments, primary alignment component 216 has a thickness of about 1.5 mm while secondary alignment component 218 has a thickness of about 0.37 mm.

Primary alignment component 216 can include a number of sectors, each of which can be formed of one or more primary arcuate magnets 226, and secondary alignment component 218 can include a number of sectors, each of which can be formed of one or more secondary arcuate magnets 228. In the example shown, the number of primary magnets 226 is equal to the number of secondary magnets 228, and each sector includes exactly one magnet, but this is not required. Primary magnets 226 and secondary magnets 228 can have arcuate (or curved) shapes in the transverse plane such that when primary magnets 226 (or secondary magnets 228) are positioned adjacent to one another end-to-end, primary magnets 226 (or secondary magnets 228) form an annular structure as shown. In some embodiments, primary magnets 226 can be in contact with each other at interfaces 230, and secondary magnets 228 can be in contact with each other at interfaces 232. Alternatively, small gaps or spaces may separate adjacent primary magnets 226 or secondary magnets 228, providing a greater degree of tolerance during manufacturing.

In some embodiments, primary alignment component 216 can also include an annular shield 214 (also referred to as a DC magnetic shield or DC shield) disposed on a distal surface of primary magnets 226. In some embodiments, shield 214 can be formed as a single annular piece of material and adhered to primary magnets 226 to secure primary magnets 226 into position. Shield 214 can be formed of a material that has high magnetic permeability, such as stainless steel, and can redirect magnetic fields to prevent them from propagating beyond the distal side of primary alignment component 216, thereby protecting sensitive electronic components located beyond the distal side of primary alignment component 216 from magnetic interference.

Primary magnets 226 and secondary magnets 228 (and all other magnets described herein) can be made of a magnetic material such as an NdFeB material, other rare earth magnetic materials, or other materials that can be magnetized to create a persistent magnetic field. In some embodiments, the magnets can be plated with a thin layer (e.g., 7-13 μm) of NiCuNi or similar materials. Each primary magnet 226 and each secondary magnet 228 can have a monolithic structure having a single magnetic region with a magnetic polarity aligned in the axial direction as shown by magnetic polarity indicators 215, 217 in FIG. 2B. For example, each primary magnet 226 and each secondary magnet 228 can be a bar magnet that has been ground and shaped into an arcuate structure having an axial magnetic orientation. (As will be apparent, the term "magnetic orientation" refers to the direction of orientation of the magnetic polarity of a magnet or magnetized region.) In the example shown, primary magnet 226 has its north pole oriented toward the proximal surface and south pole oriented toward the distal surface while secondary magnet 228 has its south pole oriented toward the proximal surface and north pole oriented toward the distal surface. In other embodiments, the magnetic orientations can be reversed such that primary magnet 226 has its south pole oriented toward the proximal surface and north pole oriented toward the distal surface while secondary magnet 228 has its north pole oriented toward the proximal surface and south pole oriented toward the distal surface.

As shown in FIG. 2B, the axial magnetic orientation of primary magnet 226 and secondary magnet 228 can generate magnetic fields 240 that exert an attractive force between primary magnet 226 and secondary magnet 228, thereby facilitating alignment between respective electronic devices in which primary alignment component 216 and secondary alignment component 218 are disposed (e.g., as shown in FIG. 1). While shield 214 can redirect some of magnetic fields 240 away from regions below primary magnet 226, magnetic fields 240 may still propagate to regions laterally adjacent to primary magnet 226 and secondary magnet 228. In some embodiments, the lateral propagation of magnetic fields 240 may result in magnetic field leakage to other magnetically sensitive components. For instance, if an inductive coil having a ferromagnetic shield is placed in the interior (or inboard) region of annular primary alignment component 216 (or secondary alignment component 218), leakage of magnetic fields 240 may saturate the ferrimagnetic shield, which can degrade wireless charging performance.

It will be appreciated that magnetic alignment system 200 is illustrative and that variations and modifications are possible. For instance, while primary alignment component 216 and secondary alignment component 218 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 216 and/or secondary alignment component 218 can each be formed of a single, monolithic annular magnet; however, segmenting magnetic alignment components 216 and 218 into arcuate magnets may improve manufacturing because (for some types of magnetic material) smaller arcuate segments may be less brittle than a single, monolithic annular magnet and less prone to yield loss due to physical stresses imposed on the magnetic material during manufacturing.

1.3. Magnetic Alignment Systems with Closed-Loop Configurations

As noted above with reference to FIG. 2B, a magnetic alignment system with a single axial magnetic orientation may allow lateral leakage of magnetic fields, which may adversely affect performance of other components of an electronic device. Accordingly, some embodiments provide magnetic alignment systems with a "closed-loop" configuration that reduces magnetic field leakage. Examples will now be described.

Figure 3A:
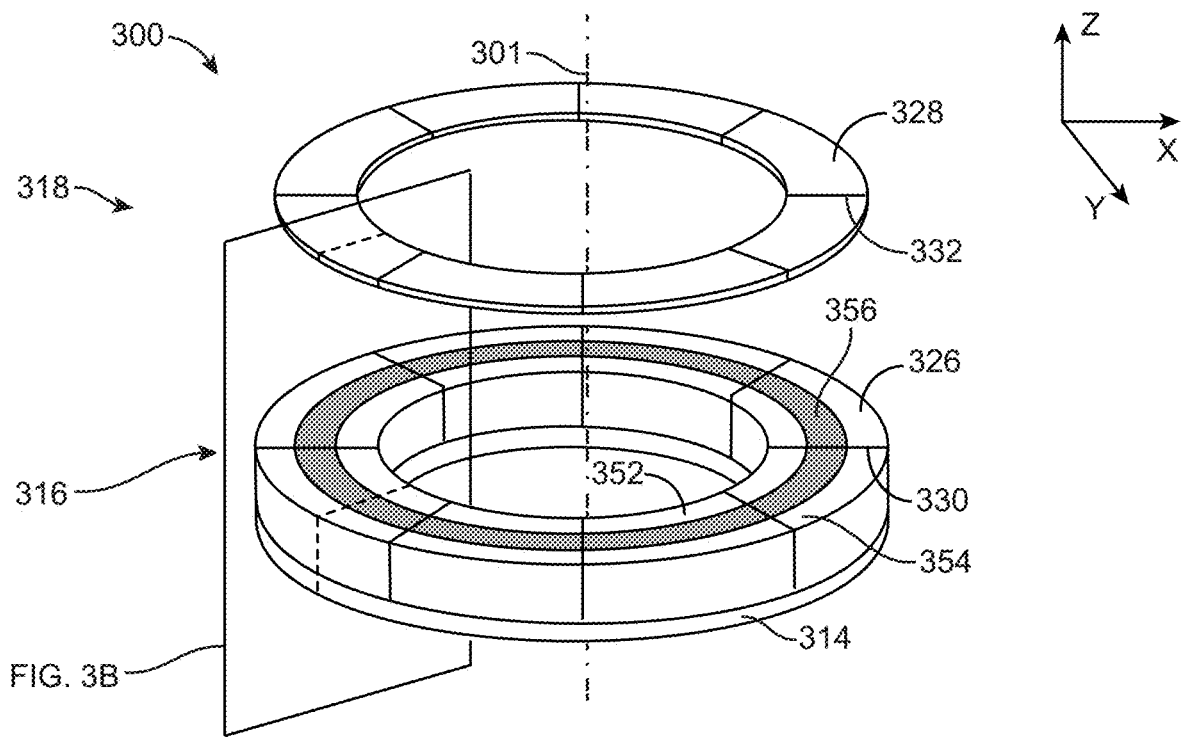
FIG. 3A shows a perspective view of a magnetic alignment system according to some embodiments.
Figure 3B:
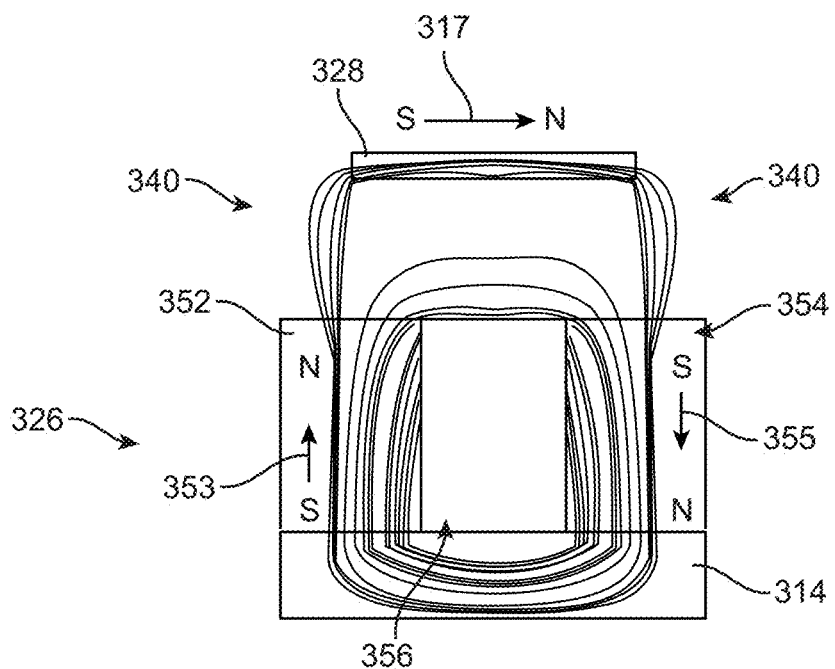
FIG. 3B shows a cross-section through the magnetic alignment system of FIG. 3A.

FIG. 3A shows a perspective view of a magnetic alignment system 300 according to some embodiments, and FIG. 3B shows a cross-section through magnetic alignment system 300 across the cut plane indicated in FIG. 3A. Magnetic alignment system 300 can be an implementation of magnetic alignment system 106 of FIG. 1. In magnetic alignment system 300, the alignment components have magnetic components configured in a "closed loop" configuration as described below.

As shown in FIG. 3A, magnetic alignment system 300 can include a primary alignment component 316 (which can be an implementation of primary alignment component 116 of FIG. 1) and a secondary alignment component 318 (which can be an implementation of secondary alignment component 118 of FIG. 1). Primary alignment component 316 and secondary alignment component 318 have annular shapes and may also be referred to as "annular" alignment components. The particular dimensions can be chosen as desired. In some embodiments, primary alignment component 316 and secondary alignment component 318 can each have an outer diameter of about 54 mm and a radial width of about 4 mm. The outer diameters and radial widths of primary alignment component 316 and secondary alignment component 318 need not be exactly equal. For instance, the radial width of secondary alignment component 318 can be slightly less than the radial width of primary alignment component 316 and/or the outer diameter of secondary alignment component 318 can also be slightly less than the radial width of primary alignment component 316 so that, when in alignment, the inner and outer sides of primary alignment component 316 extend beyond the corresponding inner and outer sides of secondary alignment component 318. Thicknesses (or axial dimensions) of primary alignment component 316 and secondary alignment component 318 can also be chosen as desired. In some embodiments, primary alignment component 316 has a thickness of about 1.5 mm while secondary alignment component 318 has a thickness of about 0.37 mm. (All numerical values herein are examples and may be varied as desired.)

Primary alignment component 316 can include a number of sectors, each of which can be formed of a number of primary magnets 326, and secondary alignment component 318 can include a number of sectors, each of which can be formed of a number of secondary magnets 328. In the example shown, the number of primary magnets 326 is equal to the number of secondary magnets 328, and each sector includes exactly one magnet, but this is not required; for example, as described below a sector may include multiple magnets. Primary magnets 326 and secondary magnets 328 can have arcuate (or curved) shapes in the transverse plane such that when primary magnets 326 (or secondary magnets 328) are positioned adjacent to one another end-to-end, primary magnets 326 (or secondary magnets 328) form an annular structure as shown. In some embodiments, primary magnets 326 can be in contact with each other at interfaces 330, and secondary magnets 328 can be in contact with each other at interfaces 332. Alternatively, small gaps or spaces may separate adjacent primary magnets 326 or secondary magnets 328, providing a greater degree of tolerance during manufacturing.

In some embodiments, primary alignment component 316 can also include an annular shield 314 (also referred to as a DC magnetic shield or DC shield) disposed on a distal surface of primary magnets 326. In some embodiments, shield 314 can be formed as a single annular piece of material and adhered to primary magnets 326 to secure primary magnets 326 into position. Shield 314 can be formed of a material that has high magnetic permeability and/or high magnetic saturation value, such as stainless steel or low-carbon steel, and can redirect magnetic fields to prevent them from propagating beyond the distal side of primary alignment component 316, thereby protecting sensitive electronic components located beyond the distal side of primary alignment component 316 from magnetic interference.

Primary magnets 326 and secondary magnets 328 can be made of a magnetic material such as an NdFeB material, other rare earth magnetic materials, or other materials that can be magnetized to create a persistent magnetic field. Each secondary magnet 328 can have a single magnetic region with a magnetic polarity having a component in the radial direction in the transverse plane (as shown by magnetic polarity indicator 317 in FIG. 3B). As described below, the magnetic orientation can be in a radial direction with respect to axis 301 or another direction having a radial component in the transverse plane. Each primary magnet 326 can include two magnetic regions having opposite magnetic orientations. For example, each primary magnet 326 can include an inner arcuate magnetic region 352 having a magnetic orientation in a first axial direction (as shown by polarity indicator 353 in FIG. 3B), an outer arcuate magnetic region 354 having a magnetic orientation in a second axial direction opposite the first direction (as shown by polarity indicator 355 in FIG. 3B), and a central non-magnetized region 356 that does not have a magnetic orientation. Central non-magnetized region 356 can magnetically separate inner arcuate region 352 from outer arcuate region 354 by inhibiting magnetic fields from directly crossing through central region 356. Magnets having regions of opposite magnetic orientation separated by a non-magnetized region are sometimes referred to herein as having a "quad-pole" configuration.

In some embodiments, each secondary magnet 328 can be made of a magnetic material that has been ground and shaped into an arcuate structure, and a magnetic orientation having a radial component in the transverse plane can be created, e.g., using a magnetizer. Similarly, each primary magnet 326 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 326 can be a compound structure with two arcuate pieces of magnetic material providing inner arcuate magnetic region 352 and outer arcuate magnetic region 354; in such embodiments, central non-magnetized region 356 can be formed of an arcuate piece of nonmagnetic (or demagnetized) material or formed as an air gap defined by sidewalls of inner arcuate magnetic region 352 and outer arcuate magnetic region 354. DC shield 314 can be formed of a material that has high magnetic permeability and/or high magnetic saturation value, such as stainless steel or low-carbon steel, and can be plated, e.g., with 5-10 μm of matte Ni. Alternatively, DC shield 314 can be formed of a magnetic material having a radial magnetic orientation (in the opposite direction of secondary magnets 328). In some embodiments, DC shield 314 can be omitted entirely.

As shown in FIG. 3B, the magnetic polarity of secondary magnet 328 (shown by indicator 317) can be oriented such that when primary alignment component 316 and secondary alignment component 318 are aligned, the south pole of secondary magnet 328 is oriented toward the north pole of inner arcuate magnetic region 352 (shown by indicator 353) while the north pole of secondary magnet 328 is oriented toward the south pole of outer arcuate magnetic region 354 (shown by indicator 355). Accordingly, the respective magnetic orientations of inner arcuate magnetic region 352, secondary magnet 328 and outer arcuate magnetic region 356 can generate magnetic fields 340 that exert an attractive force between primary magnet 326 and secondary magnet 328, thereby facilitating alignment between respective electronic devices in which primary alignment component 316 and secondary alignment component 318 are disposed (e.g., as shown in FIG. 1). Shield 314 can redirect some of magnetic fields 340 away from regions below primary magnet 326. Further, the "closed-loop" magnetic field 340 formed around central non-magnetized region 356 can have tight and compact field lines that do not stray outside of primary and secondary magnets 326 and 328 as far as magnetic field 240 strays outside of primary and secondary magnets 226 and 228 in FIG. 2B. Thus, magnetically sensitive components can be placed relatively close to primary alignment component 316 with reduced concern for stray magnetic fields. Accordingly, as compared to magnetic alignment system 200, magnetic alignment system 300 can help to reduce the overall size of a device in which primary alignment component 316 is positioned and can also help reduce noise created by magnetic field 340 in adjacent components or devices, such as an inductive receiver coil positioned inboard of secondary alignment component 318.

While each primary magnet 326 includes two regions of opposite magnetic orientation, it should be understood that the two regions can but need not provide equal magnetic field strength. For example, outer arcuate magnetized region 354 can be more strongly polarized than inner arcuate magnetized region 352. Depending on the particular implementation of primary magnets 326, various techniques can be used to create asymmetric polarization strength. For example, inner arcuate region 352 and outer arcuate region 354 can have different radial widths; increasing radial width of a magnetic region increases the field strength of that region due to increased volume of magnetic material. Where inner arcuate region 352 and outer arcuate region 354 are discrete magnets, magnets having different magnetic strength can be used.

In some embodiments, having an asymmetric polarization where outer arcuate region 354 is more strongly polarized than inner arcuate region 352 can create a flux "sinking" effect toward the outer pole. This effect can be desirable in various situations. For example, when primary magnet 326 is disposed within a wireless charger device and the wireless charger device is used to charge a "legacy" portable electronic device that has an inductive receiver coil but does not have a secondary (or any) annular magnetic alignment component, the (DC) magnetic flux from the primary annular alignment component may enter a ferrite shield around the inductive receiver coil. The DC magnetic flux can contribute to saturating the ferrite shield and reducing charging performance. Providing a primary annular alignment component with a stronger field at the outer arcuate region than the inner arcuate region can help to draw DC magnetic flux away from the ferrite shield, which can improve charging performance when a wireless charger device having an annular magnetic alignment component is used to charge a portable electronic device that lacks an annular magnetic alignment component.

It will be appreciated that magnetic alignment system 300 is illustrative and that variations and modifications are possible. For instance, while primary alignment component 316 and secondary alignment component 318 are each shown as being constructed of eight arcuate magnets, other embodiments may use a different number of magnets, such as 16 magnets, 18 magnets, 32 magnets, 36 magnets, or any other number of magnets, and the number of primary magnets need not be equal to the number of secondary magnets. In other embodiments, secondary alignment component 318 can be formed of a single, monolithic annular magnet. Similarly, primary alignment component 316 can be formed of a single, monolithic annular piece of magnetic material with an appropriate magnetization pattern as described above, or primary alignment component 316 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 4:
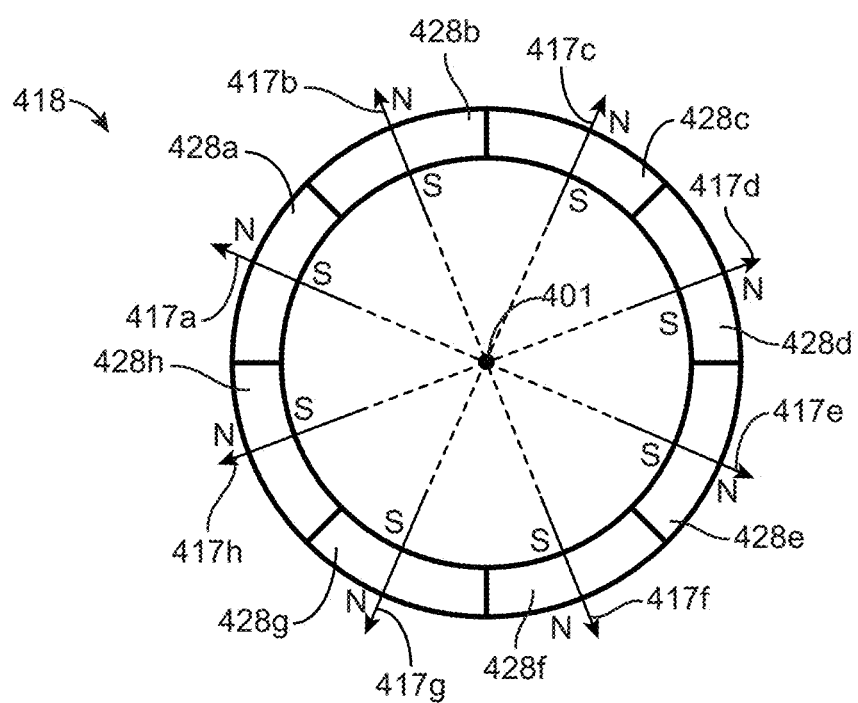
FIG. 4 shows a simplified top-down view of a secondary alignment component according to some embodiments.

1.4. Magnetic Orientation for a Closed-Loop Magnetic Alignment System 1.4.1. Radially Symmetric Orientation As noted above, in embodiments of magnetic alignment systems having closed-loop magnetic orientations, such as magnetic alignment system 300, secondary alignment component 318 can have a magnetic orientation with a radial component. For example, in some embodiments, secondary alignment component 318 can have a magnetic polarity in a radial orientation. FIG. 4 shows a simplified top-down view of a secondary alignment component 418 according to some embodiments. Secondary alignment component 418, like secondary alignment component 318, can be formed of arcuate magnets 428a-h having radial magnetic orientations as shown by magnetic polarity indicators 417a-h. In this example, each arcuate magnet 428a-h has a north magnetic pole oriented toward the radially outward side and a south magnetic pole toward the radially inward side; however, this orientation can be reversed, and the north magnetic pole of each arcuate magnet 428a-h can be oriented toward the radially inward side while the south magnetic pole is oriented toward the radially outward side.

Figure 5A:
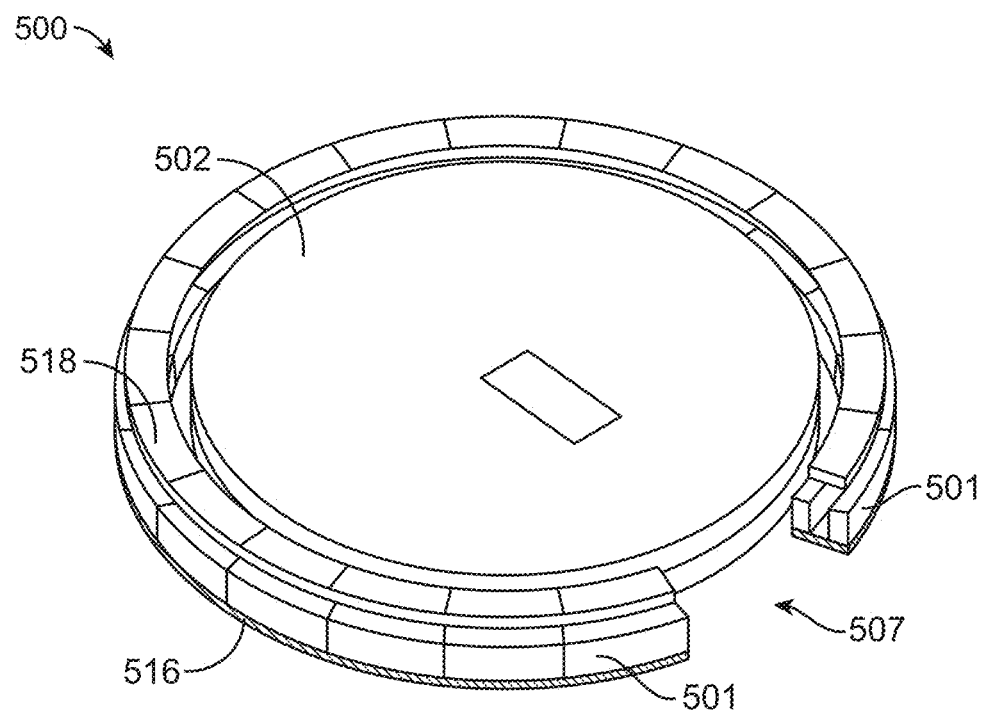
FIG. 5A shows a perspective view of a magnetic alignment system according to some embodiments.

FIG. 5A shows a perspective view of a magnetic alignment system 500 according to some embodiments. Magnetic alignment system 500, which can be an implementation of magnetic alignment system 300, includes a secondary alignment component 518 having a radially outward magnetic orientation (e.g., as shown in FIG. 4) and a complementary primary alignment component 516. In this example, magnetic alignment system 500 includes a gap 507 between two of the sectors; however, gap 507 is optional and magnetic alignment system 500 can be a complete annular structure. Also shown are components 502, which can include, for example an inductive coil assembly or other components located within the central region of primary magnetic alignment component 516 or secondary magnetic alignment component 518. Magnetic alignment system 500 can have a closed-loop configuration similar to magnetic alignment system 300 (as shown in FIG. 3B) and can include arcuate sectors 501, each of which can be made of one or more arcuate magnets. In some embodiments, the closed-loop configuration of magnetic alignment system 500 can reduce or prevent magnetic field leakage that may affect components 502.

Figure 5B:
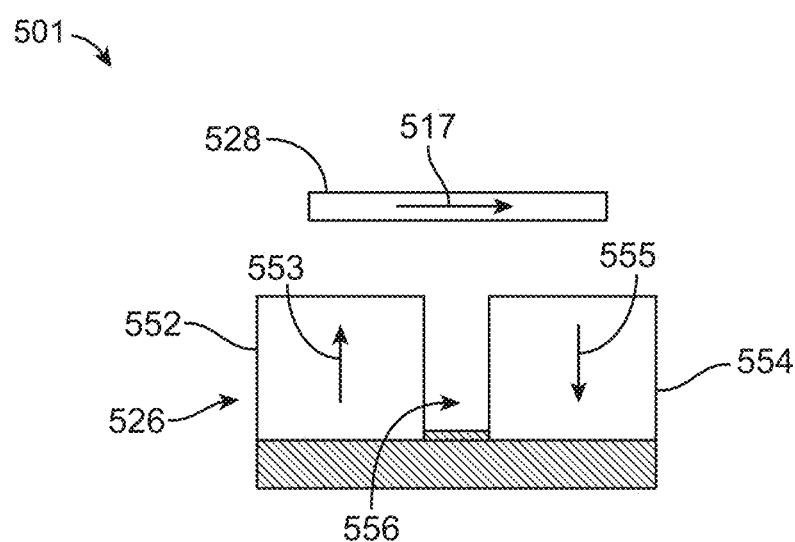
FIG. 5B shows an axial cross-section view through a portion of the system of FIG. 5A.

FIG. 5B shows an axial cross-section view through one of arcuate sectors 501. Arcuate sector 501 includes a primary magnet 526 and a secondary magnet 528. As shown by orientation indicator 517, secondary magnet 528 has a magnetic polarity oriented in a radially outward direction, i.e., the north magnetic pole is toward the radially outward side of magnetic alignment system 500. Like primary magnets 326 described above, primary magnet 526 includes an inner arcuate magnetic region 552, an outer arcuate magnetic region 554, and a central non-magnetized region 556 (which can include, e.g., an air gap or a region of nonmagnetic or non-magnetized material). Inner arcuate magnetic region 552 has a magnetic polarity oriented axially such that the north magnetic pole is toward secondary magnet 528, as shown by indicator 553, while outer arcuate magnetic region 554 has an opposite magnetic orientation, with the south magnetic pole oriented toward secondary magnet 528, as shown by indicator 555. As described above with reference to FIG. 3B, the arrangement of magnetic orientations shown in FIG. 5B results in magnetic attraction between primary magnet 526 and secondary magnet 528. In some embodiments, the magnetic polarities can be reversed such that the north magnetic pole of secondary magnet 528 is oriented toward the radially inward side of magnetic alignment system 500, the north magnetic pole of outer arcuate region 554 of primary magnet 526 is oriented toward secondary magnet 528, and the north magnetic pole of inner arcuate region 552 is oriented away from secondary magnet 528.

When primary alignment component 516 and secondary alignment component 518 are aligned, the radially symmetrical arrangement and directional equivalence of magnetic polarities of primary alignment component 516 and secondary alignment component 518 allow secondary alignment component 518 to rotate freely (relative to primary alignment component 516) in the clockwise or counterclockwise direction in the lateral plane while maintaining alignment along the axis.

Figure 5C:
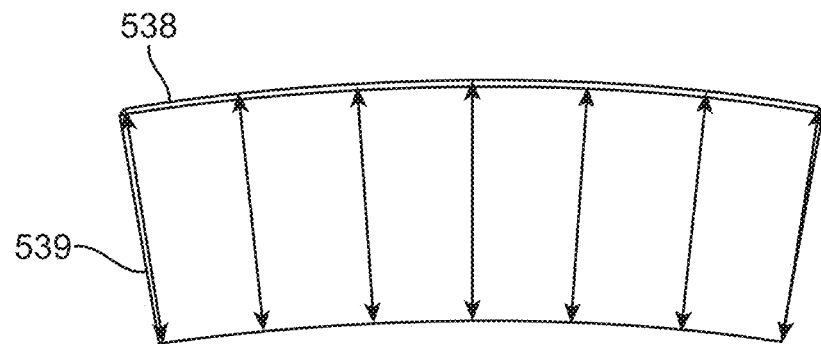
FIGS. 5C-5E show examples of arcuate magnets with radial magnetic orientation according to some embodiments.
Figure 5D:
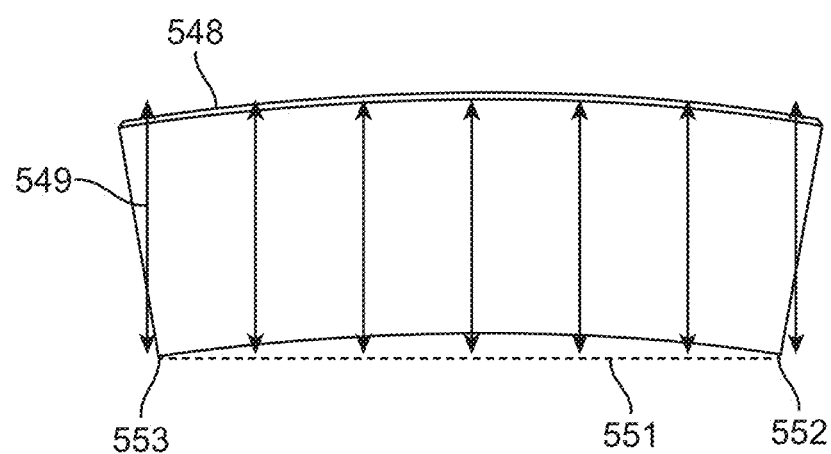
Figure 5E:
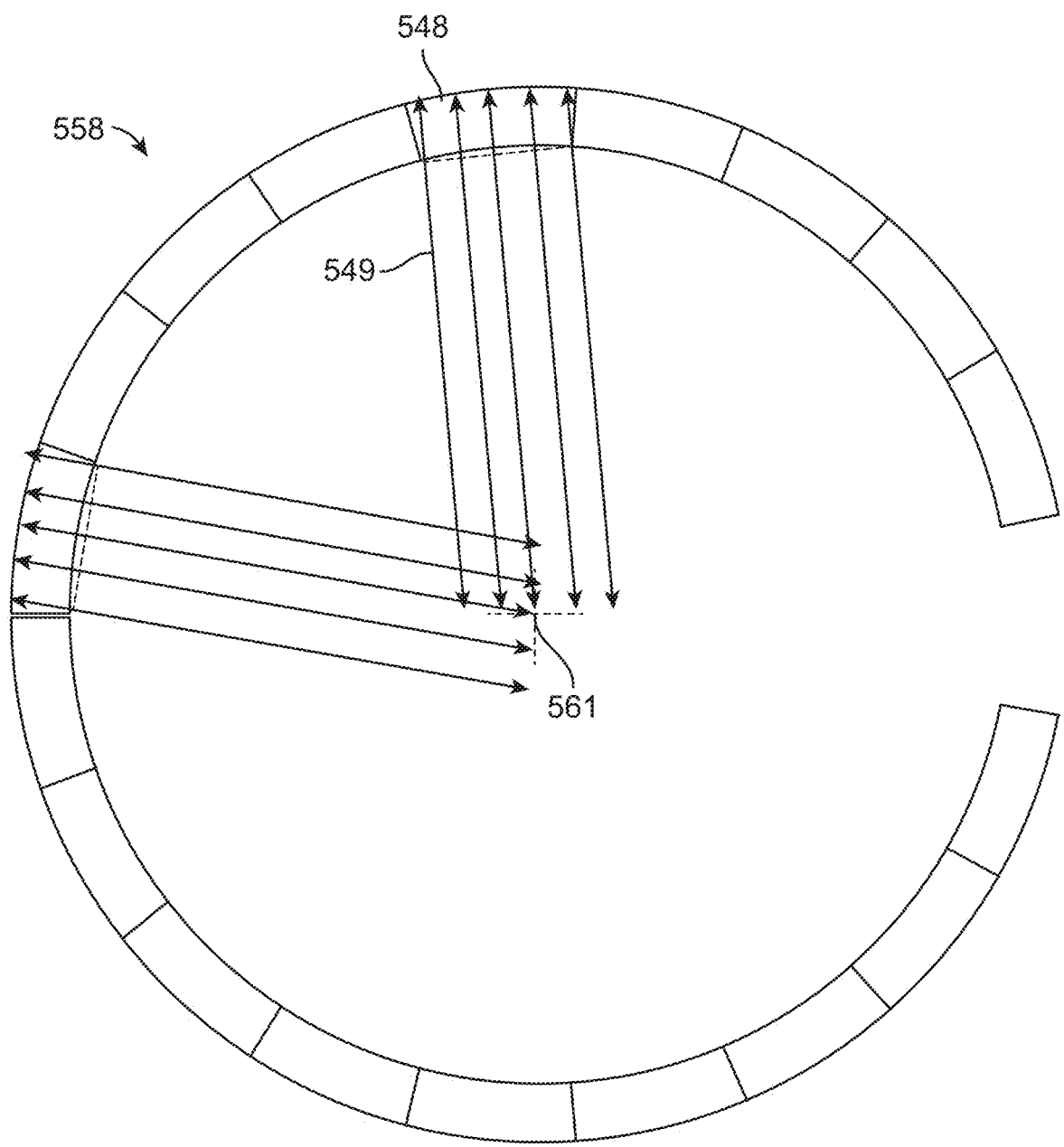

As used herein, a "radial" orientation need not be exactly or purely radial. For example, FIG. 5C shows a secondary arcuate magnet 538 according to some embodiments. Secondary arcuate magnet 538 has a purely radial magnetic orientation, as indicated by arrows 539. Each arrow 539 is directed at the center of curvature of magnet 538; if extended inward, arrows 539 would converge at the center of curvature. However, achieving this purely radial magnetization requires that magnetic domains within magnet 538 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 5C. FIG. 5D shows a secondary arcuate magnet 548 with pseudo-radial magnetic orientation according to some embodiments. Magnet 548 has a magnetic orientation, shown by arrows 549, that is perpendicular to a baseline 551 connecting the inner corners 552, 553 of arcuate magnet 548. If extended inward, arrows 549 would not converge. Thus, neighboring magnetic domains in magnet 548 are parallel to each other, which is readily achievable in magnetic materials such as NdFeB. The overall effect in a magnetic alignment system, however, can be similar to the purely radial magnetic orientation shown FIG. 5C. FIG. 5E shows a secondary annular alignment component 558 made up of magnets 548 according to some embodiments. Magnetic orientation arrows 549 have been extended to the center point 561 of annular alignment component 558. As shown the magnetic field direction can be approximately radial, with the closeness of the approximation depending on the number of magnets 548 and the inner radius of annular alignment component 558. In some embodiments, 18 magnets 548 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 518 (e.g., as shown in FIG. 5B) provides a magnetic force profile between secondary alignment component 518 and primary alignment component 516 that is the same around the entire circumference of the magnetic alignment system. The radial magnetic orientation can also result in greater magnetic permeance, which allows secondary alignment component 518 to resist demagnetization as well as enhancing the attractive force in the axial direction and improving shear force in the lateral directions when the two components are aligned.

Figure 6A:
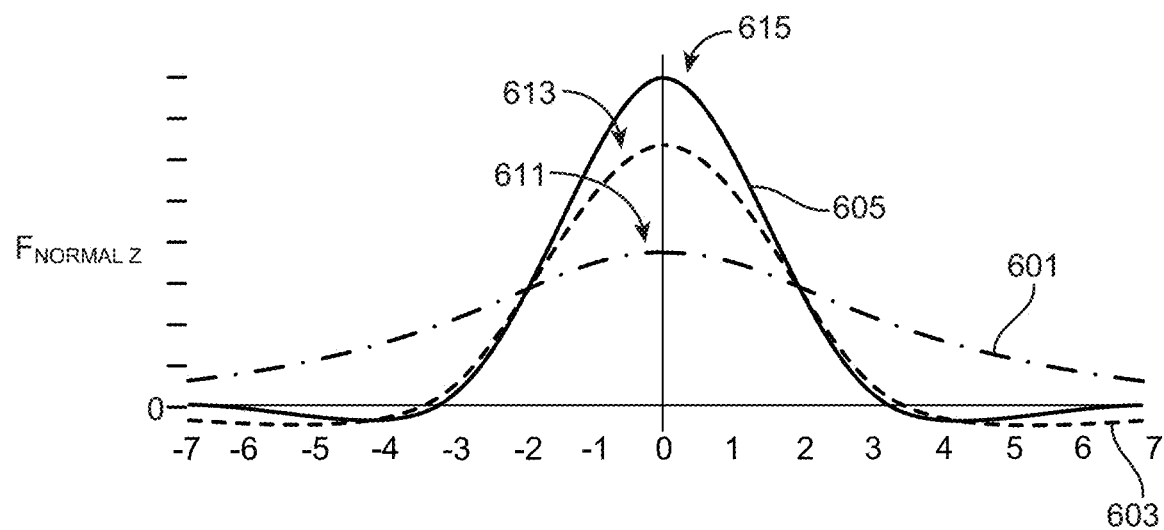
FIGS. 6A and 6B show graphs of force profiles for different magnetic alignment systems, according to some embodiments.
Figure 6B:
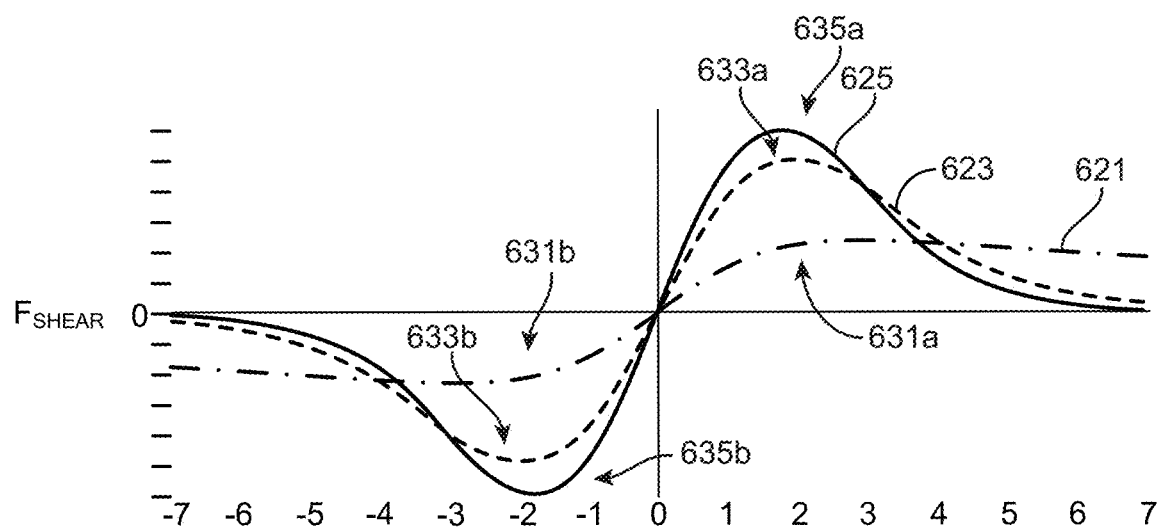

FIGS. 6A and 6B show graphs of force profiles for different magnetic alignment systems, according to some embodiments. Specifically, FIG. 6A shows a graph 600 of vertical attractive (normal) force in the axial (z) direction for different magnetic alignment systems of comparable size and using similar types of magnets. Graph 600 has a horizontal axis representing displacement from a center of alignment, where 0 represents the aligned position and negative and positive values represent displacements from the aligned position in opposite directions (in arbitrary units), and a vertical axis showing the normal force ($F_{NORMAL}$) as a function of displacement in the lateral plane (also in arbitrary units). For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 600 shows normal force profiles for three different types of magnetic alignment systems. A first type of magnetic alignment system uses "central" alignment components, such as a pair of complementary disc-shaped magnets placed along an axis; a representative normal force profile for a central magnetic alignment system is shown as line 601 (dot-dash line). A second type of magnetic alignment system uses annular alignment components with axial magnetic orientations, e.g., magnetic alignment system 200 of FIGS. 2A and 2B; a representative normal force profile for such an annular-axial magnetic alignment system is shown as line 603 (dashed line). A third type of magnetic alignment system uses annular alignment components with closed-loop magnetic orientations and radial symmetry (e.g., magnetic alignment system 500 of FIGS. 5A and 5B); a representative normal force profile for a radially symmetric closed-loop magnetic alignment system is shown as line 605 (solid line).

Similarly, FIG. 6B shows a graph 620 of lateral (shear) force in a transverse direction for different magnetic alignment systems. Graph 620 has a horizontal axis representing lateral displacement in opposing directions from a center of alignment, using the same convention as graph 600, and a vertical axis showing the shear force ($F_{SHEAR}$) as a function of direction (in arbitrary units). For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 620 shows shear force profiles for the same three types of magnetic alignment systems as graph 600: a representative shear force profile for a central magnetic alignment system is shown as line 621 (dot-dash line); a representative shear force profile for an annular-axial magnetic alignment system is shown as line 623 (dashed line); and a representative normal force profile for a radially symmetric closed-loop magnetic alignment system is shown as line 625 (solid line).

As shown in FIG. 6A, each type of magnetic alignment system achieves the strongest magnetic attraction in the axial direction (i.e., normal force) when the primary and secondary alignment components are in the aligned position (0 on the horizontal axis), as shown by respective peaks 611, 613, and 615. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 500 of FIG. 5) provides stronger magnetic attraction when in the aligned position than the other types of magnetic alignment systems. This strong attractive normal force can overcome small misalignments and can help to hold devices in the aligned position, thereby can achieving a more accurate and robust alignment between the primary and secondary alignment components, which in turn can provide a more accurate and robust alignment between a portable electronic device and a wireless charger device within which the magnetic alignment system is implemented.

As shown in FIG. 6B, the strongest shear forces are obtained when the primary and secondary alignment components are laterally just outside of the aligned position, e.g., at −2 and +2 units of separation from the aligned position, as shown by respective peaks 631a-b, 633a-b, and 635a-b. These shear forces act to urge the alignment components toward the aligned position. Similarly to the normal force, the peak strength of shear force depends on the type of magnetic alignment system. In particular, a radially-symmetric closed-loop magnetic alignment system (e.g., magnetic alignment system 500 of FIG. 5) provides higher magnitude of shear force when just outside of the aligned position than the other types of magnetic alignment systems. This strong shear force can provide tactile feedback (sometimes described as a sensation of "snappiness") to help the user identify when the two components are aligned. In addition, like the normal force, the shear force can overcome small misalignments due to frictional force and can achieve a more accurate and robust alignment between the primary and secondary alignment components, which in turn can provide a more accurate and robust alignment between a portable electronic device and a wireless charger device within which the magnetic alignment system is implemented.

Depending on the particular configuration of magnets, various design choices can be used to increase the sensation of snappiness for a closed-loop magnetic alignment system. For example, reducing the amount of magnetic material in the devices in areas near the magnetic alignment components—e.g., by using less material or by increasing the distance between the magnetic alignment component and the other magnetic material—can reduce stray fields and increase the perceived "snapping" effect of the magnetic alignment components. As another example, increasing the magnetic-field strength of the alignment magnets (e.g., by increasing the amount of material) can increase both shear and normal forces. As yet another example, the widths of the magnetized regions in the primary annular alignment component (and/or the relative strength of the magnetic field in each region) can be optimized based on the particular magnetic orientation pattern for the secondary annular alignment component (e.g., whether the secondary annular alignment components have the purely radial magnetic orientation of FIG. 5C or the pseudo-radial magnetic orientation of FIG. 5D). Another consideration can be the coefficient of friction between the surfaces of the devices containing primary and secondary alignment components; lower friction decreases resistance to the shear force exerted by the annular magnetic alignment components.

A radially-symmetric closed-loop magnetic alignment system (e.g., magnetic alignment system 500 of FIGS. 5A and 5B) can provide accurate and robust alignment in the axial and lateral directions. Further, because of the radial symmetry, the alignment system does not have a preferred rotational orientation in the lateral plane about the axis; the shear force profile can be the same regardless of relative rotational orientation of the electronic devices being aligned.

1.4.2. Alternating Radial Orientation

Figure 7:
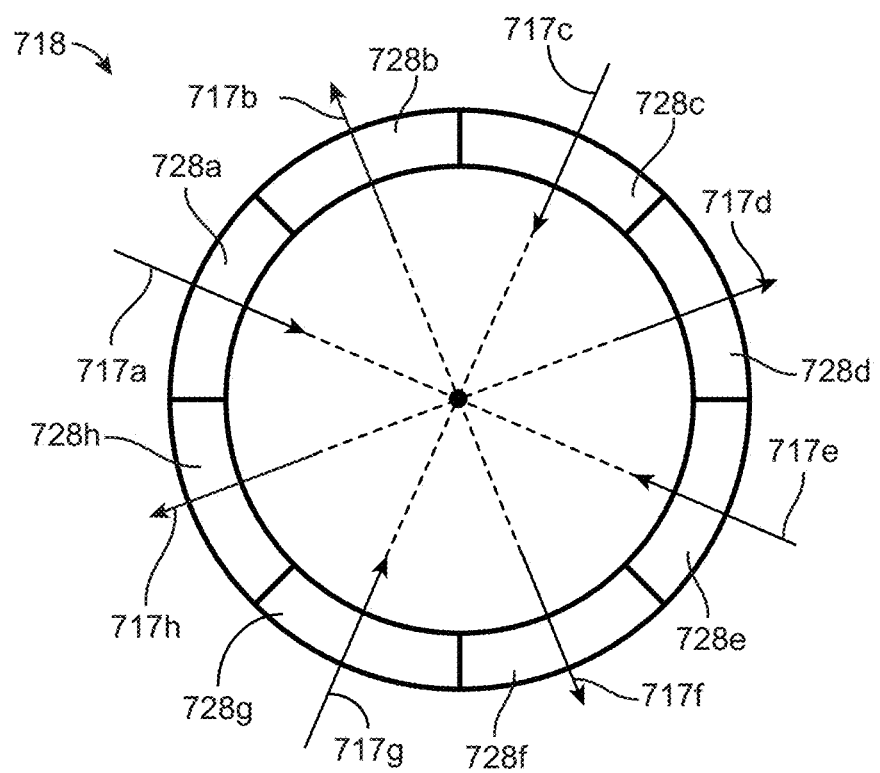
FIG. 7 shows a simplified top-down view of a secondary alignment component according to some embodiments.

In some embodiments, a closed-loop magnetic alignment system can be designed to provide one or more preferred rotational orientations. FIG. 7 shows a simplified top-down view of a secondary alignment component 718 according to some embodiments. Secondary alignment component 718 includes sectors 728a-h having radial magnetic orientations as shown by magnetic polarity indicators 717a-h. Each of sectors 728a-h can include one or more secondary arcuate magnets. In this example, secondary magnets in sectors 728*b*, 728*d*, 728*f*, and 728*h* each have a north magnetic pole oriented toward the radially outward side and a south magnetic pole toward the radially inward side, while secondary magnets in sectors 728*a*, 728*c*, 728*e*, and 728*g* each have a north magnetic pole oriented toward the radially inward side and a south magnetic pole toward the radially outward side. In other words, magnets in adjacent sectors 728*a-h* of secondary alignment component 718 have alternating magnetic orientations.

A complementary primary alignment component can have sectors with correspondingly alternating magnetic orientations. For example, FIG. 8A shows a perspective view of a magnetic alignment system 800 according to some embodiments. Magnetic alignment system 800 includes a secondary alignment component 818 having alternating radial magnetic orientations (e.g., as shown in FIG. 7) and a complementary primary alignment component 816. Some of the arcuate sections of magnetic alignment system 800 are not shown in order to reveal internal structure; however, it should be understood that magnetic alignment system 800 can be a complete annular structure. Also shown are components 802, which can include, for example, inductive coil assemblies or other components located within the central region of primary annular alignment component 816 and/or secondary annular alignment component 818. Magnetic alignment system 800 can be a closed-loop magnetic alignment system similar to magnetic alignment system 300 described above and can include arcuate sectors 801*b*, 801*c* of alternating magnetic orientations, with each arcuate sector 801*b*, 801*c* including one or more arcuate magnets in each of primary annular alignment component 816 and secondary annular alignment component 818. In some embodiments, the closed-loop configuration of magnetic alignment system 800 can reduce or prevent magnetic field leakage that may affect component 802. Like magnetic alignment system 500, magnetic alignment system 800 can include a gap 803 between two sectors.

FIG. 8B shows an axial cross-section view through one of arcuate sectors 801*b*, and FIG. 8C shows an axial cross-section view through one of arcuate sectors 801*c*. Arcuate sector 801*b* includes a primary magnet 826*b* and a secondary magnet 828*b*. As shown by orientation indicator 817*b*, secondary magnet 828*b* has a magnetic polarity oriented in a radially outward direction, i.e., the north magnetic pole is toward the radially outward side of magnetic alignment system 800. Like primary magnets 326 described above, primary magnet 826*b* includes an inner arcuate magnetic region 852*b*, an outer arcuate magnetic region 854*b*, and a central non-magnetized region 856*b* (which can include, e.g., an air gap or a region of nonmagnetic or non-magnetized material). Inner arcuate magnetic region 852*b* has a magnetic polarity oriented axially such that the north magnetic pole is toward secondary magnet 828*b*, as shown by indicator 853*b*, while outer arcuate magnetic region 854*b* has an opposite magnetic orientation, with the south magnetic pole oriented toward secondary magnet 828*b*, as shown by indicator 855*b*. As described above with reference to FIG. 3B, the arrangement of magnetic orientations shown in FIG. 8B results in magnetic attraction between primary magnet 826*b* and secondary magnet 828*b*.

As shown in FIG. 8C, arcuate sector 801*c* has a "reversed" magnetic orientation relative to arcuate sector 801*b*. Arcuate sector 801*c* includes a primary magnet 826*c* and a secondary magnet 828*c*. As shown by orientation indicator 817*c*, secondary magnet 828*c* has a magnetic polarity oriented in a radially inward direction, i.e., the north magnetic pole is toward the radially inward side of magnetic alignment system 800. Like primary magnets 326 described above, primary magnet 826*c* includes an inner arcuate magnetic region 852*c*, an outer arcuate magnetic region 854*c*, and a central non-magnetized region 856*c* (which can include, e.g., an air gap or a region of nonmagnetic or non-magnetized material). Inner arcuate magnetic region 852*c* has a magnetic polarity oriented axially such that the south magnetic pole is toward secondary magnet 828*c*, as shown by indicator 853*c*, while outer arcuate magnetic region 854*c* has an opposite magnetic orientation, with the north magnetic pole oriented toward secondary magnet 828*c*, as shown by indicator 855*c*. As described above with reference to FIG. 3B, the arrangement of magnetic orientations shown in FIG. 8C results in magnetic attraction between primary magnet 826*c* and secondary magnet 828*c*.

An alternating arrangement of magnetic polarities as shown in FIGS. 7 and 8A-8C can create a "ratcheting" feel when secondary alignment component 818 is aligned with primary alignment component 816 and one of alignment components 816, 818 is rotated relative to the other about the common axis. For instance, as secondary alignment component 816 is rotated relative to primary alignment component 816, each radially-outward magnet 828*b* alternately comes into proximity with a complementary magnet 826*b* of primary alignment component 816, resulting in an attractive magnetic force, or with an anti-complementary magnet 826*c* of primary alignment component 816, resulting in a repulsive magnetic force. If primary magnets 826*b*, 826*c* and secondary magnets 828*b*, 828*c* have the same angular size and spacing, in any given orientation, each pair of magnets will experience similar net (attractive or repulsive) magnetic forces such that alignment is stable and robust in rotational orientations in which complementary magnet pairs 826*b*, 828*b* and 826*c*, 828*c* are in proximity. In other rotational orientations, a torque toward a stable rotational orientation can be experienced.

Figure 9A:
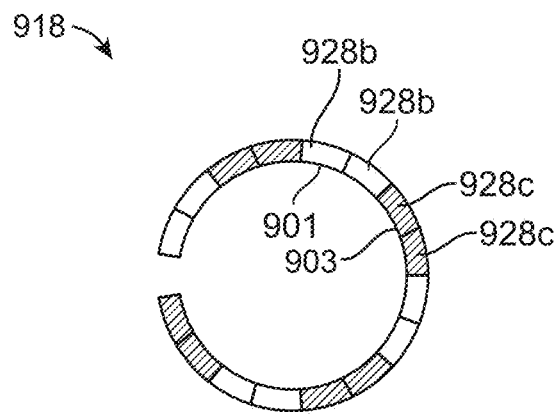
FIGS. 9A and 9B show simplified top-down views of secondary alignment components according to various embodiments.
Figure 9B:
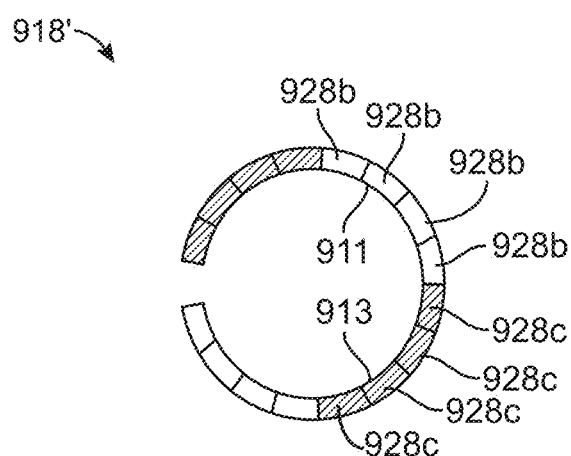

In the examples shown in FIGS. 7 and 8A-8C, each sector includes one magnet, and the direction of magnetic orientation alternates with each magnet. In some embodiments, a sector can include two or more magnets having the same direction of magnetic orientation. For example, FIG. 9A shows a simplified top-down view of a secondary alignment component 918 according to some embodiments. Secondary alignment component 918 includes secondary magnets 928*b* with radially outward magnetic orientations and secondary magnets 928*c* with radially inward orientations, similarly to secondary alignment component 818 described above. In this example, the magnets are arranged such that a pair of outwardly-oriented magnets 928*b* (forming a first sector 901) are adjacent to a pair of inwardly-oriented magnets 928*c* (forming a second sector 903 adjacent to first sector 901). The pattern of alternating sectors (with two magnets per sector) repeats around the circumference of secondary alignment component 918. Similarly, FIG. 9B shows a simplified top-down view of another secondary alignment component 918' according to some embodiments. Secondary alignment component 918' includes secondary magnets 928*b* with radially outward magnetic orientations and secondary magnets 928*c* with radially inward orientations. In this example, the magnets are arranged such that a group of four radially-outward magnets 928*b* (forming a first sector 911) is adjacent to a group of four radially-inward magnets 928*c* (forming a second sector 913 adjacent to first sector 911). The pattern of alternating sectors (with four magnets per sector) repeats around the circumference of secondary alignment component 918'. Although not shown in FIGS. 9A and 9B, the structure of a complementary primary alignment component for secondary alignment component 918 or 918' should be apparent in view of FIGS. 8A-8C. A shear force profile for the alignment components of FIGS. 9A and 9B can be similar to the ratcheting profile described above, although the number of rotational orientations that provide stable alignment will be different.

1.4.3. Other Magnetic Orientations

Figure 10:
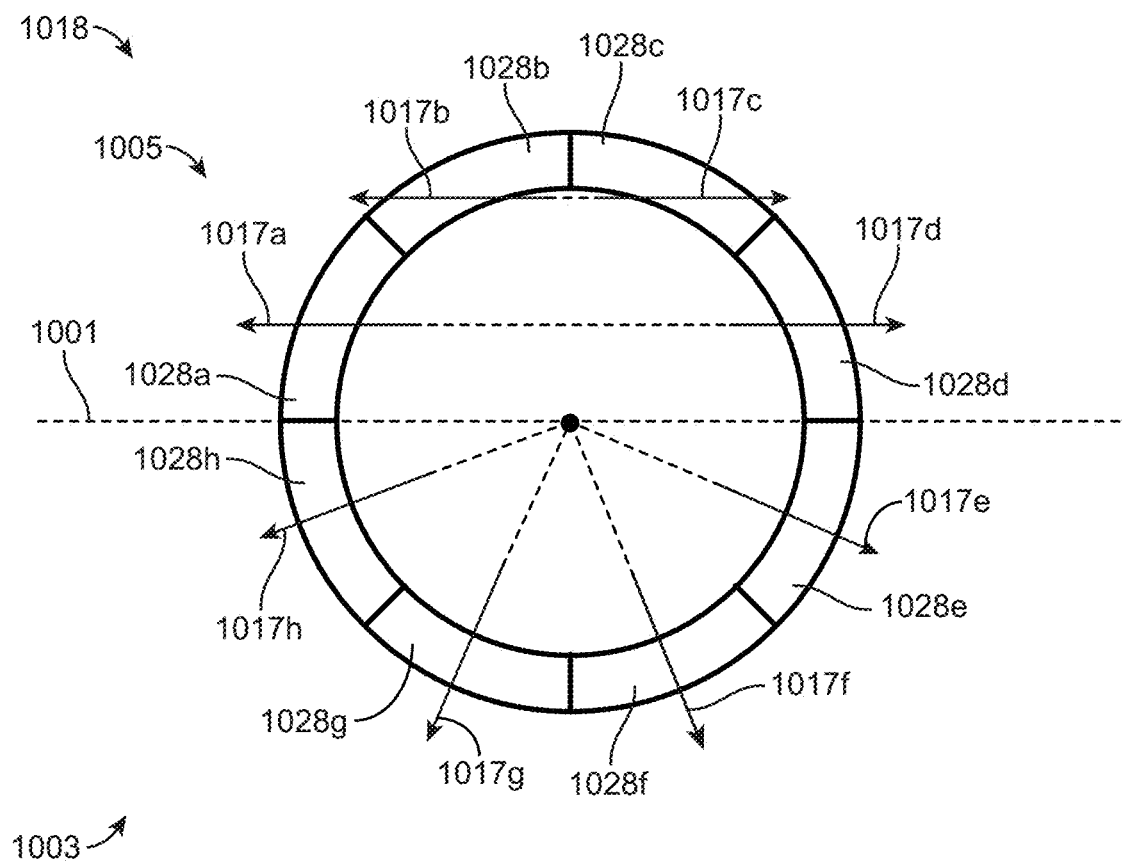
FIG. 10 shows a simplified top-down view of a secondary alignment component according to some embodiments.

In other embodiments, a variety of force profiles can be created by changing the magnetic orientations of different sectors within the primary and/or secondary alignment components. As just one example, FIG. 10 shows a simplified top-down view of a secondary alignment component 1018 according to some embodiments. Secondary alignment component has sectors 1028a-h with sector-dependent magnetic orientations as shown by magnetic polarity indicators 1017a-h. In this example, secondary alignment component 1018 can be regarded as bisected by bisector line 1001, which defines two halves of secondary alignment component 1018. In a first half 1003, sectors 1028e-h have magnetic polarities oriented radially outward, similarly to examples described above.

In the second half 1005, sectors 1028a-d have magnetic polarities oriented substantially parallel to bisector line 1001 rather than radially. In particular, sectors 1028a and 1028b have magnetic polarities oriented in a first direction parallel to bisector line 1001, while sectors 1028c and 1028d have magnetic polarities oriented in the direction opposite to the direction of the magnetic polarities of sectors 1028a and 1028b. A complementary primary alignment component can have an inner annular region with magnetic north pole oriented toward secondary alignment component 1018, an outer annular region with magnetic north pole oriented away from secondary alignment component 1018, and a central non-magnetized region, providing a closed-loop magnetic orientation as described above. The asymmetric arrangement of magnetic orientations in secondary alignment component 1018 can modify the shear force profile such that secondary alignment component 1018 generates less shear force resisting motion in the direction toward second half 1005 (upward in the drawing) than in the direction toward first half 1003 (downward in the drawing). In some embodiments, an asymmetrical arrangement of this kind can be used where the primary alignment component is mounted in a docking station and the secondary alignment component is mounted in a portable electronic device that docks with the docking station. Assuming secondary annular alignment component 1018 is oriented in the portable electronic device such that half-annulus 1005 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

In the embodiments described above, the secondary annular magnetic alignment component has a magnetic orientation that is generally aligned in the transverse plane. In some alternative embodiments, a secondary annular magnetic alignment component can instead have a quad-pole configuration similar to that of primary annular magnetic alignment component 316 of FIGS. 3A and 3B, with or without a DC shield (which, if present, can be similar to DC shield 314 of FIGS. 3A and 3B) on the distal surface of the secondary arcuate magnets. Using quad-pole magnetic configurations in both the primary and secondary alignment components can provide a closed-loop DC magnetic flux path and a strong sensation of "snappiness"; however, the thickness of the secondary magnetic alignment component may need to be increased to accommodate the quad-pole magnets and DC shield, which may increase the overall thickness of a portable electronic device that houses the secondary magnetic alignment component. To reduce thickness, the DC shield on the distal surface of the secondary alignment component can be omitted; however, omitting the DC shield may result in increased flux leakage into neighboring components.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations that exert forces toward the desired position of alignment. Different combinations of magnetic orientations may create different shear force profiles, and the selection of magnetic orientations may be made based on a desired shear force profile (e.g., high snappiness), avoidance of DC flux leakage into other components, and other design considerations.

1.5. Annular Magnetic Alignment Components with Gaps

In examples described above, the primary alignment component and secondary alignment component have annular shapes. As described above (e.g., with reference to FIG. 3A), the annulus can be completely closed. In other embodiments (e.g., as shown in FIGS. 5A and 8A), a primary or secondary annular alignment component can include one or more gaps, where each gap can be a section of an annulus where magnetic material (or indeed any material) is absent.

Figure 11:
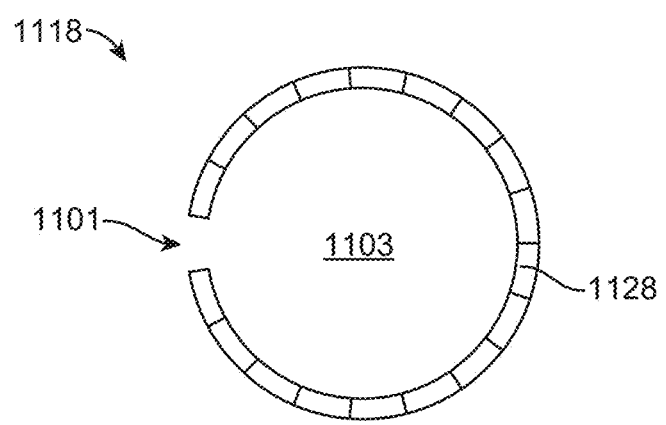
FIG. 11 illustrates an example of an annular alignment component having a gap according to some embodiments.

FIG. 11 illustrates an example of an alignment component 1118 (which can be a primary or secondary annular magnetic alignment component) having a gap according to some embodiments. As shown, alignment component 1118 can include a number of arcuate magnets 1128 forming an annular shape. In this embodiment, a gap 1101 between two magnets is created by omitting one of arcuate magnets 1128. More generally, a gap such as gap 1101 can be created using various techniques. For example, the angle $\phi$ subtended by each arcuate magnet can be selected such that $360°/\phi$ is not an integer. Thus, the size of gap 1101 may be equal to or smaller than (or larger than) the size of an arcuate magnet 1128. In various embodiments of a magnetic alignment system, a gap such as gap 1101 may be formed in either or both of a secondary alignment component and a primary alignment component, and the size, number, and location of gaps can be different between the primary and secondary alignment components. To provide reliable magnetic alignment, the size of gap 1101 or other gaps can be limited, e.g., to 20° of arc or less.

In some embodiments, a gap such as gap 1101 may provide a convenient path for electrical connections to components located in interior region 1103 inboard of alignment component 1118. For example, as described above, an inductive coil (or other electronic component) may be disposed in interior region 1103, and gap 1101 in alignment component 1118 may provide a convenient path for electrical connections between the inductive coil (or other component) and a battery (or other components) located outboard of alignment component 1118. It should be understood that electrical connections can also be made by routing connection paths over or under magnets 1128 (into or out of the plane of FIG. 11); however, routing connection paths over or under the magnets may result in increased thickness of the device in which alignment component 1118 is disposed.

It should be understood that a gap such as gap 1101 can be included in a primary alignment component, a secondary alignment component, or both. In some embodiments where gaps are provided in both the primary alignment component and the secondary alignment component, the presence of the gaps may alter the shear force profile in a manner that creates a preferred rotational orientation. The extent to which a preferred orientation arises may depend on the size of the gaps and the particular configuration of magnets.

1.6. Portable Electronic Devices Incorporating Magnetic Alignment Components

Figure 12A:
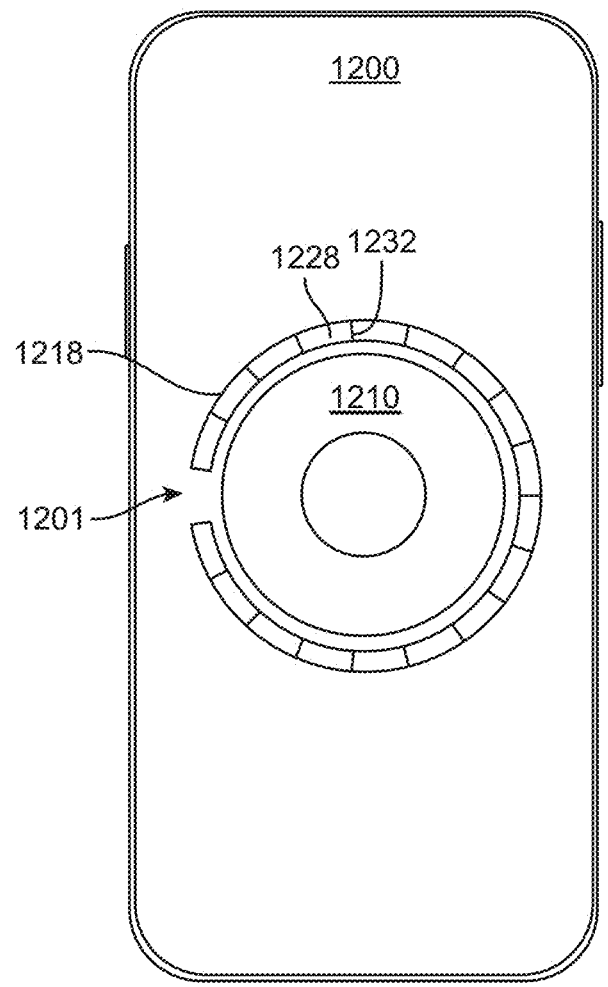
FIGS. 12A and 12B show examples portable electronic devices incorporating a magnetic alignment component according to some embodiments.
Figure 12B:
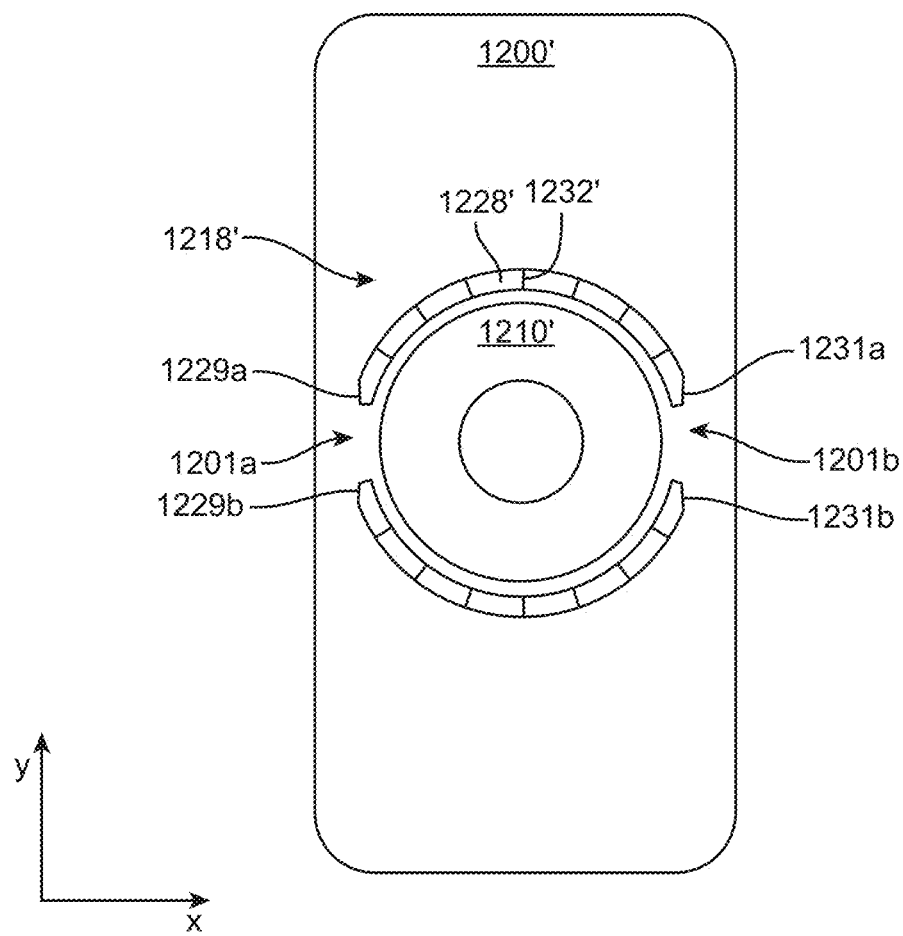

FIGS. 12A and 12B show simplified rear views of portable electronic devices incorporating magnetic alignment components according to some embodiments. In the examples shown, the portable electronic devices incorporate secondary magnetic alignment components having a radial magnetic orientation, which can allow for a thinner device profile; however, it should be understood that a portable electronic device can instead incorporate a primary magnetic alignment component.

FIG. 12A shows a smart phone 1200 as an example of a portable electronic device that can incorporate a magnetic alignment component according to some embodiments. Smart phone 1200 can support a variety of computing and communication activities and can draw operating power from an onboard battery (not shown). In some embodiments, the battery can be recharged using wireless power transfer. For example, smart phone 1200 can include a coil assembly 1210, which can be configured as an inductive receiver coil for wireless power transfer. Such time-varying magnetic fields can be provided by a transmitter coil in a wireless charger device (not shown in FIG. 12A). In addition or instead, coil assembly 1210 may be operable as an inductive transmitter coil for wireless power transfer and may be operable to generate time-varying magnetic fields that can be used to charge an accessory device such as a wireless headset, an external battery, or another portable electronic device (e.g., another smart phone). Coil assembly 1210 can include an inductive receiver coil (e.g., a wound coil of electrically conductive wire) coupled to a power storage device (e.g., a battery) or power consuming device. In some embodiments, coil assembly 1210 can also include electromagnetic shielding (e.g., one or more pieces of ferrite) placed over the distal surface, inner annular surface, and/or outer annular surface of the coil.

For optimal wireless charging performance, it is desirable to align coil 1210 with a coil in the transmitting (or receiving) device. Annular magnetic alignment component 1218 can be, for example, an implementation of any of the secondary magnetic alignment components described above and can include an annular arrangement of magnets 1228 with interfaces 1232, which can be air gaps or surfaces where adjacent magnets contact one another. The magnetic polarities of magnets 1228 can be oriented in varying directions in the lateral plane, e.g., in a radial direction as described above with reference to FIG. 4. In the example shown, magnetic alignment component 1218 includes a gap 1201, which can provide electrical connection paths for wires (or conductive traces) to connect between coil 1210 and components outboard of magnetic alignment component 1218. Coil 1210 can be optimized to support wireless power transfer between devices.

In some embodiments, a magnetic alignment component such as component 1218 can be modified to fit portable electronic devices of different sizes while preserving a constant outer diameter and radial width of the annulus. By way of example, FIG. 12B shows a smart phone 1200' as another example of a portable electronic device that can incorporate a magnetic alignment component according to some embodiments. Like smart phone 1200 of FIG. 12A, smart phone 1200' can support a variety of computing and communication activities and may draw operating power from an onboard battery (not shown). One difference between smart phone 1200 and smart phone 1200' can be that smart phone 1200' has a smaller form factor than smart phone 1200. For instance smart phone 1200' may be narrower (in the x direction) and/or shorter (in the y direction) than smart phone 1200. However, it may be desirable for these smart phones of different form factors to interoperate with the same wireless charger devices and/or other accessories. Accordingly, smart phone 1200' can include a wireless charging coil 1210' that can be identical to wireless charging coil 1210 of smart phone 1200.

To provide alignment of coil 1210' with a coil in another device, smart phone 1200' can include a magnetic alignment component 1218'. Magnetic alignment component 1218' can be for example, an implementation of any of the secondary magnetic alignment components described above and can include an annular arrangement of arcuate magnets 1228' with interfaces 1232', which can be air gaps or surfaces where adjacent magnets 1228' contact one another. The magnetic polarities of magnets 1228' can be oriented in varying directions in the lateral plane, e.g., in a radial direction as described above.

In the example shown, to accommodate the narrower width of smart phone 1200' magnetic alignment component 1218' includes diametrically opposed gaps 1201*a*, 1201*b*. In addition to decreasing the width (in the x direction) of magnetic alignment component 1218', gaps 1201*a* and/or 1201*b* can also provide electrical connection paths for wires (or conductive traces) to connect between coil 1210' and components outboard of magnetic alignment component 1218'. In some embodiments, the arcuate magnet sections 1228' adjacent to gaps 1201*a*, 1201*b* can have beveled corners 1229*a-b* and 1231*a-b*, which can further reduce the width of alignment component 1218' without reducing the outer diameter.

It should be understood that smart phones 1200 and 1200' are just examples, and a variety of portable electronic devices having a range of different form factors can accommodate an annular alignment component of a given diameter and width. Further, while FIGS. 12A and 12B show alignment components 1218, 1218' and coils 1210, 1210' on the rear of smart phones 1200, 1200', it should be understood that these components can be inside the rear housing of smart phones 1200, 1200' and that the rear housing may be opaque so that alignment components 1218, 1218' and coils 1210, 1210' need not be visible to users.

1.7. Wireless Charger Devices Incorporating Magnetic Alignment Components

Figure 13:
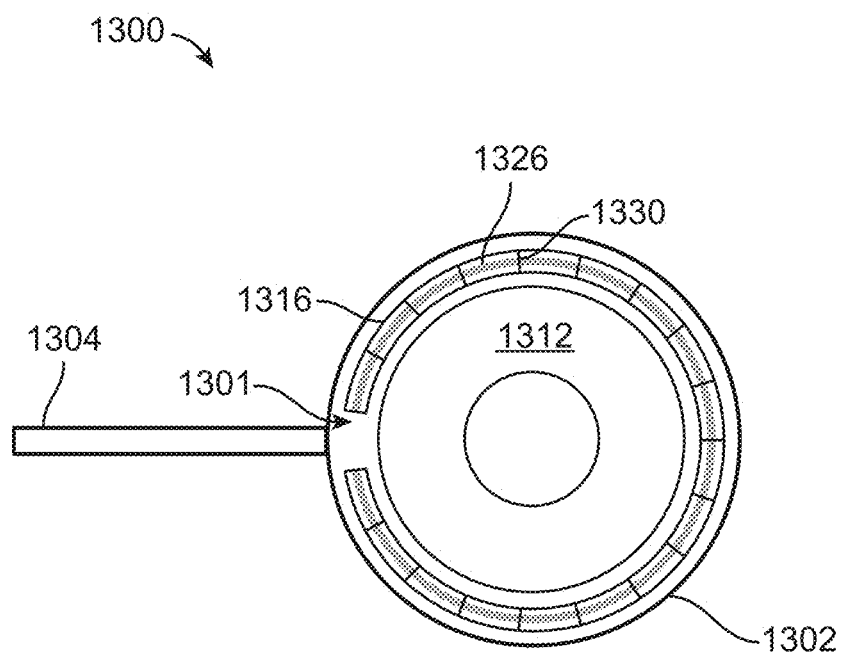
FIG. 13 shows a simplified view of a wireless charger device incorporating a magnetic alignment component according to some embodiments.

FIG. 13 shows a simplified view of a wireless charger device 1300 incorporating a magnetic alignment component according to some embodiments. In the example shown, the wireless charger device incorporates a primary alignment component; however, it should be understood that a wireless charger device can instead incorporate a secondary magnetic alignment component.

Wireless charger device 1300 can support inductive power transfer for charging a portable electronic device (such as smart phone 1200 of FIG. 12A or smart phone 1200' of FIG. 12B). In this example, wireless charger device 1300 has a housing 1302 surrounding a transmitter coil assembly 1312. Although not shown in FIG. 13, it should be understood that transmitter coil assembly 1312 can include an inductive transmitter coil having wires that can be connected to an external power source (e.g., via cable 1304). In some embodiments, transmitter coil assembly 1312 can also include electromagnetic shielding (e.g., one or more pieces of ferrite placed over the distal surface, inner annular surface, and/or outer annular surface of the transmitter coil and/or a thin layer of metal placed over the proximal surface of the transmitter coil to reduce parasitic electric fields). Control circuitry to control the transmitter coil can be disposed within housing 1302 or elsewhere as desired. A primary magnetic alignment component 1316 is disposed around transmitter coil assembly 1312.

Components of wireless charger device 1300 can be enclosed in housing 1302, which can be made of aluminum, plastic, ceramic, or other durable material. Housing 1302 is shown as puck-shaped; however, other shapes can also be used. For instance, housing 1302 can be rectangular, elliptical, or any other shape that provides a charging surface. In some embodiments, housing 1302 can be a two-piece housing that includes an enclosure for the distal and side surfaces of wireless charger device 1300 and a top cap covering the proximal surface of transmitter coil assembly 1312. The top cap (not shown in FIG. 13) can be made of ceramic or other material that is permeable to electromagnetic fields, while the enclosure can be made of aluminum, plastic or other materials. The top cap and enclosure can be sealed together using an appropriate adhesive. Although FIG. 13 shows a view into the interior of wireless charger device 1300, it should be understood that housing 1302 can be opaque. Housing 1302 can include an opening to permit connection of cable 1304 to transmitter coil assembly 1312. In some embodiments, one end of cable 1304 is captively coupled to electronic components of transmitter coil assembly 1312 while the other end of cable 1304 (not shown) is coupled to a plug connector (e.g., a USB type A or USB-C connector) that can be used to draw power from the grid or other power source via an adapter.

For optimal wireless charging performance, it is desirable to align the transmitter coil of coil assembly 1312 with a corresponding coil in a receiving device such as smart phone 1200. Magnetic alignment component 1316 can be, for example, an implementation of any of the primary magnetic alignment components described above and can include an annular arrangement of magnets 1326 with interfaces 1330 between adjacent magnets 1326, which can be air gaps or surfaces where adjacent magnets 1326 contact one another. Magnets 1326 can provide a closed loop configuration as described above; for instance, each magnet 1326 can include an inner arcuate region having an axial magnetic orientation in a first direction, an outer arcuate region having an axial magnetic orientation in a second direction opposite the first direction, and a central arcuate region having no distinct magnetic orientation. In the example shown, magnetic alignment component 1316 includes a gap 1301, which can provide electrical connection paths for wires (or conductive traces) to connect between coil assembly 1312 and cable 1304 without adding to the axial thickness of wireless charger device 1300. Coil assembly 1312 can be optimized to support wireless power transfer between devices.

In various embodiments, primary magnetic alignment component 1316 can be used to facilitate alignment between wireless charger device 1300 and a variety of different portable electronic devices having different form factors (e.g., including portable electronic device 1200 and portable electronic device 1200'). As long as the portable electronic device being aligned with primary magnetic alignment component 1316 includes a complementary secondary alignment component having an annular shape matching primary alignment component 1316 and a magnetic field orientation complementary to primary alignment component 1316, primary alignment component 1316 can facilitate alignment of wireless charger device 1300 with the portable electronic device, regardless of any other dimensions of either device. It should also be understood that some embodiments of wireless charger device 1300 can be used to charge a portable electronic device that does not have a magnetic alignment component; however, in such instances, primary alignment component 1316 might not facilitate optimal alignment with the portable electronic device, and the user would need to align the devices using other techniques (e.g., manual adjustment based on charging performance or placing the devices in a cradle that holds the devices such that their respective charging coils are in alignment).

1.8. Wireless Charging Systems with Magnetic Alignment

Figure 14A:
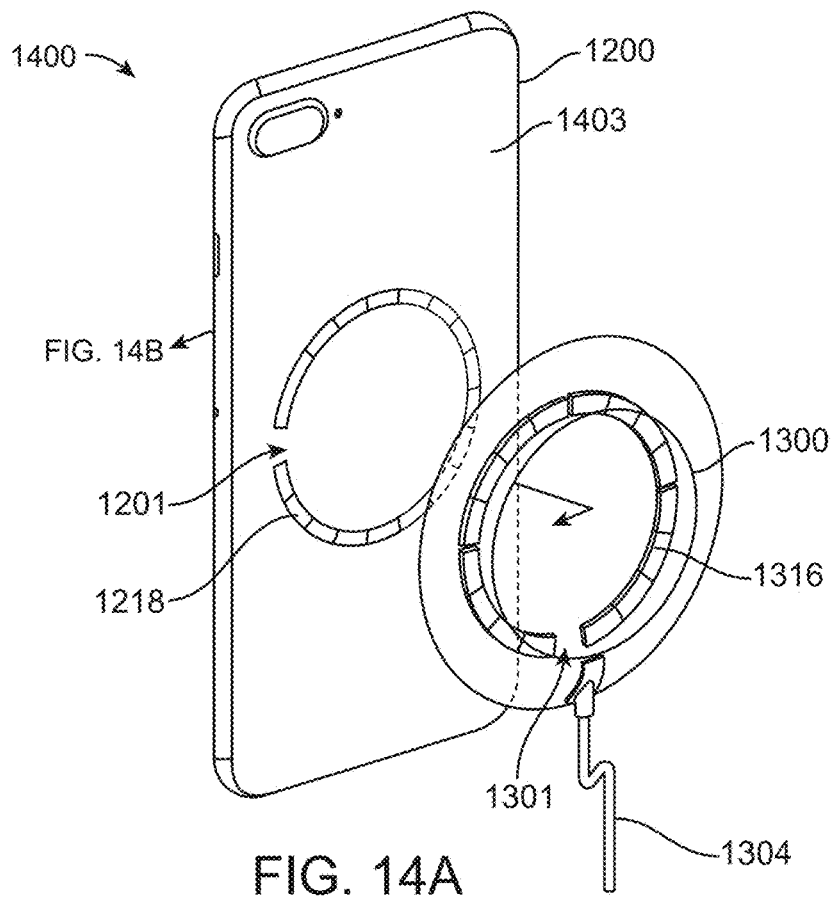
FIG. 14A shows a simplified perspective view of a system including a portable electronic device in alignment with a wireless charger device according to some embodiments.

FIG. 14A shows a simplified perspective view of a system 1400 including portable electronic device 1200 (of FIG. 12A) in alignment with wireless charger device 1300 (of FIG. 13) according to some embodiments. In FIG. 14A, portions of wireless charger device 1300 are shown using dashed lines to avoid obscuring other details. As shown, wireless charger device 1300 can be placed with its charging (or proximal) surface against the rear (or proximal) surface 1403 of portable electronic device 1200. When the devices are placed in this arrangement, secondary alignment component 1218 in portable electronic device 1200 can attract and hold primary magnetic alignment component 1316 of wireless charger device 1300 in alignment so that transmitter coil assembly 1312 of wireless charger device 1300 is aligned with coil assembly 1210 of portable electronic device 1200. As shown, wireless charger device 1300 can have any rotational orientation about an axis defined by the centers of primary magnetic alignment component 1316 and secondary magnetic alignment component 1218; for instance gap 1201 in secondary magnetic alignment component 1218 need not align with gap 1301 in primary magnetic alignment component 1316.

Figure 14B:
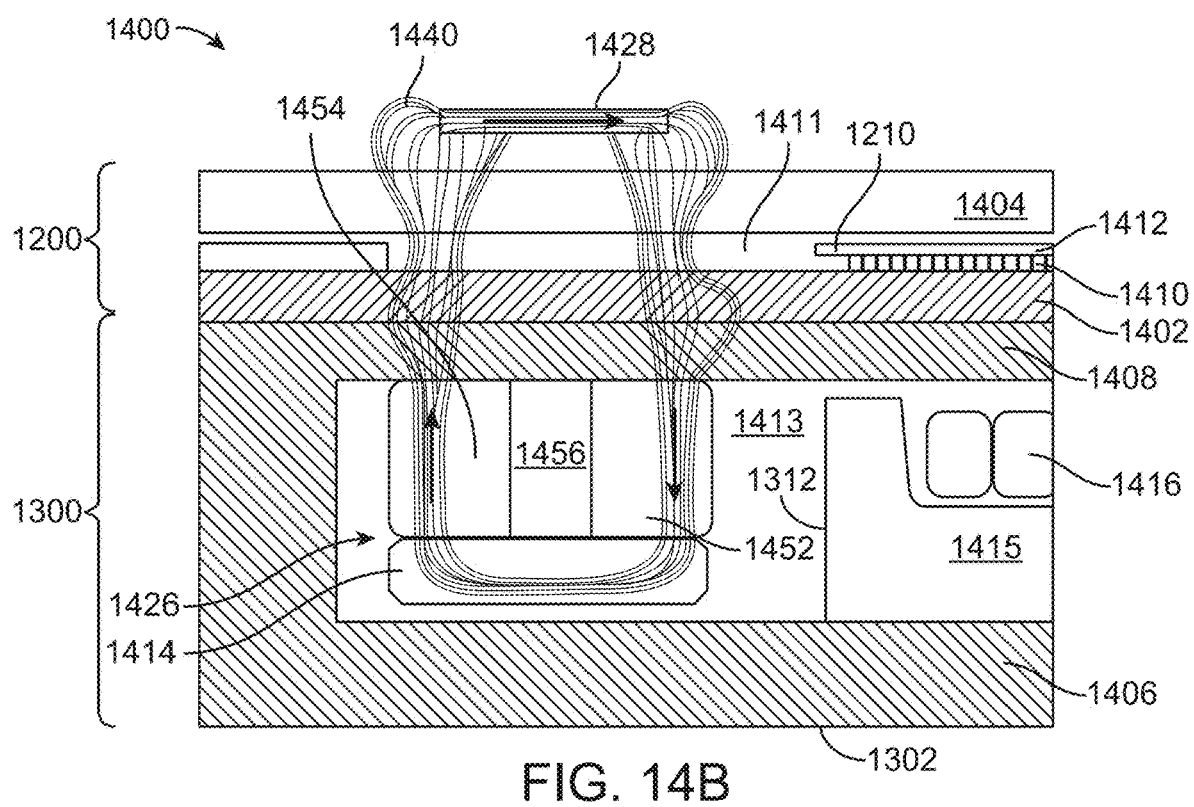
FIG. 14B shows a simplified partial cross section view of the system of FIG. 14A.

FIG. 14B shows a simplified partial cross section view of system 1400 according to some embodiments. Portable electronic device 1200 has a rear housing 1402 (which can be made of a material such as glass or plastic that is permeable to electromagnetic fields and to DC magnetic fields) and a front housing 1404 (which can include a touch screen display). Coil assembly 1210 can include an inductive receiver coil 1410 (which can be made, e.g., of stranded wire wound into a coil) and shielding 1412 (which can include, e.g., a ferrimagnetic shield). Secondary magnet 1428 forms a portion of secondary magnetic alignment component 1218 and can have a magnetic field oriented in a radially inward direction (as shown by the arrow). It should be understood that, although alignment component 1218 is shown in FIG. 14A, rear housing 1402 can be opaque and alignment component 1218 need not be visible to a user.

Wireless charger device 1300 has a housing 1302 that includes a single-piece enclosure 1406 forming distal and side surfaces of housing 1302 and a top cap 1408 forming a proximal surface of housing 1302. As described above, enclosure 1406 and top cap 1408 can be made of the same material or different materials, and top cap 1408 can be made of a material that is permeable to AC electromagnetic fields and to DC magnetic fields. Transmitter coil assembly 1312 can include an inductive transmitter coil 1416 (which can be made, e.g., of stranded wire wound into a coil) and electromagnetic shielding 1415 (which can include, e.g., a ferrimagnetic shield). Primary magnet 1426 forms a portion of primary magnetic alignment component 1316 and can include an inner arcuate region 1452 having a magnetic field oriented in a first axial direction, an outer arcuate region 1454 having a magnetic field oriented in a second axial direction opposite the first axial direction, and a non-magnetized central arcuate region 1456. As described above, a DC shield 1414 can be disposed on the distal surface of primary magnet 1426. It should be understood that, although alignment component 1316 is shown in FIG. 14A, housing 1302 can be opaque and alignment component 1316 need not be visible to a user.

When aligned, primary magnet 1426 and secondary magnet 1428 produce a closed-loop magnetic flux as shown by lines 1440. Magnetic flux 1440 can attract primary annular alignment component 1318 and secondary annular alignment component 1216 into alignment such that the respective centers of primary annular alignment component 1318 and secondary annular alignment component 1216 are aligned along a common axis. Since transmitter coil 1416 is fixed in a position concentric with primary alignment component 1316 and receiver coil 1410 is fixed in position concentric with secondary alignment component 1218, a result of aligning primary annular alignment component 1318 and secondary annular alignment component 1216 along a common axis is that transmitter coil 1416 and receiver coil 1410 are also aligned along a common axis, thereby enabling efficient wireless power transfer. For instance, transmitter coil 1416 can be driven with an alternating current to generate time-varying magnetic fields that induce a time-varying current in receiver coil 1416. Electromagnetic shielding (e.g., shielding 1415 and 1412) can confine the AC fields to the immediate vicinity of coils 1416 and 1410.

In particular, some embodiments provide a gap region 1411 between secondary magnet 1428 and receiver coil assembly 1210 that may experience low DC magnetic flux and may also experience low AC electromagnetic fields due to electromagnetic shielding 1412 around coil 1410. Similarly, some embodiments provide a gap region 1413 between primary magnet 1426 and transmitter coil assembly 1312 that may experience low DC magnetic flux and may also experience low AC electromagnetic fields due to electromagnetic shielding 1418 around transmitter coil 1416. It is noted that a similar gap region may be created when using a z-pole magnetic alignment system of the kind shown in FIG. 2; however, a larger space between the charging coils and magnets would be required.

As can be appreciated with reference to FIG. 14B, each secondary alignment magnet 1428 of secondary alignment component 1218 can have a thin axial dimension so that secondary alignment component 1218 does not require an increased thickness of portable electronic device 1200. For instance, the axial thickness of each secondary alignment magnet 1428 can be less than or equal to the thickness of receiver coil assembly 1210 (including coil 1410 and shielding 1412). Primary alignment component 1426 can have a thicker axial dimension, e.g., occupying all of the axial space between enclosure 1406 and top cap 1408. In some embodiments, primary alignment component 1426 can also have a radial width that is slightly larger than a radial width of secondary alignment component 1428.

Figure 15:
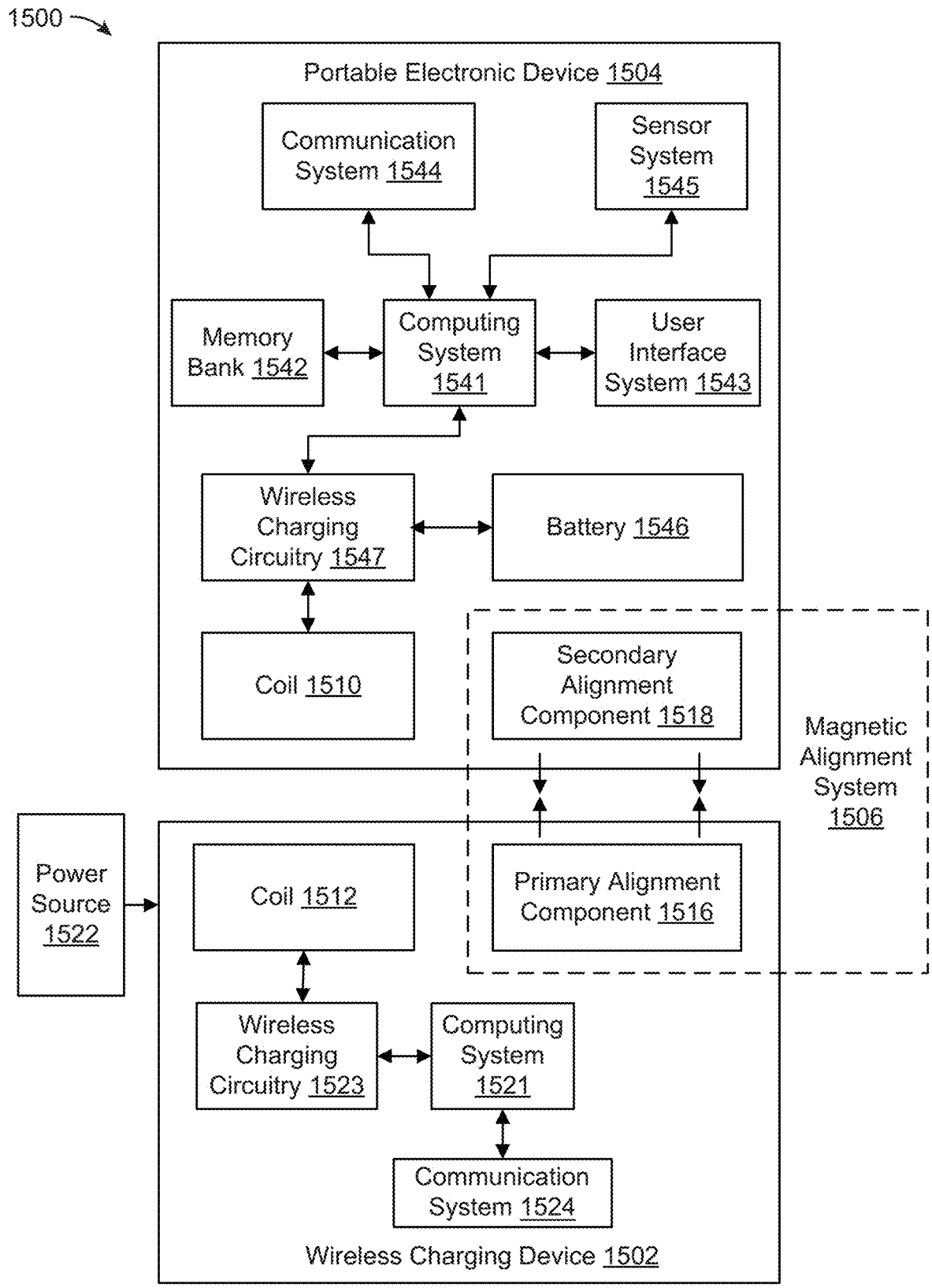
FIG. 15 is a block diagram illustrating an exemplary wireless charging system including devices that can be aligned together via a magnetic alignment system according to some embodiments.

FIG. 15 is a block diagram illustrating an exemplary wireless charging system 1500 including a portable electronic device 1504 (which can be, e.g., portable electronic device 1200 or any other portable electronic device described herein) and a wireless charger device 1502 (which can be, e.g., wireless charger device 1300 or any other wireless charger device described herein) that can be aligned together via a magnetic alignment system 1506 according to some embodiments. Magnetic alignment system 1506 can include a primary alignment component 1516 within wireless charger device 1502 and a secondary alignment component 1518 within portable electronic device 1504. Primary alignment component 1516 and secondary alignment component 1516 can be constructed according to any of the embodiments described herein. Portable electronic device 1504 can also include a computing system 1541 coupled to a memory bank 1542. Computing system 1541 can include control circuitry configured to execute instructions stored in memory bank 1542 for performing various functions for operating portable electronic device 1504. The control circuitry can include one or more programmable integrated logic circuits, such as microprocessors, central processing units (CPUs), graphics processing units (GPUs), field programmable gate arrays (FPGAs), or the like.

Computing system 1541 can also be coupled to a user interface system 1543, a communication system 1544, and a sensor system 1545 for enabling portable electronic device 1504 to perform one or more functions. For instance, user interface system 1543 can include a display, speaker, microphone, actuator for enabling haptic feedback, and one or more input devices such as a button, switch, capacitive screen for enabling the display to be touch sensitive, and the like. Communication system 1544 can include wireless telecommunication components, near-field communication (NFC) components, Bluetooth components, and/or Wi-Fi components for enabling portable electronic device 1504 to make phone calls, interact with wireless accessories, and access the Internet. Sensor system 1545 can include light sensors, accelerometers, gyroscopes, temperature sensors, magnetometers, and/or any other type of sensor that can measure a parameter of an external entity and/or environment.

All of these electrical components require a power source to operate. Accordingly, portable electronic device 1504 also includes a battery 1546 that can discharge stored energy to power the electrical components of portable electronic device 1504. To replenish the energy discharged to power the electrical components, portable electronic device 1504 includes charging circuitry 1547 and an inductive coil 1510 that can receive power from wireless charger device 1502 coupled to an external power source 1522.

Wireless charger device 1502 can include a transmitter coil 1512 for generating time-varying magnetic flux capable of inducing an electrical current in coil 1510 of portable electronic device 1504. The induced current can be used by charging circuitry 1547 to charge battery 1546. Wireless charger device 1502 can further include a computing system 1521 coupled to a communication system 1524 and wireless charging circuitry 1523. Wireless charging circuitry can include circuit components to convert standard AC power having a first set of voltage and frequency characteristics (e.g., standard AC wall power) to AC power suitable for operating coil 1510. Suitable circuit components, including rectifiers (AC-to-DC converters), boost circuits (DC-to-DC voltage boosting circuits), inverters (DC-to-AC converters), and the like, are known in the art. Computing system 1521 can include logic circuitry (such as a microprocessor, microcontroller, FPGA, or the like) configured to control the operation of wireless charger device 1502, such as to control wireless charging circuitry 1523 to use power received from external power source 1522 to generate time-varying magnetic flux to induce current in coil 1510 to charge portable electronic device 1504. In some embodiments, computing system 1521 can implement functionality confirming to the Qi standard for wireless charging (promulgated by the Wireless Power Consortium).

In some embodiments, components implementing computing system 1521 and wireless charging circuitry 1523 can be disposed within the housing that holds coil 1512 and primary alignment component 1516 (e.g., within puck-shaped housing 1302 of FIGS. 13 and 14A-14B). In other embodiments, some or all of the components implementing computing system 1521 and wireless charging circuitry 1523 can be disposed elsewhere, e.g., at the distal end of cable 1304 in FIGS. 13 and 14A. For example, the logic circuitry implementing computing system 1521 can be disposed within housing 1302 while wireless charging circuitry 1532 is disposed in a boot of a plug connector at the distal end of cable 1304. (In this case, cable 1304 can provide AC power to wireless charger device 1300.) As another example, the logic circuitry implementing computing system 1521 and circuit components implementing portions of wireless charging circuitry 1523 can be disposed within housing 1302 while circuit components implementing other portions of wireless charging circuitry 1523 are disposed in a boot of a plug connector at the distal end of cable 1304. For instance, an inverter may be disposed within housing 1302 while a rectifier and boost circuit are disposed in the boot. (In this case, cable 1304 can provide DC power to wireless charger device 1300.)

While system 1500 is described with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices that use using any combination of circuitry and software to enable wireless charging operations and/or other operations where physical alignment between devices is desired.

2. Rotational Alignment Components

In various embodiments described above, a magnetic alignment system can provide robust alignment in a lateral plane and may or may not provide rotational alignment. For example, radially symmetric magnetic alignment system 500 of FIGS. 5A-5B may not define a preferred rotational orientation. Radially alternating magnetic alignment system 800 of FIGS. 8A-8C can define multiple equally preferred rotational orientations. For some applications, such as alignment of a portable electronic device with a wireless charger puck or mat, rotational orientation may not be a concern. In other applications, such as alignment of a portable electronic device in a docking station or other mounting accessory, a particular rotational alignment may be desirable. Accordingly, in some embodiments an annular magnetic alignment component can be augmented with one or more rotational alignment components positioned outboard of and spaced apart from the annular magnetic alignment components. The rotational alignment component(s) can help guide devices into a target rotational orientation relative to each other.

Figure 16:
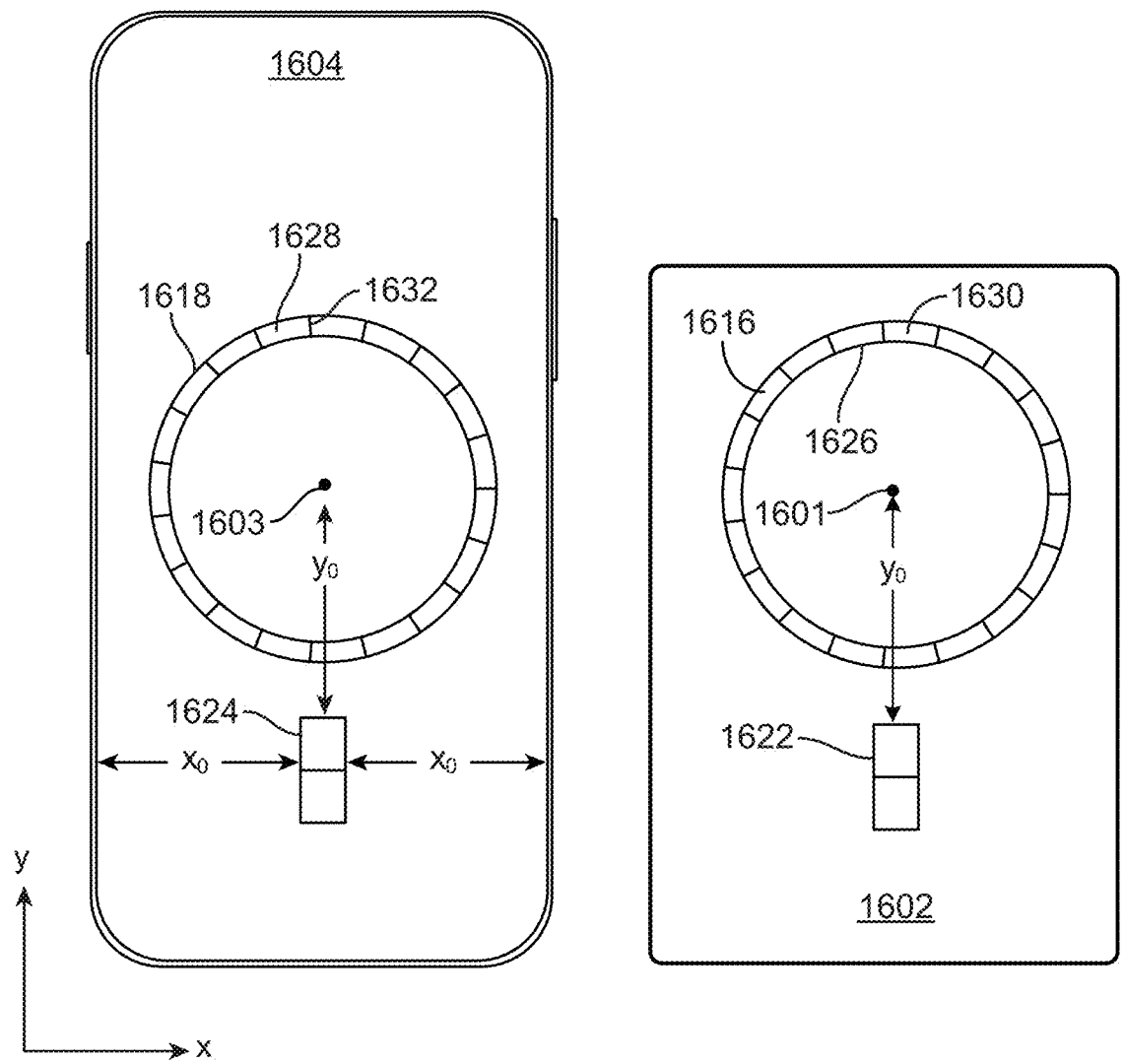
FIG. 16 shows an example of a portable electronic device and an accessory incorporating a magnetic alignment system with an annular alignment component and a rotational alignment component according to some embodiments.

FIG. 16 shows an example of a magnetic alignment system with an annular alignment component and a rotational alignment component according to some embodiments. FIG. 16 shows respective proximal surfaces of a portable electronic device 1604 and an accessory 1602. In this example, primary alignment components of the magnetic alignment system are included in an accessory device 1602, and secondary alignment components of the magnetic alignment system are included in a portable electronic device 1604. Portable electronic device 1604 can be, for example, a smart phone whose front surface provides a touchscreen display and whose back surface is designed to support wireless charging. Accessory device 1602 can be, for example, a charging dock that supports portable electronic device 1604 such that its display is visible and accessible to a user. For instance, accessory device 1602 can support portable electronic device 1604 such that the display is vertical or at a conveniently tilted angle for viewing and/or touching. In the example shown, accessory device 1602 supports portable electronic device 1604 in a "portrait" orientation (shorter sides of the display at the top and bottom); however, in some embodiments accessory device 1602 can support portable electronic device 1604 in a "landscape" orientation (longer sides of the display at the top and bottom). Accessory device 1602 can also be mounted on a swivel, gimbal, or the like, allowing the user to adjust the orientation of portable electronic device 1604 by adjusting the orientation of accessory device 1602.

As described above, components of a magnetic alignment system can include a primary annular alignment component 1616 disposed in accessory 1602 and a secondary annular alignment component 1618 disposed in portable electronic device 1604. Primary annular alignment component 1616 can be similar or identical to any of the primary alignment components described above. For example, primary annular alignment component 1616 can be formed of arcuate magnets 1626 arranged in an annular configuration. Although not shown in FIG. 16, one or more gaps can be provided in primary annular alignment component 1616, e.g., by omitting one or more of arcuate magnets 1626 or by providing a gap at one or more interfaces 1630 between adjacent arcuate magnets 1626. In some embodiments, each arcuate magnet 1626 can include an inner arcuate region having a first magnetic orientation (e.g., axially oriented in a first direction), an outer arcuate region having a second magnetic orientation opposite the first magnetic orientation (e.g., axially oriented opposite the first direction), and a central non-magnetized arcuate region between the inner and outer regions (as described above, the non-magnetized central region can include an air gap or a nonmagnetic material). In some embodiments, primary annular alignment component 1616 can also include a DC shield (not shown) on the distal side of arcuate magnets 1626.

Likewise, secondary annular alignment component 1618 can be similar or identical to any of the secondary alignment components described above. For example, secondary annular alignment component 1618 can be formed of arcuate magnets 1628 arranged in an annular configuration. Although not shown in FIG. 16, one or more gaps can be provided in secondary annular alignment component 1618, e.g., by omitting one or more arcuate magnets 1628 or by providing a gap at one or more interfaces 1632 between adjacent magnets 1628. As described above, arcuate magnets 1628 can provide radially-oriented magnetic polarities. For instance, all sectors of secondary annular alignment component 1618 can have a radially-outward magnetic orientation or a radially-inward magnetic orientation, or some sectors of secondary annular alignment component 1618 may have a radially-outward magnetic orientation while other sectors of secondary annular alignment component 1618 have a radially-inward magnetic orientation.

As described above, primary annular alignment component 1616 and secondary annular alignment component 1618 can provide shear forces that promote alignment in the lateral plane so that center point 1601 of primary annular alignment component 1616 aligns with center point 1603 of secondary annular alignment component 1618. However, primary annular alignment component 1616 and secondary annular alignment component 1618 might not provide torque forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 16, a primary rotational alignment component 1622 can be disposed outboard of and spaced apart from primary annular alignment component 1616 while a secondary rotational alignment component 1624 is disposed outboard of and spaced apart from secondary annular alignment component 1618. Secondary rotational alignment component 1624 can be positioned at a fixed distance ($y_0$) from center point 1603 of secondary annular alignment component 1618 and centered between the side edges of portable electronic device 1604 (as indicated by distance $x_0$ from either side edge). Similarly, primary rotational alignment component 1622 can be positioned at the same distance $y_0$ from center point 1601 of primary annular alignment component 1616 and located at a rotational angle that results in a torque profile that favors the desired orientation of portable electronic device 1604 relative to accessory 1602 when secondary rotational alignment component 1624 is aligned with primary rotational alignment component 1622. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 1622 and secondary rotational alignment component 1624 can be implemented using one or more magnets (e.g., rare earth magnets such as NdFeB) each of which has each been magnetized such that its magnetic polarity is oriented in a desired direction. In the example of FIG. 16, the magnets have rectangular shapes; however, other shapes (e.g., rounded shapes) can be substituted. The magnetic orientations of rotational alignment components 1622 and 1624 can be complementary so that when the proximal surfaces of rotational alignment components 1622 and 1624 are near each other, an attractive magnetic force is exerted. This attractive magnetic force can help to rotate portable electronic device 1604 and accessory 1602 into a preferred rotational orientation in which the proximal surfaces of rotational alignment components 1622 and 1624 are aligned with each other. Examples of magnetic orientations for rotational alignment components 1622 and 1624 that can be used to provide a desired attractive force are described below. In some embodiments, primary rotational alignment component 1622 and secondary rotational alignment component 1624 can have the same lateral (xy) dimensions and the same thickness. The dimensions can be chosen based on a desired magnetic field strength and/or torque, the dimensions of devices in which the rotational alignment components are to be deployed, and other design considerations. In some embodiments, the lateral dimensions can be about 6 mm (x direction) by about 16 mm (y direction), and the thickness can be anywhere from about 0.3 mm to about 1.5 mm; the particular dimensions can be chosen based on the sizes of the devices that are to be aligned. In some embodiments, the thickness of the rotational alignment component for a given device can be chosen to match the thickness of an annular alignment component in that device. In some embodiments, each of primary rotational alignment component 1622 and secondary rotational alignment component 1624 can be implemented using two or more rectangular blocks of magnetic material positioned adjacent to each other. As in other embodiments, a small gap may be present between adjacent magnets, e.g., due to manufacturing tolerances.

Figure 17A:
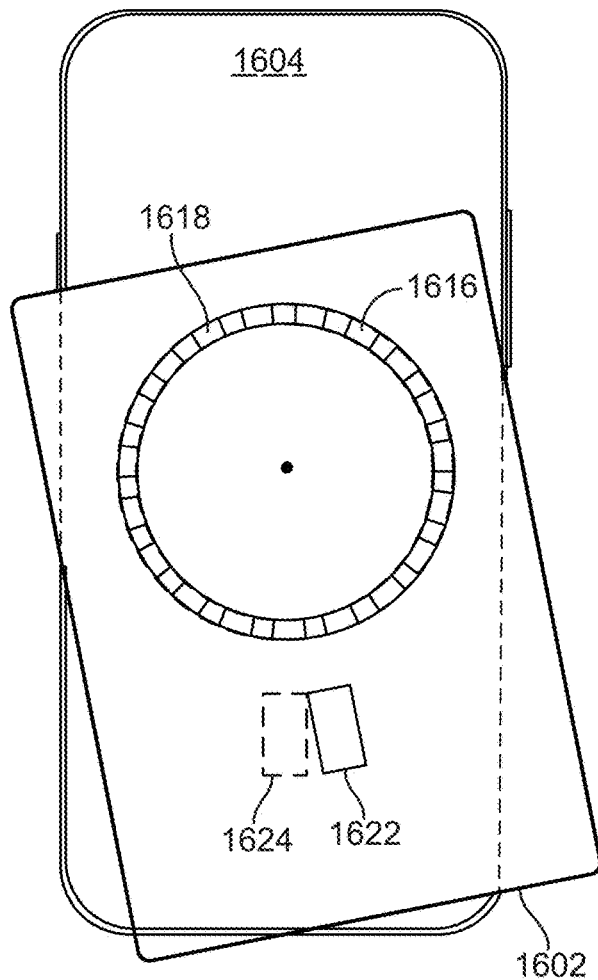
FIGS. 17A and 17B show an example of rotational alignment according to some embodiments.
Figure 17B:
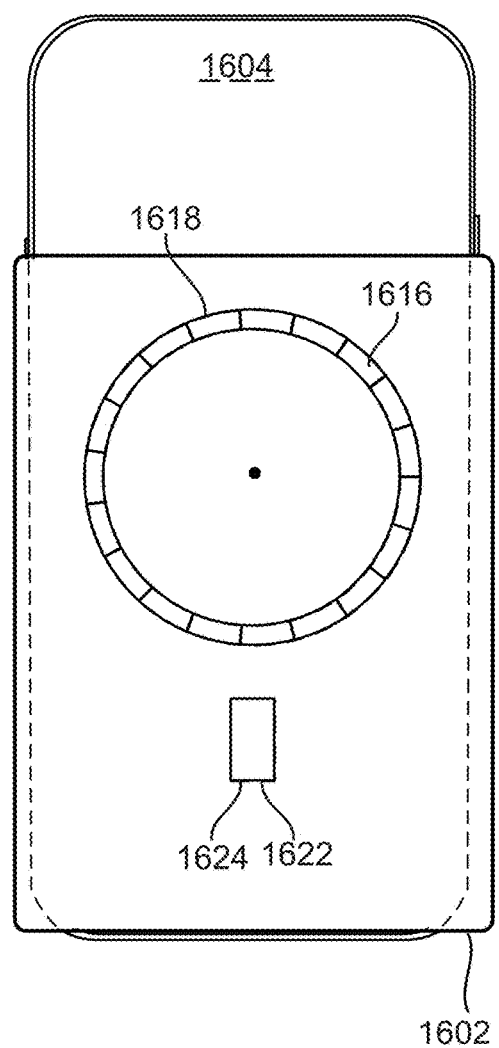

FIGS. 17A and 17B show an example of rotational alignment according to some embodiments. In FIG. 17A, accessory 1602 is placed on the back surface of portable electronic device 1604 such that primary annular alignment component 1616 and secondary alignment component 1618 are aligned with each other in the lateral plane such that, in the view shown, center point 1601 of primary annular alignment component 1616 overlies center point 1603 of secondary annular alignment component 1618. A relative rotation is present such that rotational alignment components 1622 and 1624 are not aligned. In this configuration, an attractive force between rotational alignment components 1622 and 1624 can urge portable electronic device 1604 and accessory 1602 toward a target rotational orientation. In FIG. 17B, the attractive magnetic force between rotational alignment components 1622 and 1624 has brought portable electronic device 1604 and accessory 1602 into the target rotational alignment with the sides of portable electronic device 1604 parallel to the sides of accessory 1602. In some embodiments, the attractive magnetic force between rotational alignment components 1622 and 1624 can also help to hold portable electronic device 1604 and accessory 1602 in a fixed rotational alignment.

Rotational alignment components 1622 and 1624 can have various patterns of magnetic orientations. As long as the magnetic orientations of rotational alignment components 1622 and 1624 are complementary to each other, a torque toward the target rotational orientation can be present when the devices are brought into lateral alignment and close to the target rotational orientation. FIGS. 18A-21B show examples of magnetic orientations for a rotational alignment component according to various embodiments. While the magnetic orientation is shown for only one rotational alignment component, it should be understood that the magnetic orientation of a complementary rotational alignment component can be complementary to the magnetic orientation of shown.

Figures 18A, 18B:
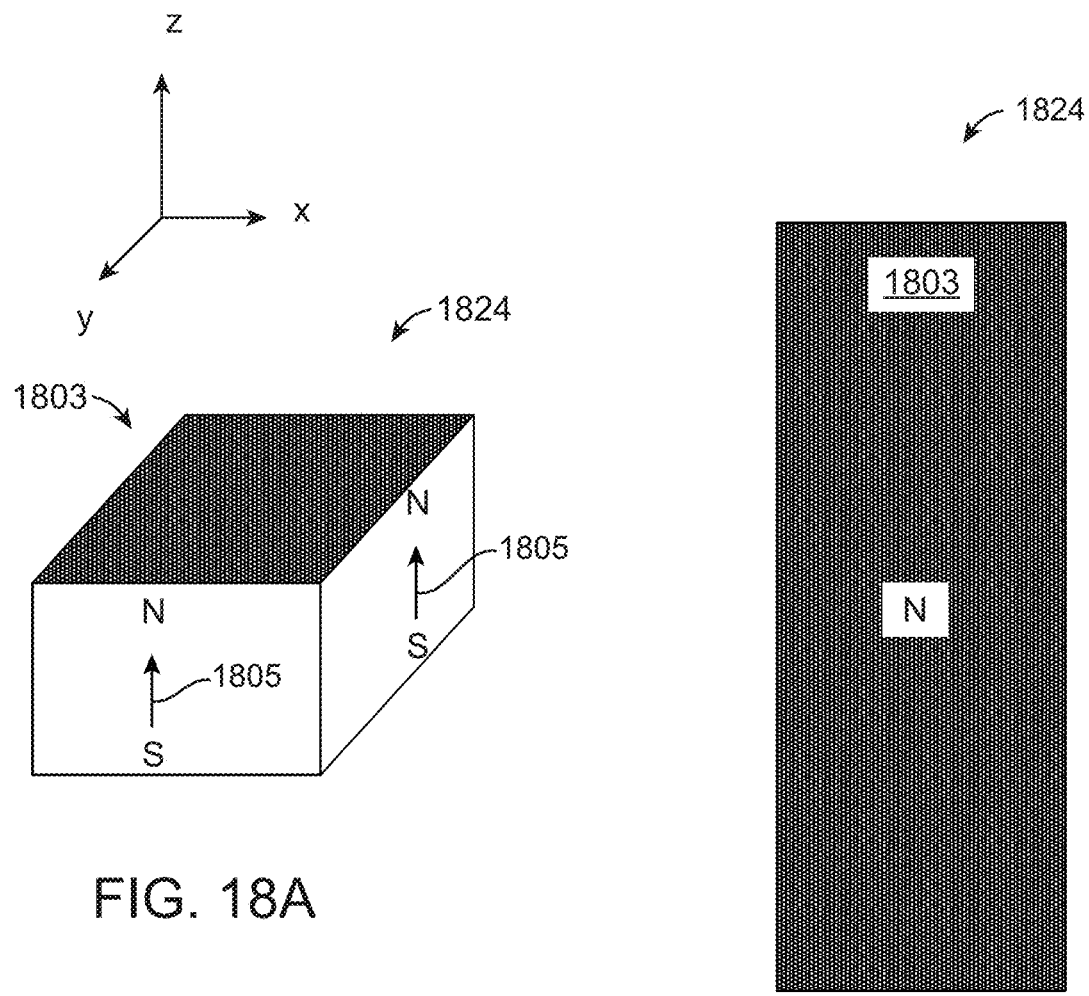
FIGS. 18A and 18B show a perspective view and a top view of a rotational alignment component having a "z-pole" configuration according to some embodiments.

FIGS. 18A and 18B show a perspective view and a top view of a rotational alignment component 1824 having a "z-pole" configuration according to some embodiments. It should be understood that the perspective view is not to any particular scale and that the lateral (xy) dimensions and axial (z) thickness can be varied as desired. As shown in FIG. 18A, rotational alignment component 1824 can have a uniform magnetic orientation along the axial direction, as indicated by arrows 1805. Accordingly, as shown in FIG. 18B, a north magnetic pole (N) may be nearest the proximal surface 1803 of rotational alignment component 1824. A complementary z-pole alignment component can have a uniform magnetic orientation with a south magnetic pole nearest the proximal surface. The z-pole configuration can provide reliable alignment.

Other configurations can provide reliable alignment as well as a stronger, or more salient, "clocking" sensation for the user. A "clocking sensation," in this context, refers to a user-perceptible torque about the common axis of the annular alignment components that urges toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration of FIGS. 18A and 18B.

Figure 19A:
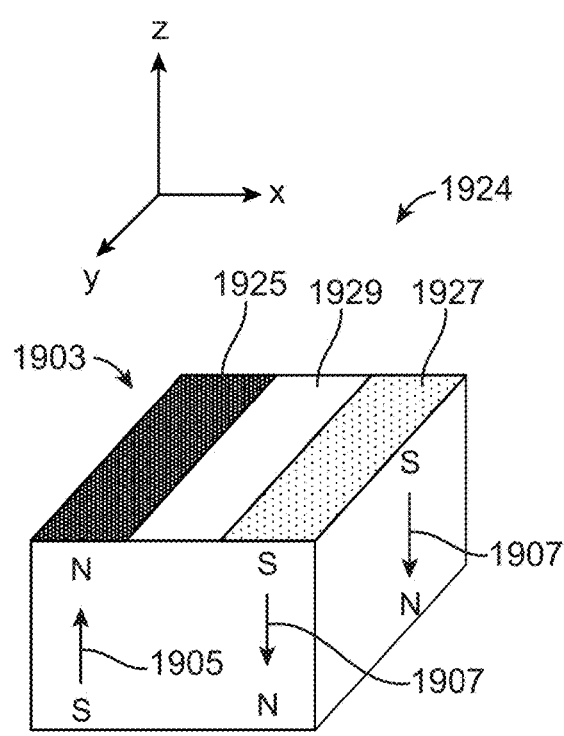
FIGS. 19A and 19B show a perspective view and a top view of a rotational alignment component having a "quadpole" configuration according to some embodiments.
Figure 19B:
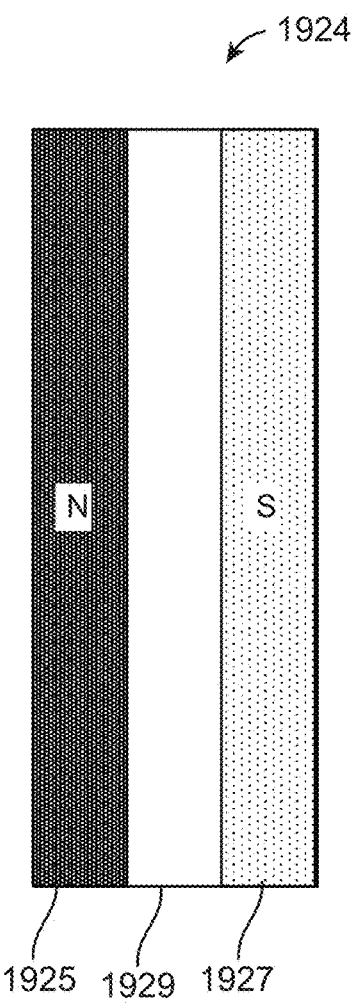

FIGS. 19A and 19B show a perspective view and a top view of a rotational alignment component 1924 having a "quad-pole" configuration according to some embodiments. It should be understood that the perspective view is not to any particular scale and that the lateral (xy) dimensions and axial (z) thickness can be varied as desired. As shown in FIG. 19A, rotational alignment component 1924 has a first magnetized region 1925 with a magnetic orientation along the axial direction such that the north magnetic pole (N) is nearest the proximal (+z) surface 1903 of rotational alignment component 1924 (as indicated by arrow 1905) and a second magnetized region 1927 with a magnetic orientation opposite to the magnetic orientation of the first region such that the south magnetic pole (S) is nearest to proximal surface 1903 (as indicated by arrows 1907). Between magnetized regions 1925 and 1927 is a central region 1929 that is not magnetized. In some embodiments, rotational alignment component 1924 can be formed from a single piece of magnetic material that is exposed to a magnetizer to create regions 1925, 1927, 1929. Alternatively, rotational alignment component 1924 can be formed using two pieces of magnetic material with a nonmagnetic material or an air gap between them. As shown in FIG. 19B, the proximal surface of rotational alignment component 1924 can have one region having a "north" polarity and another region having a "south" polarity. A complementary quad-pole rotational alignment component can have corresponding regions of south and north polarity at the proximal surface.

Figure 20A:
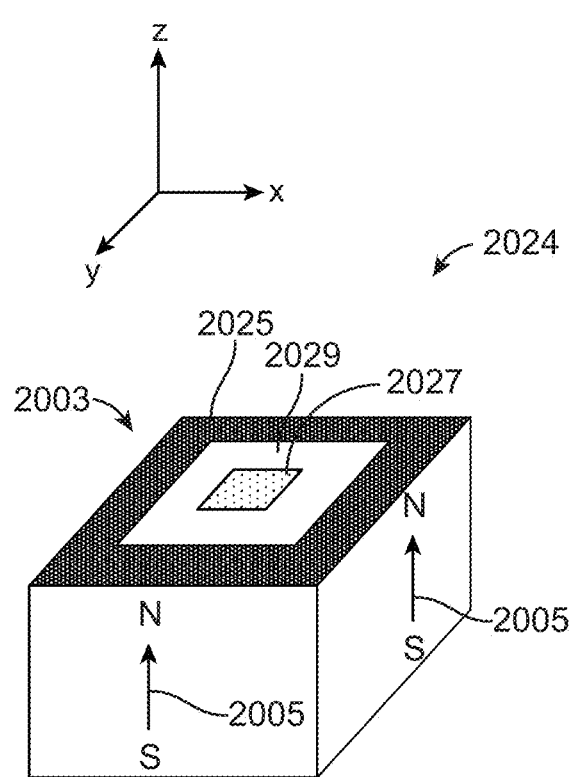
FIGS. 20A and 20B show a perspective view and a top view of a rotational alignment component having an "annulus design" configuration according to some embodiments.
Figure 20B:
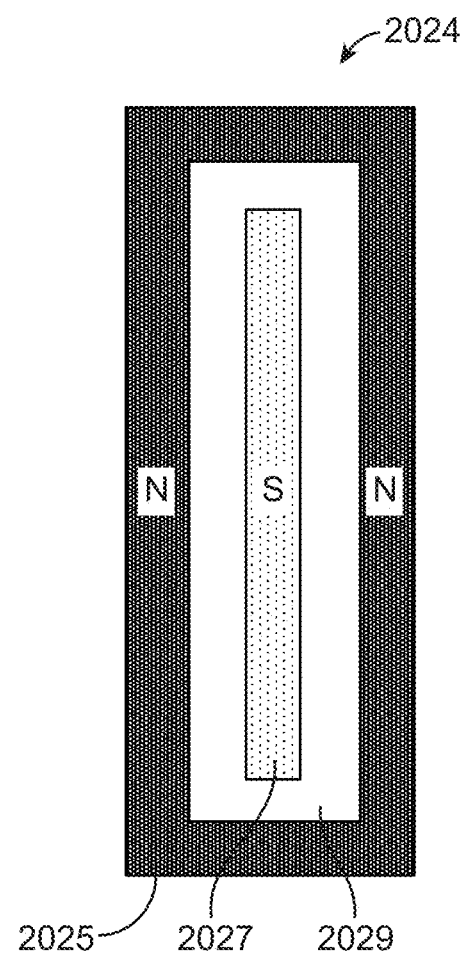

FIGS. 20A and 20B show a perspective view and a top view of a rotational alignment component 2024 having an "annulus design" configuration according to some embodiments. It should be understood that the perspective view is not to any particular scale and that the lateral (xy) dimensions and axial (z) thickness can be varied as desired. As shown in FIG. 20A, rotational alignment component 2024 has an annular outer magnetized region 2025 with a magnetic orientation along the axial direction such that the north magnetic pole (N) is nearest the proximal (+z) surface 2003 of rotational alignment component 2024 (as shown by arrows 2005) and an inner magnetized region 2027 with a magnetic orientation opposite to the magnetic orientation of the first region such that the south magnetic pole (S) is nearest to proximal surface 2003. Between magnetized regions 2025 and 2027 is a neutral annular region 2029 that is not magnetized. In some embodiments, rotational alignment component 2024 can be formed from a single piece of magnetic material that is exposed to a magnetizer to create regions 2025, 2027, 2029. Alternatively, rotational alignment component 2024 can be formed using two or more pieces of magnetic material with a nonmagnetic material or an air gap between them. As shown in FIG. 20B, the proximal surface of rotational alignment component 2024 can have an annular outer region having a "north" polarity and an inner region having a "south" polarity. The proximal surface of a complementary annulus-design rotational alignment component can have an annular outer region of south polarity and an inner region of north polarity.

Figure 21A:
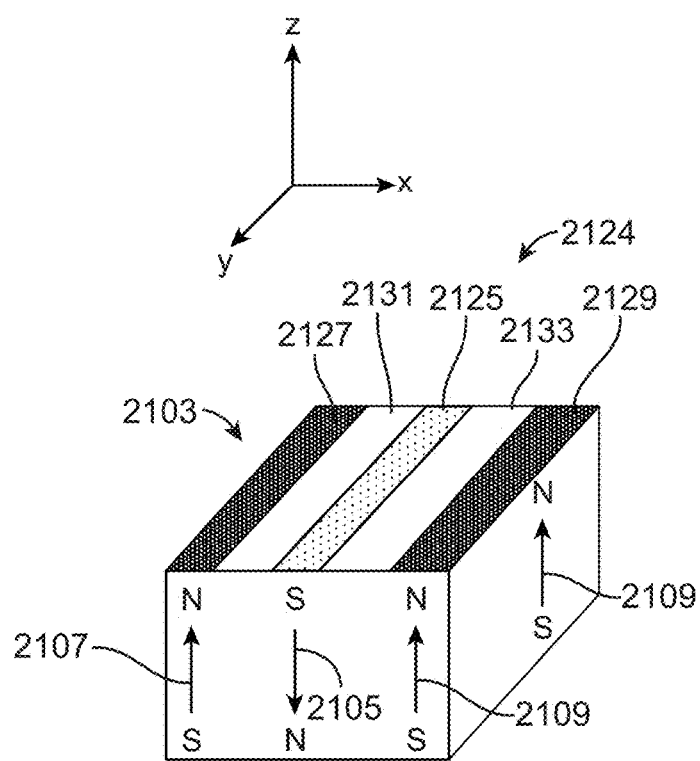
FIGS. 21A and 21B show a perspective view and a top view of a rotational alignment component having a "triple pole" configuration according to some embodiments.
Figure 21B:
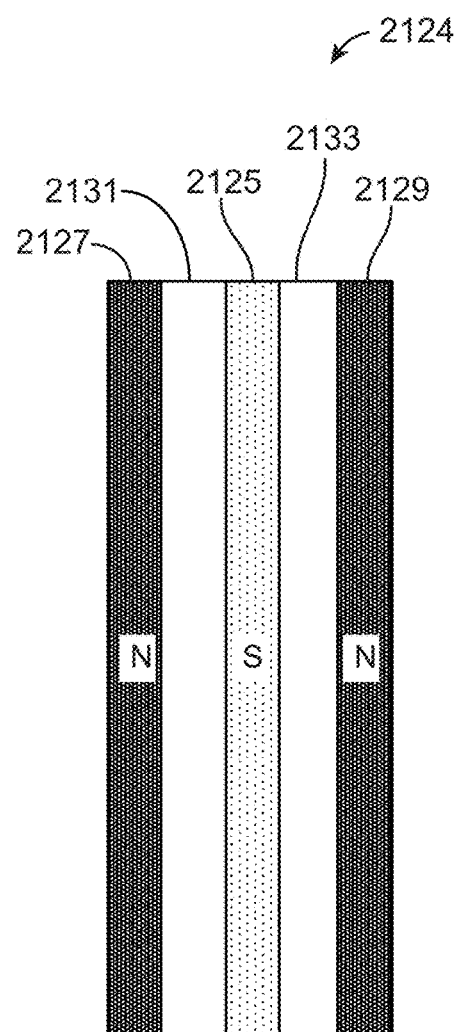

FIGS. 21A and 21B show a perspective view and a top view of a rotational alignment component 2124 having a "triple pole" configuration according to some embodiments. It should be understood that the perspective view is not to any particular scale and that the lateral (xy) dimensions and axial (z) thickness can be varied as desired. As shown in FIG. 21A, rotational alignment component 2124 has a central magnetized region 2125 with a magnetic orientation along the axial direction such that the south magnetic pole (S) is nearest the proximal (+z) surface 2103 of rotational alignment component 2124 (as shown by arrow 2105) and outer magnetized regions 2127, 2129 with a magnetic orientation opposite to the magnetic orientation of central region 2125 such that the north magnetic pole (N) is nearest to proximal surface 2103 (as shown by arrows 2107, 2109). Between central magnetized region 2125 and each of outer magnetized regions 2127, 2129 is a neutral region 2131, 2133 that is not strongly magnetized. In some embodiments, rotational alignment component 2124 can be formed from a single piece of magnetic material that is exposed to a magnetizer to create regions 2125, 2127, 2129. Alternatively, rotational alignment component 2124 can be formed using three (or more) pieces of magnetic material with nonmagnetic materials or air gaps between them. As shown in FIG. 21B, the proximal surface may have a central region having a "south" polarity with an outer region having "north" polarity to either side. The proximal surface of a complementary triple-pole rotational alignment component can have a central region of north polarity with an outer region of south polarity to either side.

It should be understood that the examples in FIGS. 18A-21B are illustrative and that other configurations may be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque profile. For example, as noted above, it may be desirable to provide a salient clocking sensation to a user when close to the desired rotational alignment. The clocking sensation can be a result of torque about a rotational axis defined by the annular alignment components. The amount of torque depends on various factors, including the distance between the axis and the rotational alignment component (distance y0 in FIG. 16) and the length (in the y direction as defined in FIG. 16) of the rotational alignment component, as well as the strength of the magnetic fields of the rotational alignment components (which may depend on the size of the rotational alignment components), the coefficient of friction between the surfaces being aligned, and whether the annular alignment components exert any torque toward a preferred rotational orientation.

Figure 22:
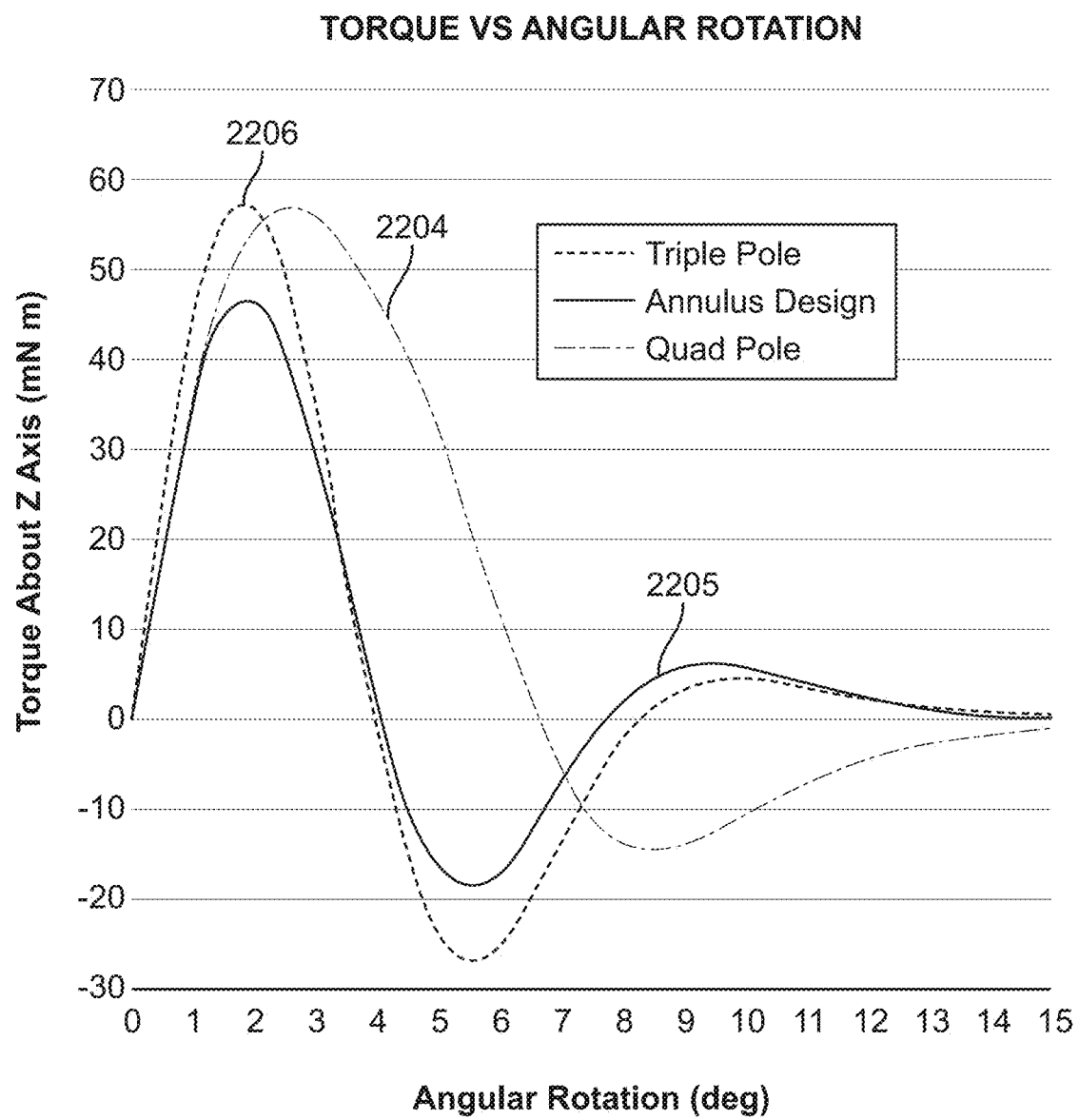
FIG. 22 shows graphs of torque as a function of angular rotation for magnetic alignment systems having rotational alignment components according to various embodiments.

FIG. 22 shows a graph of torque as a function of angular rotation (in degrees) for an alignment system of the kind shown in FIG. 16, for different magnetization configurations of the rotational alignment component according to various embodiments. Angular rotation is defined such that zero degrees corresponds to the target rotational alignment (where the proximal surfaces of rotational angular components 1622 and 1624 are in closest proximity, e.g., as shown in FIG. 17B). Torque is defined such that positive (negative) values indicate force in the direction of decreasing (increasing) rotational angle. For purpose of generating the torque profiles, it is assumed that annular alignment components 1616 and 1618 are rotationally symmetric and do not exert torque about the z axis defined by center points 1601 and 1603. Three different magnetization configurations are considered. Line 2204 corresponds to the quad-pole configuration of FIGS. 19A and 19B. Line 2205 corresponds to the annulus design configuration of FIGS. 20A and 20B. Line 2206 corresponds to the triple-pole configuration of FIGS. 21A and 21B. As shown, the annulus design (line 2205) and triple-pole (line 2206) configurations provide a sharper peak in the torque and therefore a more salient clocking sensation for the user, as compared to the quad-pole configuration (line 2204). In addition, the triple-pole configuration provides a stronger peak torque and therefore a more salient clocking sensation than the annulus-design configuration. (The triple-pole configuration can also provide reduced flux leakage as compared to other configurations.) It should be understood that the numerical values in FIG. 22 are illustrative, and that torque in a particular embodiment may depend on a variety of other factors in addition to the magnetization configuration, such as the magnet volume, aspect ratio, and distance $y_0$ from the center of the annular alignment component.

Figure 23:
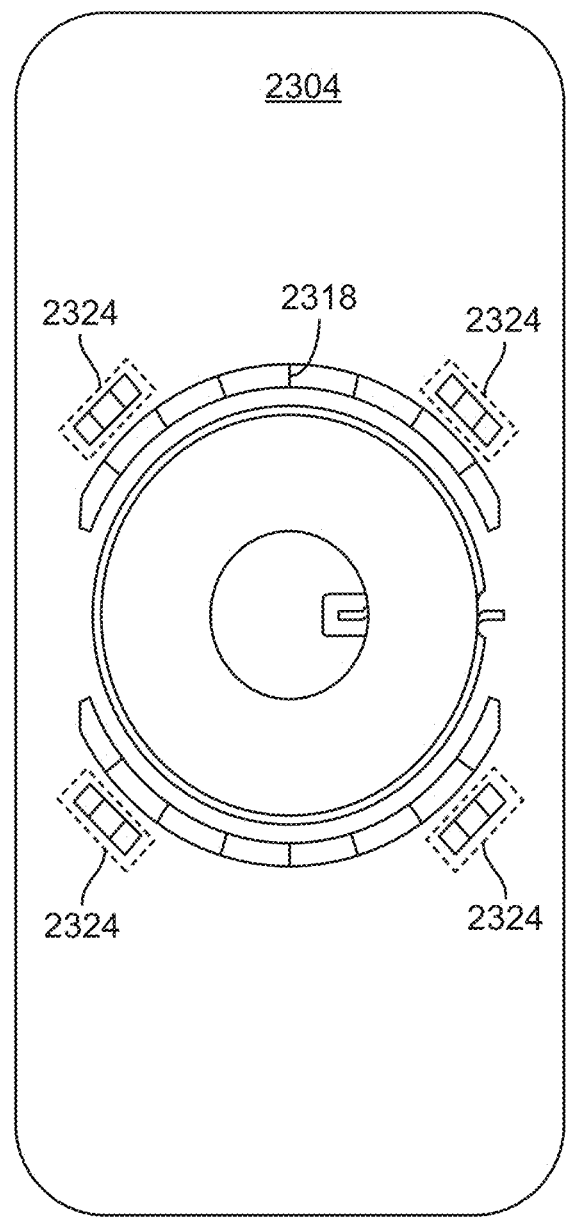
FIG. 23 shows a portable electronic device having an alignment system with multiple rotational alignment components according to some embodiments.

In the example shown in FIG. 16, a single rotational alignment component is placed outboard of the annular alignment component at a distance $y_0$ from the center of the annular alignment component. This arrangement allows a single magnetic element to generate torque that produces a salient clocking sensation for a user aligning devices. In some embodiments, other arrangements are also possible. For example, FIG. 23 shows a portable electronic device 2304 having an alignment system 2300 with multiple rotational alignment components according to some embodiments. In this example, alignment system 2300 includes an annular alignment component 2318 and a set of rotational alignment components 2324 positioned at various locations around the perimeter of annular alignment component 2318. In this example, there are four rotational alignment components 2324 positioned at angular intervals of approximately 90 degrees. In other embodiments, different numbers and spacing of rotational alignment components can be used. Each rotational alignment component 2324 can have any of the magnetization configurations described above, including z-pole, quad-pole, triple-pole, or annulus-design configurations, or a different configuration. Further, different rotational alignment components 2324 can have different magnetization configurations from each other. It should be noted that rotational alignment components 2324 can be placed close to the perimeter of annular alignment component 2318, and the larger number of magnetic components can provide sufficient torque with a shorter lever arm. Complementary rotational alignment components can be disposed around the outer perimeter of any type of annular alignment component (e.g., primary alignment components, secondary alignment components, or annular alignment components as described herein).

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 1604 of FIG. 16 can align rotationally to accessory 1602 (which has both annular alignment component 1616 and rotational alignment component 1622) as well as aligning laterally to another accessory (such as wireless charger device 400 of FIG. 4) that has annular alignment component 1616 but not rotational alignment component 1622. In the latter case, lateral alignment can be achieved, e.g., to support efficient wireless charging, but there may be no preferred rotational alignment, or rotational alignment may be achieved using a nonmagnetic feature (e.g., a mechanical retention feature such as a ledge, a clip, a notch, or the like). A rotational magnetic alignment component can be used together with any type of annular magnetic alignment component (e.g., primary annular magnetic alignment components, secondary annular magnetic alignment components, or auxiliary annular magnetic alignment components as described below).

3. Primary, Secondary, and Auxiliary Annular Magnetic Alignment Components

3.1. Overview of Three-Component Magnetic Alignment Systems

In some embodiments, a magnetic alignment system can align more than two devices. Examples of magnetic alignment systems with three annular alignment components (referred to as primary, secondary, and auxiliary annular magnetic alignment components) will now be described. It should be understood that the primary and secondary annular magnetic alignment components described in this section can be identical to primary and secondary annular magnetic alignment components described above and that a given pair primary and secondary annular magnetic alignment components can be used with or without an auxiliary annular magnetic alignment component. It should also be understood that a system where alignment is desired may include more than three devices and that additional auxiliary annular alignment components can be provided to facilitate alignment of more than three devices.

Figure 24:
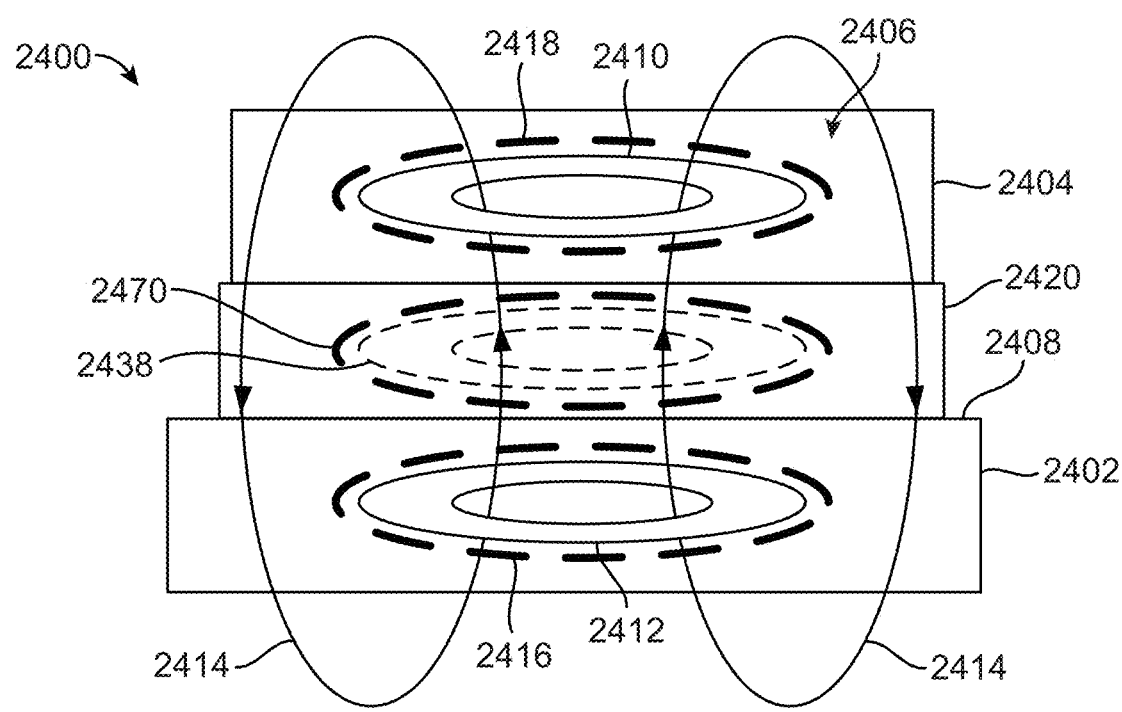
FIG. 24 shows a simplified representation of a wireless charging system incorporating a magnetic alignment system according to some embodiments.

FIG. 24 shows a simplified representation of a wireless charging system 2400 incorporating a three-component magnetic alignment system 2406 according to some embodiments. Wireless charging system 2400 includes a portable electronic device 2404, a wireless charger device 2402, and an accessory 2420 positioned between portable electronic device 2404 and wireless charger device 2402. Portable electronic device 2404 can be a consumer electronic device, such as a smart phone, tablet, wearable device, or the like, or any other electronic device for which wireless charging is desired. Wireless charger device 2402 can be any device that is configured to generate time-varying magnetic flux to induce a current in a suitably configured receiving device. For instance, wireless charger device 2402 can be a wireless charging mat, puck, docking station, or the like. Wireless charger device 2402 can include or have access to a power source such as battery power or standard AC power.

To enable wireless power transfer, portable electronic device 2404 and wireless charger device 2402 can include inductive coils 2410 and 2412, respectively, which can operate to transfer power between them. For example, inductive coil 2412 can be a transmitter coil that generates a time-varying magnetic flux 2414, and inductive coil 2410 can be a receiver coil in which an electric current is induced in response to time-varying magnetic flux 2414. The received electric current can be used to charge a battery of portable electronic device 2404, to provide operating power to a component of portable electronic device 2404, and/or for other purposes as desired. In some embodiments, wireless power transfer between wireless charger device 2402 and portable electronic device 2404 can occur regardless of whether accessory 2420 is present.

Accessory 2420 can be an accessory that is used with portable electronic device 2404 to protect, enhance, and/or supplement the aesthetics and/or functions of portable electronic device 2404. For example, accessory 2420 can be a protective case, an external battery pack, a camera attachment, or any other charge-through accessory. In some embodiments, accessory 2420 can include one or more wireless charging coils 2438. For example, accessory 2420 can be a portable external battery pack that can be attached to and carried together with portable electronic device 2404. In some embodiments, accessory 2420 can operate wireless charging coil 2438 as a receiver coil to charge its onboard battery (e.g., from wireless charger device 2402) or as a transmitter coil to provide power to portable electronic device 2404. In some embodiments, accessory 2420 cam include separate transmitter and receiver coils 2438. Accessory 2420 can operate coil(s) 2438 to transmit power or to receive and store power depending on current conditions. In still other embodiments, accessory 2420 can be an "unpowered" or "passive" accessory such as a case that contains no active circuitry, and wireless charging coil 2438 can be omitted. In such cases, accessory 2420 can be designed not to inhibit wireless power transfer between wireless charger device 2402 and portable electronic device 2404. For instance, relevant portions of accessory 2420 can be made of a material such as plastic, leather, or other material that is transparent to time-varying magnetic flux 2414.

To enable efficient wireless power transfer, it is desirable to align inductive coils 2412 and 2410 (and coil 2438 in embodiments where coil 2438 is present). According to some embodiments, magnetic alignment system 2406 can provide such alignment. In the example shown in FIG. 24, magnetic alignment system 2406 includes a primary magnetic alignment component 2416 disposed within or on a surface of wireless charger device 2402, a secondary magnetic alignment component 2418 disposed within or on a surface of portable electronic device 2402, and an auxiliary magnetic alignment component 2470 disposed within or on a surface of accessory 2420. Primary, secondary, and auxiliary magnetic alignment components 2416, 2418, and 2470 are configured to magnetically attract one another into an aligned position in which inductive coils 2410 and 2412 (and/or 2438 if present) are aligned with one another to provide efficient wireless power transfer.

Magnetic alignment system 2406 can enable modularity in that various types of accessories 2420 can align with primary and/or secondary magnetic alignment components 2416, 2418, provided that accessory 2420 includes auxiliary alignment component 2470. For instance, in some embodiments (e.g., where accessory 2420 is a protective case), accessory 2420 can mechanically couple to portable electronic device 2404 in a fixed position such that auxiliary magnetic alignment component 2470 is aligned with secondary magnetic alignment component 2418, and portable electronic device 2404 can rely wholly or partially on auxiliary magnetic alignment component 2470 to align with primary alignment component 2418 of wireless charger device 2402. Accordingly, when accessory 2420 is positioned on charging surface 2408 of wireless charger device 2402 such that primary alignment component 2416 is aligned with auxiliary alignment component 2470, secondary alignment component 2418 of portable electronic device 2404 is also aligned with primary alignment component 2416, and efficient wireless power transfer is supported.

As another example, in some embodiments where accessory 2420 is an external battery, auxiliary alignment component 2470 can attract to and align with secondary alignment component 2418 so that power from an internal power source (not shown) within accessory 2420 can be wirelessly transferred to portable electronic device 2404 using inductive coil 2438 and inductive coil 2410. The modularity of magnetic alignment system 2406 can also enable wireless charger device 2402 to stack with portable electronic device 2404 and accessory 2420. For example, auxiliary alignment component 2470 can attract and align to secondary alignment component 2418 and at the same time can attract and align to primary alignment component 2416. Accordingly, when portable electronic device 2404, accessory 2420, and wireless charger device 2402 are all stacked together, power can be transmitted wirelessly from wireless charger device 2402 to accessory 2420 (e.g., to charge an internal battery of accessory 2420) and from accessory 2420 to portable electronic device 2404. Both power transfers can be performed simultaneously; i.e., wireless charger device 2402 can provide power to accessory 2420 at the same time that accessory 2420 provides power to portable electronic device 2404. In some embodiments, to enable simultaneous power transfers, accessory 2420 can include two inductive coils 2438, one for receiving power and one for transmitting power. In other embodiments, the power transfers can be performed sequentially; e.g., wireless charger device 2402 can provide power to accessory 2420, and at a time when wireless charger device 2402 is not providing power, accessory 2420 can provide power to portable electronic device 2404.

FIG. 24 is illustrative and not limiting. For example, while FIG. 24 shows three devices stacked together, it should be understood that the same principles can be applied to form systems of four or more devices. For instance, a wireless charging system can include a portable electronic device coupled to a protective case that is attached to and magnetically aligned with an external battery, which is attached to and magnetically aligned to a wireless charger device. All the inductive coils within the respective devices can be aligned together, and wireless power can be transmitted between the wireless charger device and the external battery, between the battery and the portable electronic device, and/or between the wireless charger device and the portable electronic device. It is to be appreciated that any number of devices can be stacked together without departing from the spirit and scope of the present disclosure.

According to embodiments described herein, an alignment component (including a primary, secondary, or auxiliary alignment component) of a magnetic alignment system can be formed of arcuate magnets arranged in an annular configuration. In some embodiments, each magnet can have its magnetic polarity oriented in a desired direction so that magnetic attraction between the primary, secondary, and auxiliary alignment components provides a desired alignment. In some embodiments, an arcuate magnet can include a first magnetic region with magnetic polarity oriented in a first direction and a second magnetic region with magnetic polarity oriented in a second direction different from the first direction. As will be described, different configurations can provide different degrees of magnetic field leakage.

3.2. Magnetic Alignment Systems with a Single Axial Magnetic Orientation

Figure 25A:
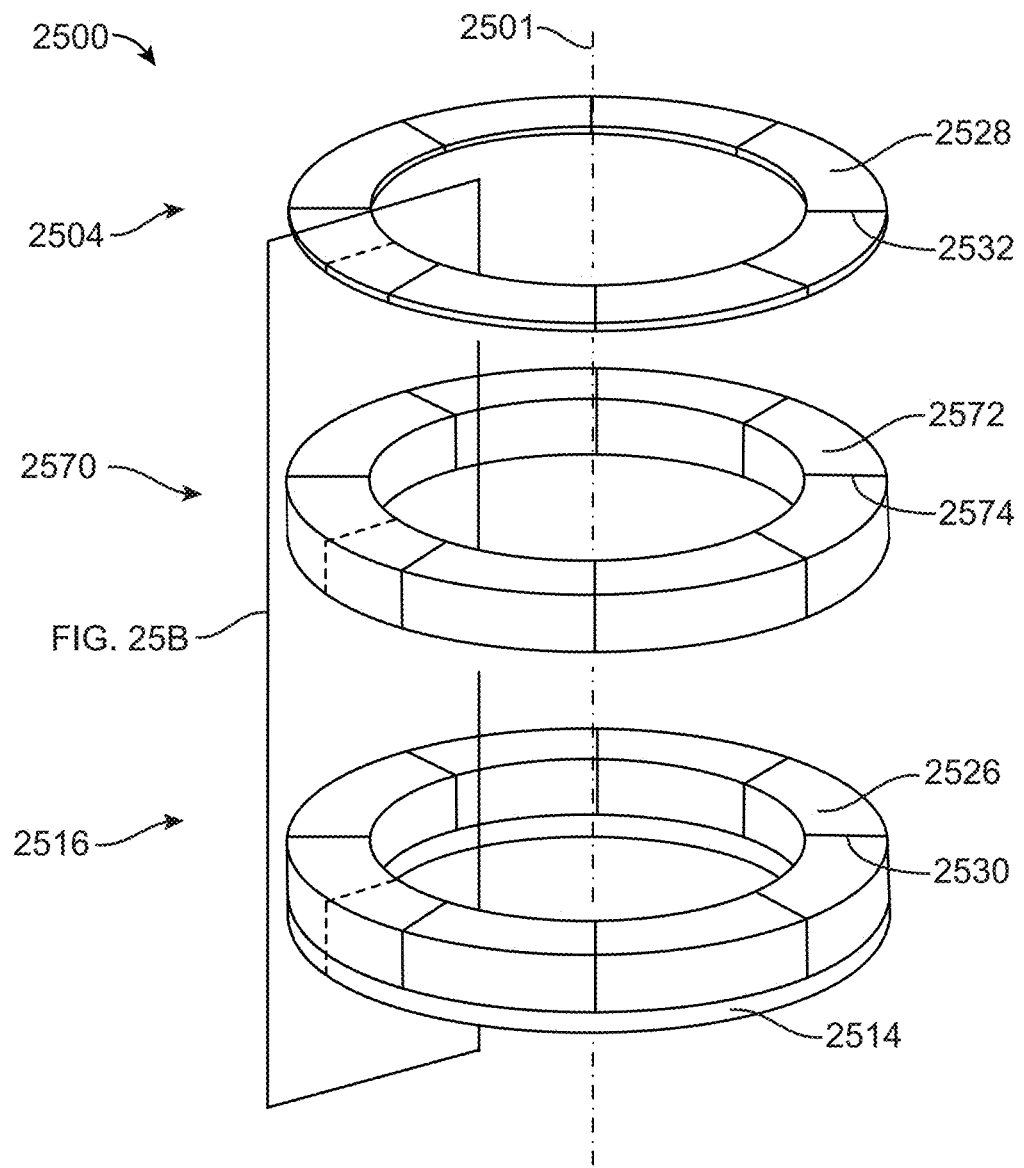
FIG. 25A shows a perspective view of a magnetic alignment system according to some embodiments.
Figure 25B:
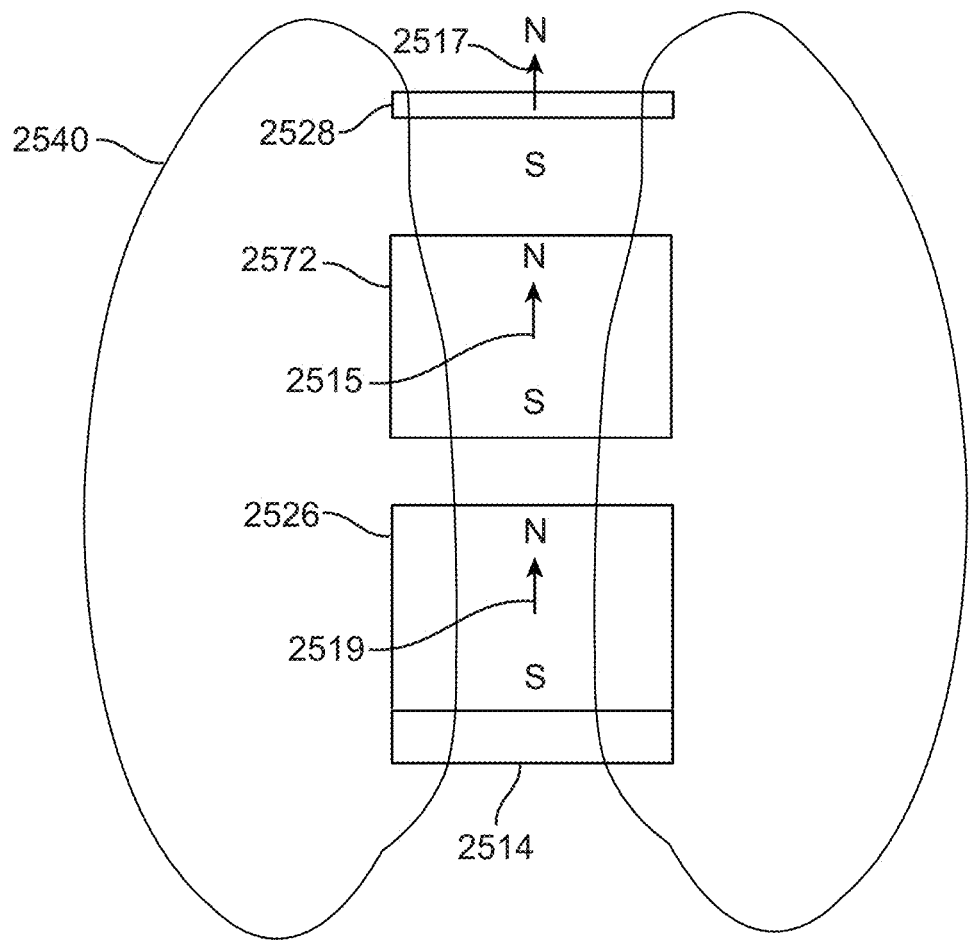
FIG. 25B shows a cross-section through the magnetic alignment system of FIG. 25A.

FIG. 25A shows a perspective view of a magnetic alignment system 2500 according to some embodiments, and FIG. 25B shows a cross-section through magnetic alignment system 2500 across the cut plane indicated in FIG. 25A. Magnetic alignment system 2500 can be an implementation of magnetic alignment system 2406 of FIG. 24. In magnetic alignment system 2500, the alignment components all have magnetic polarity oriented in the same direction (along the axis of the annular configuration).

As shown in FIG. 25A, magnetic alignment system 2500 can include a primary alignment component 2516 (which can be an implementation of primary alignment component 2416 of FIG. 24), a secondary alignment component 2518 (which can be an implementation of secondary alignment component 2418 of FIG. 24), and an auxiliary alignment component 2570 (which can be an implementation of auxiliary alignment component 2470 described above). Primary alignment component 2516, secondary alignment component 2518, and auxiliary alignment component 2570 have annular shapes and may also be referred to as "annular" alignment components. The particular dimensions can be chosen as desired. In some embodiments, the dimensions can be similar to example values given above in section 1.

Primary alignment component 2516 can include a number of sectors, each of which can be formed of one or more primary arcuate magnets 2526. Secondary alignment component 2518 can include a number of sectors, each of which can be formed of one or more secondary arcuate magnets 2528. Auxiliary alignment component 2470 can include a number of sectors, each of which can be formed of one or more auxiliary arcuate magnets 2572. In the example shown, the number of primary magnets 2526 is equal to the number of secondary magnets 2528 and to the number of auxiliary magnets 2572, and each sector includes exactly one magnet, but this is not required. Primary magnets 2526, secondary magnets 2528, and auxiliary magnets 2572 can have arcuate (or curved) shapes in the transverse plane such that when primary magnets 2526 (or secondary magnets 2528 or auxiliary magnets 2572) are positioned adjacent to one another end-to-end, primary magnets 2526 (or secondary magnets 2528 or auxiliary magnets 2572) form an annular structure as shown. In some embodiments, primary magnets 2526 can be in contact with each other at interfaces 2530, secondary magnets 2528 can be in contact with each other at interfaces 2532, and auxiliary magnets 2572 can be in contact with each other at interfaces 2574. Alternatively, small gaps or spaces may separate adjacent primary magnets 2526 or adjacent secondary magnets 2528 or adjacent auxiliary magnets 2572, providing a greater degree of tolerance during manufacturing.

In some embodiments, primary alignment component 2516 can also include an annular shield 2514 disposed on a distal surface of primary magnets 2526. In some embodiments, shield 2514 can be formed as a single annular piece of material and adhered to primary magnets 2526 to secure primary magnets 2526 into position. Shield 2514 can be formed of a material that has high magnetic permeability and/or high magnetic saturation value, such as stainless steel or low-carbon steel, and can redirect magnetic fields to prevent them from propagating beyond the distal side of primary alignment component 2516, thereby protecting sensitive electronic components located beyond the distal side of primary alignment component 2516 from magnetic interference.

Primary magnets 2526, secondary magnets 2528, and auxiliary magnets 2572 can be made of a magnetic material such as an NdFeB material, other rare earth magnetic materials, or other materials that can be magnetized to create a persistent magnetic field. Each primary magnet 2526, each secondary magnet 2528, and each auxiliary magnet 2572 can have a monolithic structure having a single magnetic region with a magnetic polarity aligned in the axial direction as shown by magnetic polarity indicators 2515, 2517, 2519 in FIG. 25B. For example, each primary magnet 2526, each secondary magnet 2528, and each auxiliary magnet 2572 can be a bar magnet that has been ground and shaped into an arcuate structure having an axial magnetic orientation. In the example shown, primary magnet 2526 has its north pole oriented toward the proximal surface and south pole oriented toward the distal surface, secondary magnet 2528 has its south pole oriented toward the proximal surface and north pole oriented toward the distal surface, and auxiliary magnet 2572 has a corresponding magnetic orientation such that the north pole of auxiliary magnet 2572 is oriented toward the proximal surface of secondary magnet 2528 and the south pole of auxiliary magnet 2572 is oriented toward the proximal surface of primary magnet 2526. In other embodiments, the magnetic orientations can be reversed such that primary magnet 2526 has its south pole oriented toward the proximal surface and north pole oriented toward the distal surface while secondary magnet 2528 has its north pole oriented toward the proximal surface and south pole oriented toward the distal surface and auxiliary magnet 2572 has a corresponding magnetic orientation such that the south pole of auxiliary magnet 2572 is oriented toward the proximal surface of secondary magnet 2528 and the north pole of auxiliary magnet 2572 is oriented toward the proximal surface of primary magnet 2526.

As shown in FIG. 25B, the axial magnetic orientations of primary magnet 2526, auxiliary magnet 2572, and secondary magnet 2528 can generate magnetic fields 2540 that exert attractive forces between primary magnet 2526 and auxiliary magnet 2572 and between auxiliary magnet 2572 and secondary magnet 2528, thereby facilitating alignment between respective devices in which primary alignment component 2516, auxiliary alignment component 2570, and secondary alignment component 2518 are disposed (e.g., as shown in FIG. 24). While shield 2514 can redirect some of magnetic fields 2540 away from regions below primary magnet 2526, magnetic fields 2540 may still propagate to regions laterally adjacent to primary magnet 2526 and secondary magnet 2528. In some embodiments, the lateral propagation of magnetic fields 2540 may result in magnetic field leakage to other magnetically sensitive components. For instance, if an inductive coil having a ferromagnetic shield is placed in the interior (or inboard) region of annular primary alignment component 2516 (or secondary alignment component 2518), leakage of magnetic fields 2540 may saturate the ferrimagnetic shield, which can degrade wireless charging performance.

It will be appreciated that magnetic alignment system 2500 is illustrative and that variations and modifications are possible. For instance, while primary alignment component 2516, auxiliary alignment component 2570, and secondary alignment component 2518 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, primary alignment component 2516 and/or secondary alignment component 2518 and/or auxiliary alignment component 2570 can each be formed of a single, monolithic annular magnet; however, segmenting alignment components 2516, 2518, and 2570 into arcuate magnets may improve manufacturing, as described above with reference to FIGS. 3A and 3B.

3.3. Magnetic Alignment Systems with Closed-Loop Magnetic Configurations

As noted above with reference to FIG. 25B, a magnetic alignment system with a single axial magnetic orientation may allow lateral leakage of magnetic fields, which may adversely affect performance of other components of an electronic device. Accordingly, some embodiments provide magnetic alignment systems with a closed-loop magnetic configuration that reduces magnetic field leakage. Examples will now be described.

Figure 26A:
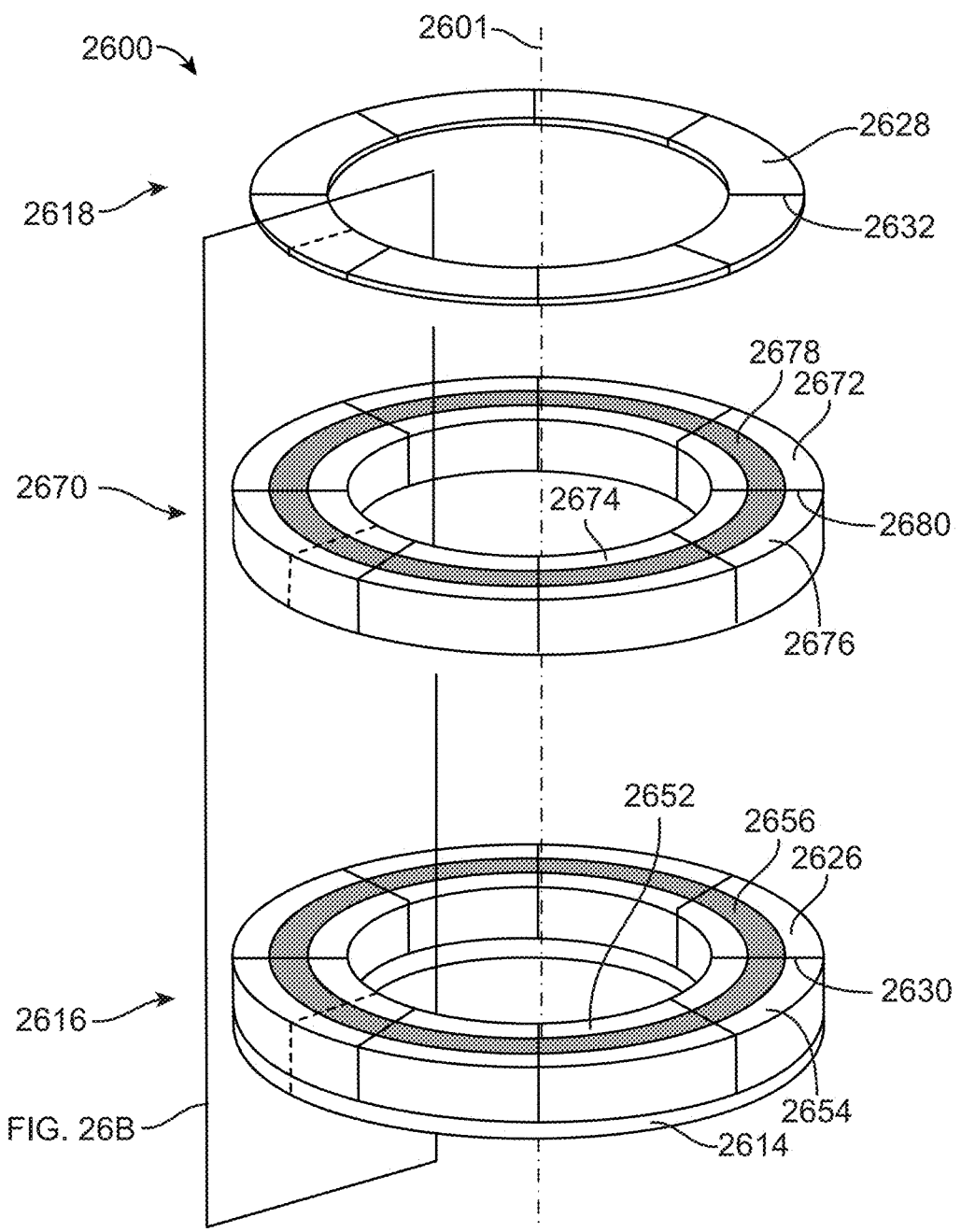
FIG. 26A shows a perspective view of a magnetic alignment system according to some embodiments.
Figure 26B:
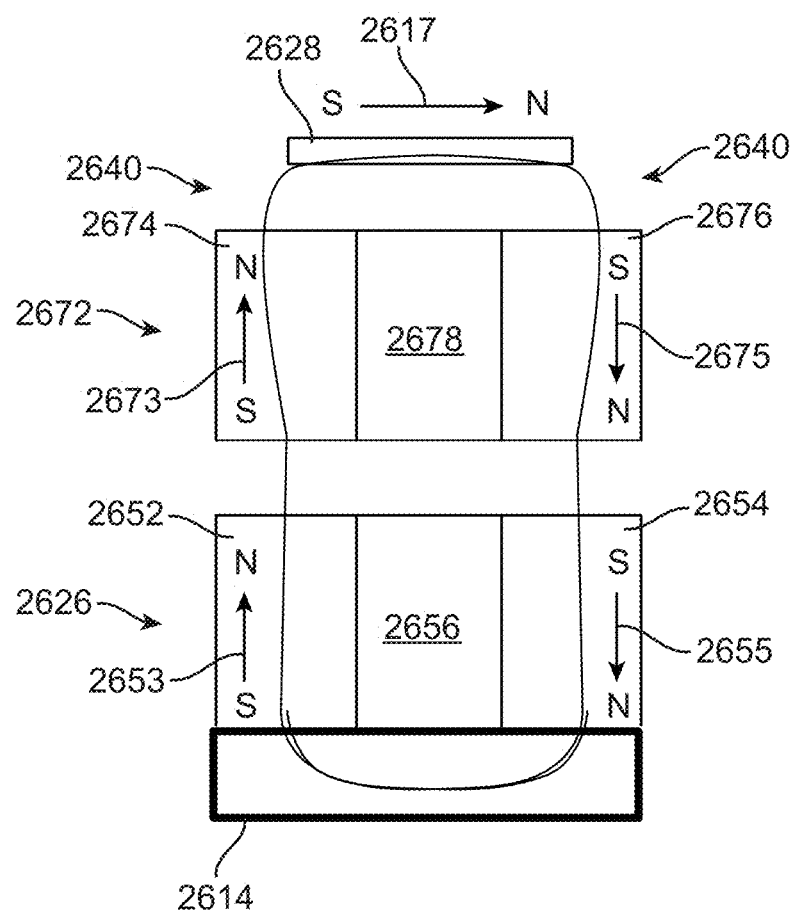
FIG. 26B shows a cross-section through the magnetic alignment system of FIG. 26A.

FIG. 26A shows a perspective view of a magnetic alignment system 2600 according to some embodiments, and FIG. 26B shows a cross-section through magnetic alignment system 2600 across the cut plane indicated in FIG. 26A. Magnetic alignment system 2600 can be an implementation of magnetic alignment system 2406 of FIG. 24. In magnetic alignment system 2600, the alignment components have magnetic components configured in a "closed loop" configuration as described below.

As shown in FIG. 26A, magnetic alignment system 2600 can include a primary alignment component 2616 (which can be an implementation of primary alignment component 2416 of FIG. 24), a secondary alignment component 2618 (which can be an implementation of secondary alignment component 2418 of FIG. 24), and an auxiliary alignment component 2670 (which can be an implementation of auxiliary alignment component 2470 of FIG. 24). Primary alignment component 2616, secondary alignment component 2618, and auxiliary alignment component 2670 have annular shapes and may also be referred to as "annular" alignment components. The particular dimensions can be chosen as desired. In some embodiments, the dimensions can be similar to example values given above in section 1.

Primary alignment component 2616 can include a number of sectors, each of which can be formed of a number of primary magnets 2626; secondary alignment component 2618 can include a number of sectors, each of which can be formed of a number of secondary magnets 2628; and auxiliary alignment component 2670 can include a number of sectors, each of which can be formed of a number of auxiliary magnets 2672. In the example shown, the number of primary magnets 2626 is equal to the number of secondary magnets 2628 and to the number of auxiliary magnets 2672, and each sector includes one magnet, but this is not required. Primary magnets 2626, secondary magnets 2628, and auxiliary magnets 2672 can have arcuate (or curved) shapes in the transverse plane such that when primary magnets 2626 (or secondary magnets 2628 or auxiliary magnets 2672) are positioned adjacent to one another end-to-end, primary magnets 2626 (or secondary magnets 2628 or auxiliary magnets 2672) form an annular structure as shown. In some embodiments, adjacent primary magnets 2626 can be in contact with each other at interfaces 2630, adjacent secondary magnets 2628 can be in contact with each other at interfaces 2632, and adjacent auxiliary magnets 2672 can be in contact with each other at interfaces 2680. Alternatively, small gaps or spaces may separate adjacent primary magnets 2626, adjacent secondary magnets 2628, or adjacent auxiliary magnets 2672, providing a greater degree of tolerance during manufacturing.

In some embodiments, primary alignment component 2616 can also include an annular shield 2614 disposed on a distal surface of primary magnets 2626. In some embodiments, shield 2614 can be formed as a single annular piece of material and adhered to primary magnets 2626 to secure primary magnets 2626 into position. Shield 2614 can be formed of a material that has high magnetic permeability, such as stainless steel, and can redirect magnetic fields to prevent them from propagating beyond the distal side of primary alignment component 2616, thereby protecting sensitive electronic components located beyond the distal side of primary alignment component 2616 from magnetic interference. In some embodiments, auxiliary alignment component 2670 does not include a similar shield, so that a stronger magnetic attraction with primary alignment component 2616 can be provided.

Primary magnets 2626, secondary magnets 2628, and auxiliary magnets 2672 can be made of a magnetic material such as an NdFeB material, other rare earth magnetic materials, or other materials that can be magnetized to create a persistent magnetic field. Each secondary magnet 2628 can have a single magnetic region with a magnetic polarity having a component in the radial direction in the transverse plane (as shown by magnetic polarity indicator 2617 in FIG. 26B). As described below, the magnetic orientation can be in a radial direction with respect to axis 2601 or another direction having a radial component in the transverse plane. Each primary magnet 2626 can include two magnetic regions having opposite magnetic orientations. For example, each primary magnet 2626 can include an inner arcuate magnetic region 2652 having a magnetic orientation in a first axial direction (as shown by polarity indicator 2653 in FIG. 26B), an outer arcuate magnetic region 2654 having a magnetic orientation in a second axial direction opposite the first direction (as shown by polarity indicator 2655 in FIG. 26B), and a central non-magnetized region 2656 that does not have a magnetic orientation. Central non-magnetized region 2656 can magnetically separate inner arcuate region 2652 from outer arcuate region 2654 by inhibiting magnetic fields from directly crossing through center region 2656. Similarly, each auxiliary magnet 2672 can include two magnetic regions having opposite magnetic orientations. For example, each auxiliary magnet 2672 can include an inner arcuate magnetic region 2674 having a magnetic orientation in a first axial direction (as shown by polarity indicator 2673 in FIG. 26B), an outer arcuate magnetic region 2676 having a magnetic orientation in a second axial direction opposite the first direction (as shown by polarity indicator 2675 in FIG. 26B), and a central non-magnetized region 2678 that does not have a magnetic orientation. Central non-magnetized region 2678 can magnetically separate inner arcuate region 2674 from outer arcuate region 2676 by inhibiting magnetic fields from directly crossing through center region 2678.

In some embodiments, each secondary magnet 2626 can be made of a magnetic material that has been ground and shaped into an arcuate structure, and a magnetic orientation having a radial component in the transverse plane can be created, e.g., using a magnetizer. Similarly, each primary magnet 2626 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 2626 can be a compound structure with two arcuate pieces of magnetic material providing inner arcuate magnetic region 2652 and outer arcuate magnetic region 2654; in such embodiments, central non-magnetized region 2656 can be formed of an arcuate piece of nonmagnetic material or formed as an air gap defined by sidewalls of inner arcuate magnetic region 2652 and outer arcuate magnetic region 2654. Any manufacturing technique that can be used to form primary magnets 2626 can also be used to form auxiliary magnets 2672. Thus, each auxiliary magnet 2672 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each auxiliary magnet 2672 can be a compound structure with two arcuate pieces of magnetic material providing inner arcuate magnetic region 2674 and outer arcuate magnetic region 2676; in such embodiments, central non-magnetized region 2678 can be formed of an arcuate piece of nonmagnetic (or demagnetized) material or formed as an air gap defined by sidewalls of inner arcuate magnetic region 2674 and outer arcuate magnetic region 2676. It should be understood that in some embodiments one manufacturing technique can be used for primary magnets 2626 while a different manufacturing technique can be used for auxiliary magnets 2672; for example, each auxiliary magnet 2672 can be monolithic while each primary magnet 2626 is a compound structure. As long as the magnetic fields of the various magnets align as described, alignment between devices can be provided. Further, as described above with reference to FIGS. 3A and 3B, the inner and outer arcuate magnetic regions of a quad-pole primary or auxiliary arcuate magnet can but need not have equal magnetic field strength; asymmetric polarization as described above can be applied.

As shown in FIG. 26B, inner arcuate magnetic region 2652 of primary magnet 2626 and inner arcuate magnetic region 2674 of auxiliary magnet 2672 can have the same magnetic orientation, as shown by polarity indictors 2653 and 2673. Similarly, outer arcuate magnetic region 2654 of primary magnet 2626 and outer arcuate magnetic region 2676 of auxiliary magnet 2672 can have the same magnetic orientation, as shown by polarity indictors 2655 and 2675. This configuration creates a magnetic attraction between primary magnet 2626 and auxiliary magnet 2672, which can facilitate alignment between them. The magnetic polarity of secondary magnet 2628 (shown by indicator 2617) can be oriented such that when secondary magnetic alignment component 2618 is aligned with auxiliary magnetic alignment component 2670, the south pole of secondary magnet 2628 is oriented toward the north pole of inner arcuate magnetic region 2674 of auxiliary magnet 2672 (and also toward the north pole of inner arcuate magnetic region 2652 of primary magnet 2626) while the north pole of secondary magnet 2628 is oriented toward the south pole of outer arcuate magnetic region 2676 of auxiliary magnet 2672 (and also toward the south pole of outer arcuate magnetic region 2654 of primary magnet 2626).

Accordingly, the respective magnetic orientations of inner arcuate magnetic regions 2652, 2674, secondary magnet 2628 and outer arcuate magnetic region 2676, 2678 can generate magnetic fields 2640 that exert an attractive force between primary magnet 2626 and auxiliary magnet 2672 and between auxiliary magnet 2672 and secondary magnet 2628, thereby facilitating alignment between respective electronic devices in which primary alignment component 2616, auxiliary alignment component 2670, and secondary alignment component 2618 are disposed (e.g., as shown in FIG. 24). Shield 2614 at the distal surface of primary magnet 2626 can redirect some of magnetic fields 2640 away from regions below primary magnet 2626. Further, the "closed-loop" magnetic field 2640 formed around central non-magnetized regions 2656 and 2678 can have tight and compact field lines that do not stray outside of primary, auxiliary, and secondary magnets 2626, 2672, 2628 as far as magnetic field 2540 strays outside of primary, auxiliary, and secondary magnets 2526, 2572, 2528 in FIG. 25B. Thus, magnetically sensitive components can be placed relatively close to primary alignment component 2616 with reduced concern for stray magnetic fields. Accordingly, as compared to magnetic alignment system 2500, magnetic alignment system 2600 can help to reduce the overall size of a device in which primary alignment component 2616 is positioned and can also help reduce noise created by magnetic field 2640 in adjacent components, such as an inductive receiving coil positioned inboard of secondary alignment component 2618.

It will be appreciated that magnetic alignment system 2600 is illustrative and that variations and modifications are possible. For instance, while primary alignment component 2616, auxiliary alignment component 2672, and secondary alignment component 2618 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, secondary alignment component 2618 can be formed of a single, monolithic annular magnet. Similarly, primary alignment component 2616 and/or auxiliary alignment component 2672 can each be formed of a single, monolithic annular piece of magnetic material with an appropriate magnetization pattern as described above, or primary alignment component 2616 and/or auxiliary alignment component 2672 can each be formed of a monolithic inner annular magnet and a monolithic outer annular magnet, with an annular air gap or region of nonmagnetic material disposed between the inner annular magnet and outer annular magnet. However, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various components or individual magnets do not need to align exactly with the lateral and axial directions. The magnetic orientation can have any angle that provides a closed-loop path for a magnetic field through the primary and secondary alignment components.

3.4. Magnetic Orientation for a Closed-Loop Magnetic Alignment System

Any of the magnetic orientations described above with reference to FIG. 4, 5, 7, 8A-8C, 9A-9B, or 10 can also be applied to systems that include an auxiliary alignment component. The magnetic orientation of the auxiliary magnets can be made to match that of corresponding primary magnets.

3.5. Annular Magnetic Alignment Components with Gaps

In examples described above, the primary magnetic alignment component, secondary magnetic alignment component, and auxiliary magnetic alignment component have annular shapes. As described above (e.g., with reference to FIG. 3A), the annulus can be completely closed. In other embodiments, the annulus can include one or more gaps, where each gap can be a section of an annulus where magnetic material (or any material) is absent. An example magnetic alignment component with a gap is described above with reference to FIG. 11, and it should be understood that an auxiliary alignment component can also include one or more gaps, e.g., to accommodate a form factor of an accessory device in which an auxiliary magnetic alignment component is present and/or to accommodate electronic circuit components that may be present in the accessory device. Further, compatible annular alignment components in different devices can differ as to the number, size, and/or position of gaps.

3.6. Accessory Devices Incorporating Magnetic Alignment Components

Figure 27:
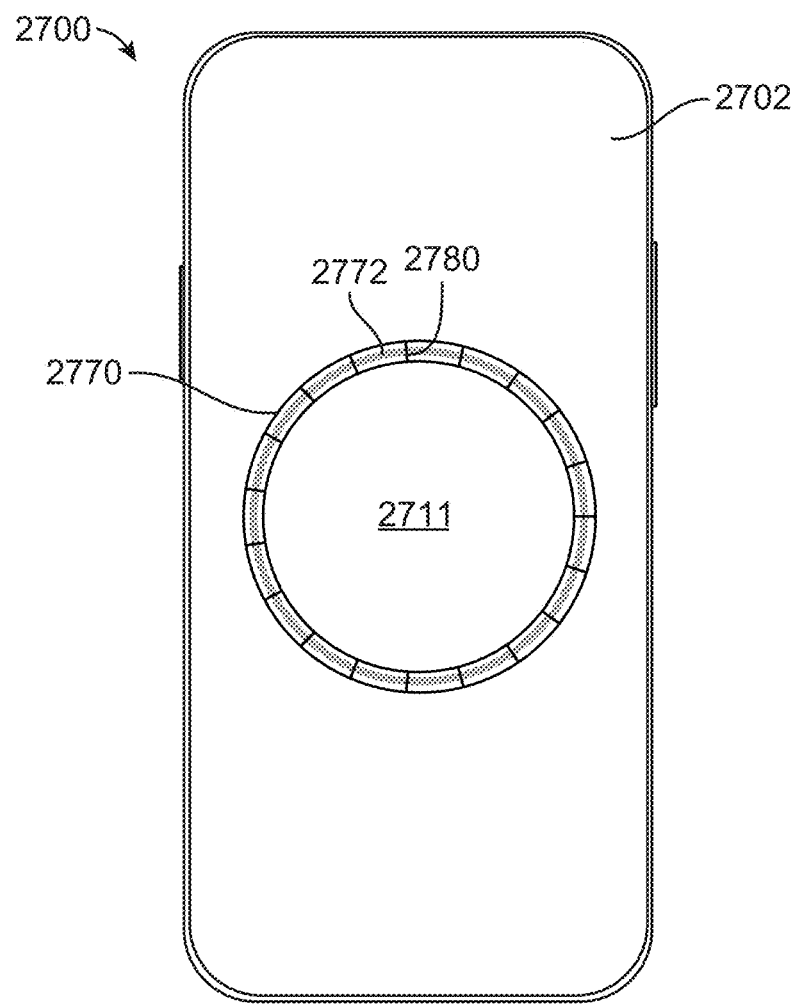
FIG. 27 shows a simplified rear view of an accessory device incorporating a magnetic alignment component according to some embodiments.

FIG. 27 shows a simplified rear view of an accessory device 2700 incorporating an auxiliary magnetic alignment component according to some embodiments. In the example shown, the accessory device incorporates an auxiliary alignment component; however, it should be understood that an accessory device can instead incorporate a primary or secondary magnetic alignment component.

Accessory device 2700 can be, for example, a protective or esthetic case for a portable electronic device such as smart phone 1200 of FIG. 12A. Accordingly, accessory device 2700 can have a housing 2702, which can be the same size as (or slightly larger than) smart phone 1200. In some embodiments, housing 2702 can be shaped as a tray that covers the side and rear surfaces of smart phone 1200, leaving the front (display) surface of smart phone 1200 exposed. Housing 2702 (or portions thereof) can be made of plastic, rubber, silicone, leather, and/or other materials. An auxiliary alignment component 2770 can be disposed within housing 2702, in a position such that, when smart phone 1200 is inserted into accessory device 2700 in the preferred orientation, auxiliary alignment component 2770 is coaxially aligned with secondary alignment component 1218 of smart phone 1200.

Auxiliary alignment component 2770 can be, for example, an implementation of any of the auxiliary alignment components described above and can include an annular arrangement of magnets 2772 with interfaces 2780, which can be air gaps or interfaces where adjacent magnets contact one another. Magnets 2772 can have a quad-pole configuration as described above; for instance, each magnet 2772 can include an inner arcuate region having an axial magnetic orientation in a first direction, an outer arcuate region having an axial magnetic orientation in a second direction opposite the first direction, and a central arcuate region having no distinct magnetic orientation. Although not shown in FIG. 27, auxiliary magnetic alignment component 2770 can include one or more gaps between adjacent magnets 2772. In some embodiments, the gap(s) can provide electrical connection paths for wires (or conductive traces) to connect between regions inboard of and outboard of auxiliary magnetic alignment component 2770, and in some embodiments, the gap(s) can be arranged to allow housing 2702 to have a reduced lateral size for use with a smart phone having a smaller form factor. For instance, the pattern of gaps can match that of magnetic alignment component 1218' of smart phone 1200' of FIG. 12B.

In the example shown, accessory device 2700 is a passive device whose function may be protective and/or esthetic. As such, it may be desirable to make accessory device 2700 thin and to provide smooth inner and outer surfaces. In some embodiments, magnets 2772 can have a thin axial dimension so that accessory device 2700 can have smooth surfaces and a desired thinness. Accessory device 2700 can have a variety of shapes and features. For example, accessory device 2700 can be a tray that covers the side and rear surfaces of smart phone 1200, leaving the front (display) surface of smart phone 1200 exposed. Alternatively, accessory device 2700 can include a cover that can be folded over the front surface of smart phone 1200 and unfolded to allow access to the display. As another example, accessory device 2700 can be formed as a sleeve having an opening at one end (e.g., the top end or a side) to allow smart phone 1200 to be inserted into the sleeve when not in use and removed from the sleeve for use.

In the example shown, accessory device 2700 can a passive device that does not contain power-consuming components. Accordingly, the region 2711 inboard of annular alignment component 2770 can be made of the same material as the surrounding housing 2702, providing a continuous back surface for accessory device 2700. Alternatively, part or all of region 2711 may be devoid of material, allowing the corresponding portion of the rear surface of smart phone 1200 to be exposed. In some embodiments, housing 2702 of accessory device 2700 (or portions thereof) can be made of transparent material so that the rear surface of smart phone 1200 (or portions thereof) can be seen through accessory device 2700. In the absence of transparent magnetic material, an annular region of opaque material can be disposed over magnetic alignment component 2770 so that the individual magnets are not visible. The opaque material can have a color (or colors) selected for a desired esthetic effect.

In some embodiments, accessory 2700 can be an active device. For example, accessory 2700 can include an external battery that can provide power to smart phone 1200. Accordingly, central region 2711 can include one or more wireless charging coils, which can be arranged and operated as described above with reference to accessory 2420 of FIG. 24.

3.7. Wireless Charging Systems with Magnetic Alignment

Figure 28A:
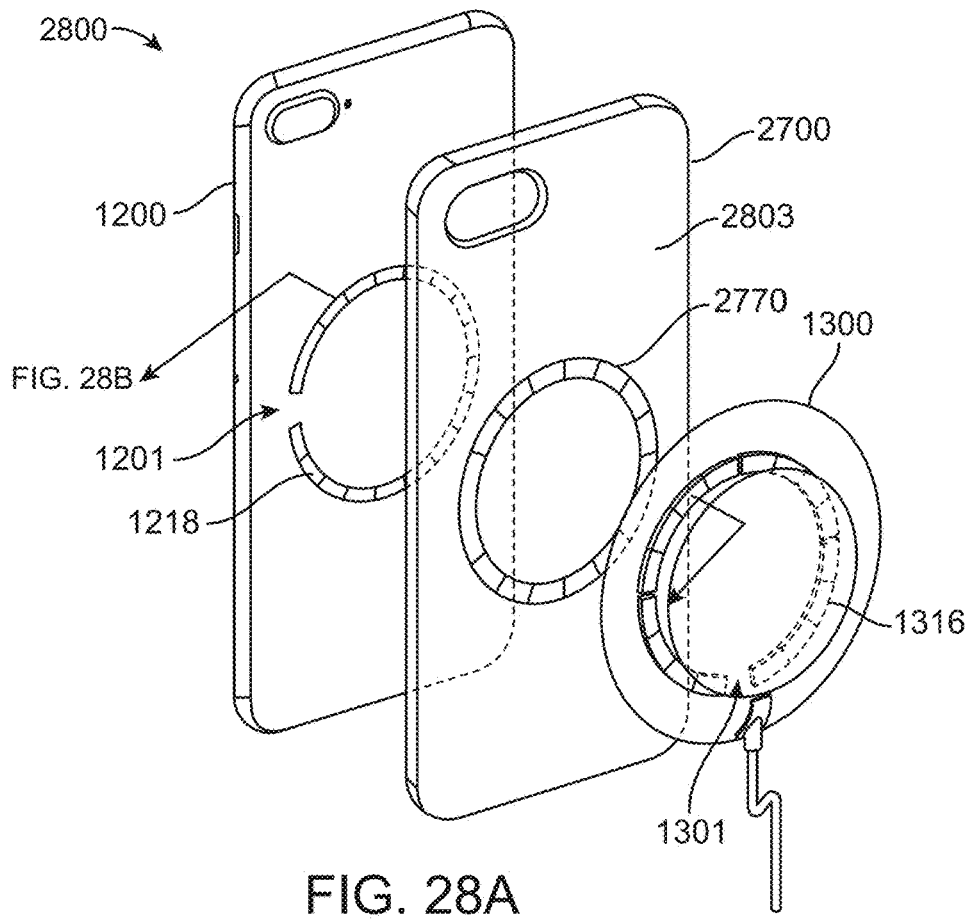
FIG. 28A shows a simplified perspective view of a system including a portable electronic device in alignment with an accessory device and a wireless charger device according to some embodiments.

FIG. 28A shows a simplified perspective view of a system 2800 including portable electronic device 1200 (of FIG. 12A) in alignment with accessory device 2700 (of FIG. 27) and wireless charger device 1300 (of FIG. 13) according to some embodiments. In FIG. 28A, portions of wireless charger device 1300 and accessory device 2700 are shown using dashed lines to avoid obscuring other details. As shown, accessory device 2700 can be placed adjacent to portable electronic device 1200, for example by inserting portable electronic device 1200 into accessory device 2700, and wireless charger device 1300 can be placed with its charging (or proximal) surface against the rear (or proximal) surface 2803 of accessory device 2700. When the devices are placed in this arrangement, secondary alignment component 1218 in portable electronic device 1200 is aligned with auxiliary alignment component 2770 of accessory device 2700 and with primary alignment component 1316 of wireless charger device 1300. Accordingly, auxiliary alignment component 2770 in accessory device 2700 and secondary alignment component 1218 in portable electronic device 120 can attract and hold primary magnetic alignment component 1316 of wireless charger device 1300 in alignment so that transmitter coil assembly 1312 of wireless charger device 1300 is aligned with coil assembly 1210 of portable electronic device 1200. As shown, wireless charger device 1300 can have any rotational orientation about an axis defined by the centers of primary magnetic alignment component 1316 and secondary magnetic alignment component 1218; for instance, gap 1201 in secondary magnetic alignment component 1218 need not align with gap 1301 in primary magnetic alignment component 1316.

Figure 28B:
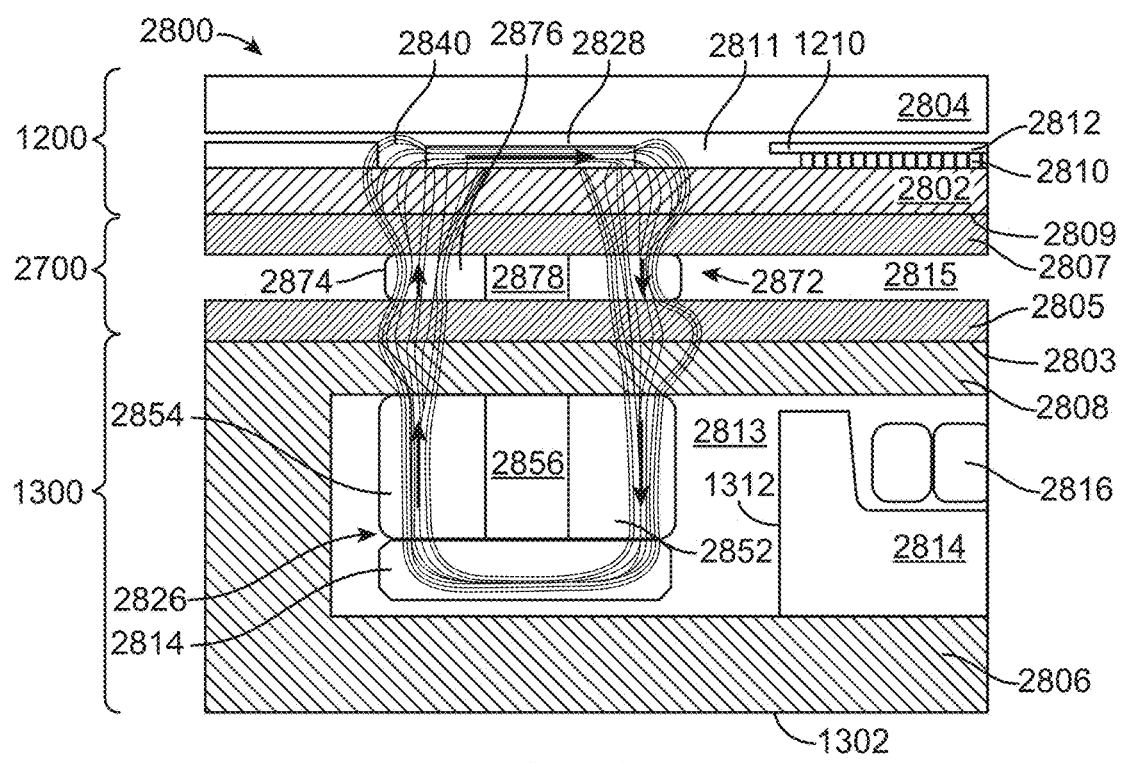
FIG. 28B shows a simplified partial cross section view of the system of FIG. 28A.

FIG. 28B shows a simplified partial cross section view of system 2800 according to some embodiments. Portable electronic device 1200 has a rear housing 2802 (which can be made of a material such as glass or plastic that is permeable to electromagnetic fields and to DC magnetic fields) and a front housing 2804 (which can include a touch screen display). Coil assembly 1210 can include an inductive receiver coil 2810 (which can be made, e.g., of stranded wire wound into a coil) and shielding 2812 (which can include, e.g., a ferrimagnetic shield). Secondary magnet 2828 forms a portion of secondary magnetic alignment component 1218 and can have a magnetic field oriented in a radially inward direction (as shown by the arrow). It should be understood that although secondary alignment component 1218 is shown in FIG. 28A, rear housing 2802 can be opaque and secondary alignment component 1218 need not be visible to a user.

Wireless charger device 1300 has a housing 1302 that includes a single-piece enclosure 2806 forming distal and side surfaces of housing 1302 and a top cap 2808 forming a proximal surface of housing 1302. As described above, enclosure 2806 and top cap 2808 can be made of the same material or different materials, and top cap 2808 can be made of a material that is permeable to AC electromagnetic fields and to DC magnetic fields. Transmitter coil assembly 1312 can include an inductive transmitter coil 2816 (which can be made, e.g., of stranded wire wound into a coil) and electromagnetic shielding 2814 (which can include, e.g., a ferrimagnetic shield). Primary arcuate magnet 2826 forms a portion of primary magnetic alignment component 1316 and can include an inner arcuate region 2852 having a magnetic field oriented in a first axial direction, an outer arcuate region 2854 having a magnetic field oriented in a second axial direction opposite the first axial direction, and a non-magnetized central arcuate region 2856. As described above, a shield 2814 can be disposed on the distal surface of primary magnet 2826. It should be understood that although primary alignment component 1316 is shown in FIG. 28A, housing 1302 can be opaque and primary alignment component 1316 need not be visible to a user.

Accessory device 2700 has a rear housing 2702 that includes a back layer 2805 (forming back surface 2803) and a front layer 2807 that contacts rear housing 2802 of portable electronic device 1200 at a surface 2809. Back layer 2805 and front layer 2807 can be made of the same material or different materials as desired. Auxiliary arcuate magnet 2872 forms a portion of auxiliary alignment component 2770 and can include an inner arcuate section 2874 having a magnetic field oriented in a first axial direction, an outer arcuate section 2876 having a magnetic field oriented in a second axial direction opposite the first axial direction, and a non-magnetized central arcuate section 2878. It should be understood that although auxiliary alignment component 2770 is shown in FIG. 28A, rear housing 2702 can be opaque and auxiliary alignment component 2770 need not be visible to a user.

When aligned, primary magnet 2826, auxiliary magnet 2872, and secondary magnet 2828 produce a closed-loop magnetic flux as shown by lines 2840. Magnetic flux 2840 can attract primary annular alignment component 1318, auxiliary annular alignment component 2770 and secondary annular alignment component 1216 into alignment such that the respective centers of primary annular alignment component 1318, auxiliary annular alignment component 2770, and secondary annular alignment component 1216 are aligned along a common axis. Since transmitter coil 2816 is fixed in a position concentric with primary alignment component 1316 and receiver coil 2810 is fixed in position concentric with secondary alignment component 1218, a result of aligning primary annular alignment component 1318, auxiliary annular alignment component 2770, and secondary annular alignment component 1216 along a common axis is that transmitter coil 2816 and receiver coil 2810 are also aligned along a common axis, thereby enabling efficient wireless power transfer. For instance, transmitter coil 2816 can be driven with an alternating current to generate time-varying magnetic fields that induce a time-varying current in receiver coil 2816. Electromagnetic shielding (e.g., shielding 2814 and 2812) can confine the AC fields to the immediate vicinity of coils 2816 and 2812. Further, in embodiments where accessory device 2700 includes one or more wireless charging coils, such wireless charging coils can also be aligned along a common axis with coils 2816 and 2810.

Some embodiments provide a gap region 2811 between secondary magnet 2828 and coil assembly 1210 that may experience low DC magnetic flux and may also experience low AC electromagnetic fields due to electromagnetic shielding 2812 around coil 2810. Similarly, some embodiments provide a gap region 2813 between primary magnet 2826 and transmitter coil assembly 1312 that may experience low DC magnetic flux and may also experience low AC electromagnetic fields due to electromagnetic shielding 2818 around transmitter coil 2816.

As can be appreciated with reference to FIG. 28B, arcuate magnets 2828 of secondary alignment component 1218 can have a thin axial dimension so that secondary alignment component 1218 does not require an increased thickness of portable electronic device 1200. For instance, the axial thickness of each secondary alignment magnet 2828 can be less than or equal to the thickness of receiver coil assembly 1210 (including coil 2810 and shielding 2812). Primary alignment magnets 2826 can have a thicker axial dimension, e.g., occupying all of the axial space between enclosure 2806 and top cover 2808.

Similarly, each arcuate magnet 2872 of auxiliary alignment component 2770 can have a thin axial dimension so that the overall thickness of accessory device 2700 can be kept small. Back layer 2805 and front layer 2807 can be planar layers. Space between layers 2805 and 2807 that is not occupied by auxiliary alignment magnets 2872 can be an air gap, or portions or all of the space may be filled with material. In some embodiments, surfaces 2803 and 2809 do not evince a local deviation from flatness due to the presence of auxiliary alignment magnets 2872. In some embodiments, accessory device 2700 (or a back housing element thereof) can be formed as a single piece of material with auxiliary alignment component 2770 embedded therein. Auxiliary alignment magnets 2872 and primary alignment magnets 2826 can have the same radial width; in some embodiments, the radial width of auxiliary alignment magnets 2872 and primary alignment magnets 2826 can be slightly larger than the radial width of secondary alignment magnets 2828.

It should be understood that auxiliary alignment component 2770 is optional, and a charge-through accessory that does not have an auxiliary alignment component may be positioned between portable electronic device 1200 and wireless charger device 1300. Depending on the thickness and material composition of the accessory, primary annular alignment component 1316 and secondary annular alignment component 1218 may still experience sufficient attraction to provide reliable alignment between coils 2816 and 2810. However, for DC magnets, the attractive force diminishes sharply with increasing distance between magnets, so the alignment may be less strong. Accordingly, auxiliary alignment component 2770 can be used as a "repeater" that decreases the distance between adjacent magnets and thus increases the magnetic force that urges toward alignment.

Figure 29:
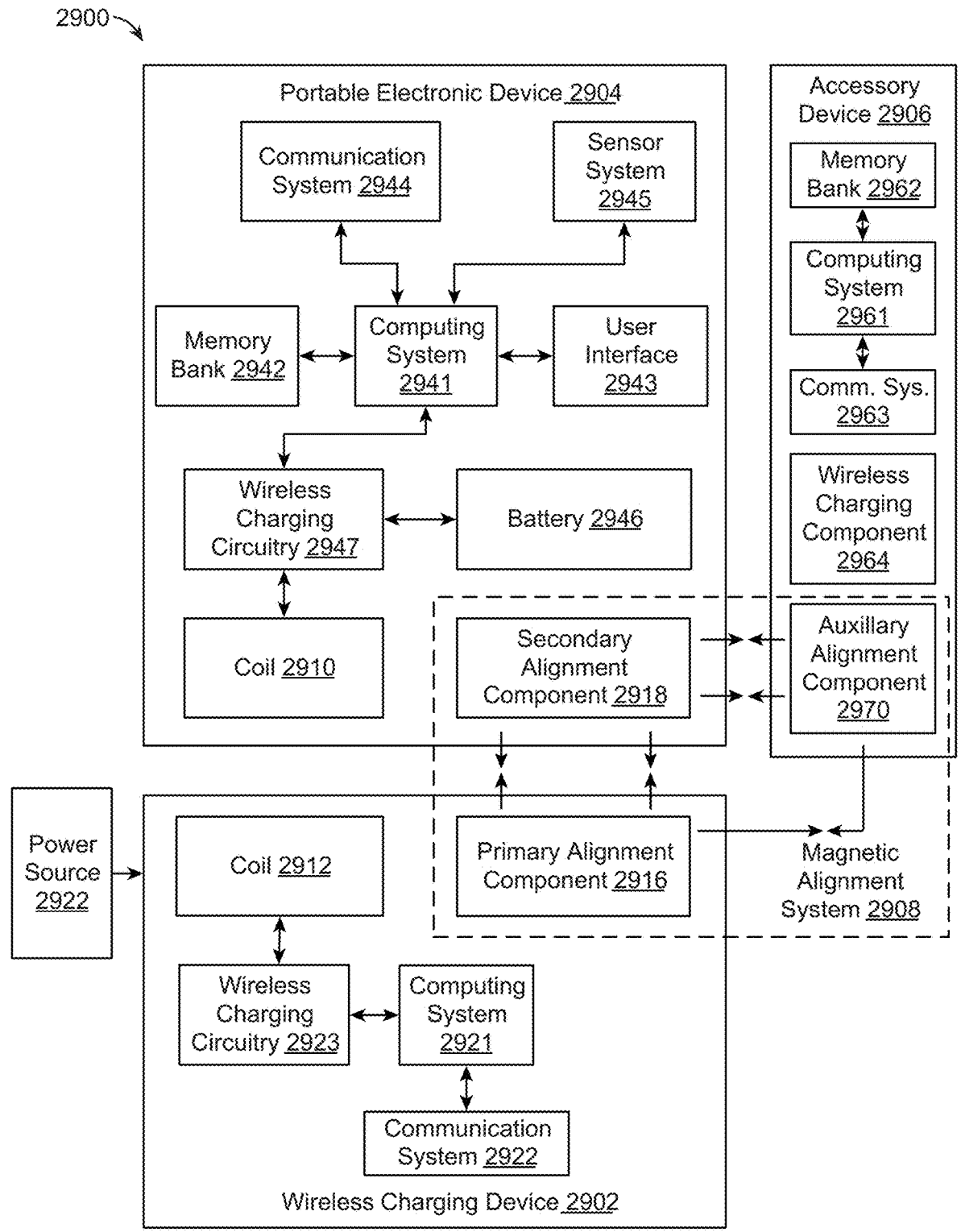
FIG. 29 is a block diagram illustrating an exemplary wireless charging system including devices that can be aligned together via a magnetic alignment system according to some embodiments.

FIG. 29 is a block diagram illustrating an exemplary wireless charging system 2900 including a portable electronic device 2904 (which can be, e.g., portable electronic device 1200 or any other portable electronic device described herein), a wireless charger device 2902 (which can be, e.g., wireless charger device 1300 or any other wireless charger device described herein), and an accessory device 2906 (which can be, e.g., accessory device 2800 or any other accessory device described herein) that can be aligned together via a magnetic alignment system 2908 according to some embodiments. Magnetic alignment system 2908 can include a primary alignment component 2916 within wireless charger device 2902, a secondary alignment component 2918 within portable electronic device 2904, and an auxiliary alignment component 2970 within accessory device 2906. Primary alignment component 2916, secondary alignment component 2918, and auxiliary alignment component 2970 can be constructed according to any of the embodiments described herein. Portable electronic device 2904 can include a computing system 2941 coupled to a memory bank 2942. Computing system 2941 can include control circuitry configured to execute instructions stored in memory bank 2942 for performing various functions for operating portable electronic device 2904. The control circuitry can include one or more programmable integrated logic circuits, such as microprocessors, central processing units (CPUs), graphics processing units (GPUs), field programmable gate arrays (FPGAs), or the like.

Computing system 2941 can also be coupled to a user interface system 2943, a communication system 2944, and a sensor system 2945 for enabling portable electronic device 2904 to perform one or more functions. For instance, user interface system 2943 can include a display, speaker, microphone, actuator for enabling haptic feedback, and one or more input devices such as a button, switch, capacitive screen for enabling the display to be touch sensitive, and the like. Communication system 2944 can include wireless telecommunication components, NFC components, Bluetooth components, and/or Wi-Fi components for enabling portable electronic device 2904 to make phone calls, interact with wireless accessories, and access the Internet. Sensor system 2945 can include light sensors, accelerometers, gyroscopes, temperature sensors, magnetometers, and/or any other type of sensor that can measure a parameter of an external entity and/or environment.

All of these electrical components require a power source to operate. Accordingly, portable electronic device 2904 also includes a battery 2946 that can discharge stored energy to power the electrical components of portable electronic device 2904. To replenish the energy discharged to power the electrical components, portable electronic device 2904 includes charging circuitry 2947 and an inductive coil 2910 that can receive power from wireless charger device 2902 coupled to an external power source 2922.

Wireless charger device 2902 can include a transmitter coil 2912 for generating time-varying magnetic flux capable of inducing an electrical current in coil 2910 of portable electronic device 2904. The induced current can be used by charging circuitry 2947 to charge battery 2946. Wireless charger device 2902 can further include a computing system 2921 coupled to a communication system 2922 and wireless charging circuitry 2923. Wireless charging circuitry can include circuit components to convert standard AC power having a first set of voltage and frequency characteristics (e.g., standard AC wall power) to AC power suitable for operating coil 2910. Suitable circuit components, including rectifiers (AC-to-DC converters), boost circuits (DC-to-DC voltage boosting circuits), inverters (DC-to-AC converters), and the like, are known in the art. Computing system 2921 can include logic circuitry (such as a microprocessor, microcontroller, FPGA, or the like) configured to control the operation of wireless charger device 2902, such as to control wireless charging circuitry 2923 to use power received from external power source 2922 to generate time-varying magnetic flux to induce current in coil 2910 to charge portable electronic device 2904. In some embodiments, computing system 2921 can implement functionality confirming to the Qi standard for wireless charging (promulgated by the Wireless Power Consortium).

In some embodiments, components implementing computing system 2921 and wireless charging circuitry 2923 can be disposed within the housing that holds coil 2912 and primary alignment component 2916 (e.g., within puck-shaped housing 1302 of FIGS. 13 and 14A-14B). In other embodiments, some or all of the components implementing computing system 2921 and wireless charging circuitry 2923 can be disposed elsewhere, e.g., at the distal end of cable 1304 in FIGS. 13 and 14A. For example, the logic circuitry implementing computing system 2921 can be disposed within housing 1302 while wireless charging circuitry 2932 is disposed in a boot of a plug connector at the distal end of cable 1304. (In this case, cable 1304 can provide AC power to wireless charger device 1300.) As another example, the logic circuitry implementing computing system 2921 and circuit components implementing portions of wireless charging circuitry 2923 can be disposed within housing 1302 while circuit components implementing other portions of wireless charging circuitry 2923 are disposed in a boot of a plug connector at the distal end of cable 1304. For instance, an inverter may be disposed within housing 1302 while a rectifier and boost circuit are disposed in the boot. (In this case, cable 1304 can provide DC power to wireless charger device 1300.)

As described above, accessory device 2906 can be a passive accessory such as protective case for portable electronic device 1002 and need not include any components other than auxiliary alignment component 2970. In some embodiments, accessory device 2906 can be an active device. For instance, accessory device 2906 can include a computing system 2961 coupled to a memory bank 2962 and a communication system 2963. Computing system 2961 can execute instructions stored in memory bank 2962 to perform one or more functions using communication system 2963. In some embodiments, computing system 2961 can be configured to send data from memory bank 2962 through communication system 2963 to portable electronic device 2904 regarding a user interface theme for portable electronic device 2904 so that portable electronic device 2904 can use this data to modify its user interface. As an example, accessory device 2906 can be a protective case that has a picture of a car on it, and memory bank 2962 has information stored for configuring a user interface to include a car theme with car-related icons, animations, and/or sounds. Thus, when accessory device 2906 is installed on portable electronic device 2902, computing system 2941 can receive the car-themed user interface from accessory device 2906 and can modify user interface system 2943 according to the received car-themed data (e.g., changing what is displayed, what sounds are played to signal events, etc.). In some embodiments, accessory device 2906 can also include a wireless charging component 2964 that can aid in wireless charging between portable electronic device 2904 and wireless charger device 2902. For instance, wireless charging component 2964 can include a block of magnetic material that can help guide magnetic flux through accessory device 2906. Or, wireless charging component 2964 can include a pair of inductor coils where one inductor coil positioned proximate to wireless charger device 2902 can receive magnetic flux, which can be relayed to the other inductor coil positioned proximate to portable electronic device 2904 so that the received flux can be retransmitted to portable electronic device 2904. In some embodiments, accessory device 2906 can include a battery (not shown) to store power received from wireless charger device 2902 at a first time for delivery to portable electronic device 2904 at a later time.

While system 2900 is described with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices that use using any combination of circuitry and software to enable wireless charging operations and/or other operations where physical alignment between devices is desired.

4. Systems with Movable Magnetic Alignment Components

In embodiments described above, it is assumed (though not required) that the magnetic alignment components (including annular magnetic alignment components, and, where applicable, rotational magnetic alignment components) are fixed in position relative to the device housing (or enclosure) and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 30A-30C illustrate examples of moving magnets according to an embodiment of the present invention. In this example, first electronic device 3000 can be a wireless charger device or other device having a magnet 3010 (which can be, e.g., any of the annular or rotational magnetic alignment components described herein). In FIG. 30A, moving magnet 3010 can be housed in a first electronic device 3000. First electronic device 3000 can include device enclosure 3030, magnet 3010, and shield 3020. Magnet 3010 can be in a first position (not shown) adjacent to nonmoving shield 3020. In this position, magnet 3010 can be separated from device enclosure 3030. As a result, the magnetic flux 3012 at a surface of device enclosure 3030 can be relatively low, thereby protecting magnetic devices and magnetically stored information, such as information stored on payment cards. As magnet 3010 in first electronic device 3000 is attracted to a second magnet (not shown) in a second electronic device (not shown), magnet 3010 can move, for example it can move away from shield 3020 to be adjacent to device enclosure 3030, as shown. With magnet 3010 at this location, magnetic flux 3012 at surface of device enclosure 3030 can be relatively high. This increase in magnetic flux 3012 can help to attract the second electronic device to first electronic device 3000.

With this configuration, it can take a large amount of magnetic attraction for magnet 3010 to separate from shield 3020. Accordingly, these and other embodiments of the present invention can include a shield that is split into a shield portion and a return plate portion. For example, in FIG. 30B, line 3060 can be used to indicate a split of shield 3020 into a shield 3040 and return plate 3050.

In FIG. 30C, moving magnet 3010 can be housed in first electronic device 3000. First electronic device 3000 can include device enclosure 3030, magnet 3010, shield 3040, and return plate 3050. In the absence of a magnetic attraction, magnet 3010 can be in a first position (not shown) such that shield 3040 can be adjacent to return plate 3050. Again, this configuration, magnetic flux 3012 at a surface of device enclosure 3030 can be relatively low. As magnet 3010 and first electronic device is attracted to a second magnet (not shown) in a second electronic device (not shown), magnet 3010 can move, for example it can move away from return plate 3050 to be adjacent to device enclosure 3030, as shown. In this configuration, shield 3040 can be separate from return plate 3050 and the magnetic flux 3012 at a surface of device enclosure 3030 can be increased. As before, this increase in magnetic flux 3012 can help to attract the second electronic device to the first electronic device 3000.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 31B:
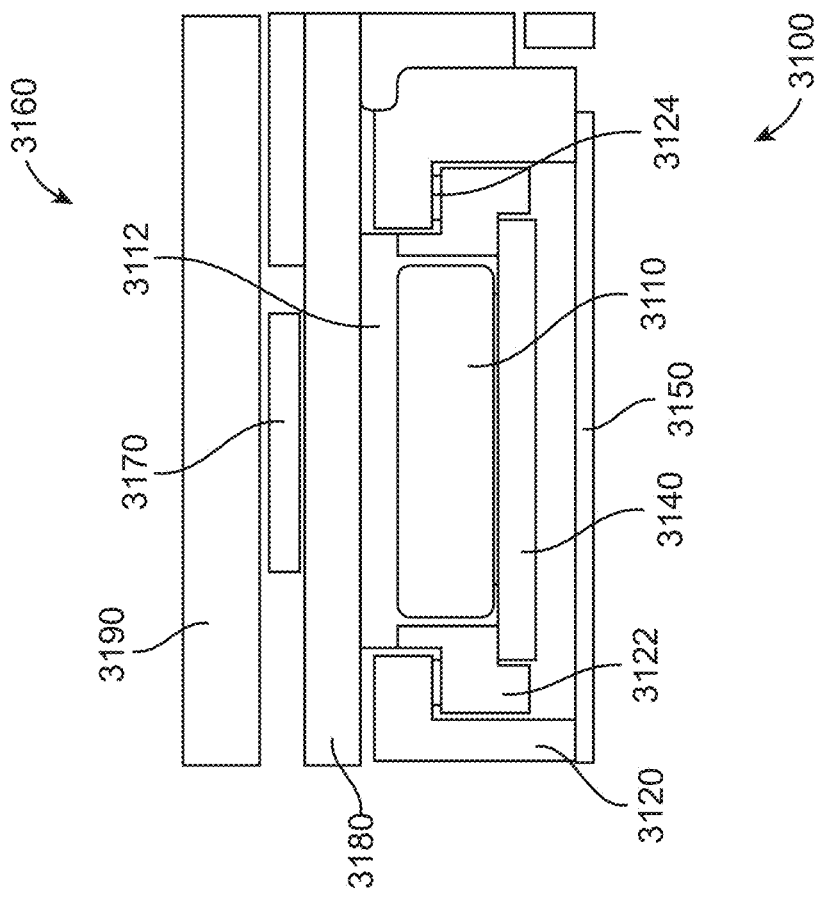
FIGS. 31A and 31B illustrate a moving magnetic structure according to an embodiment of the present invention.
Figure 31A:
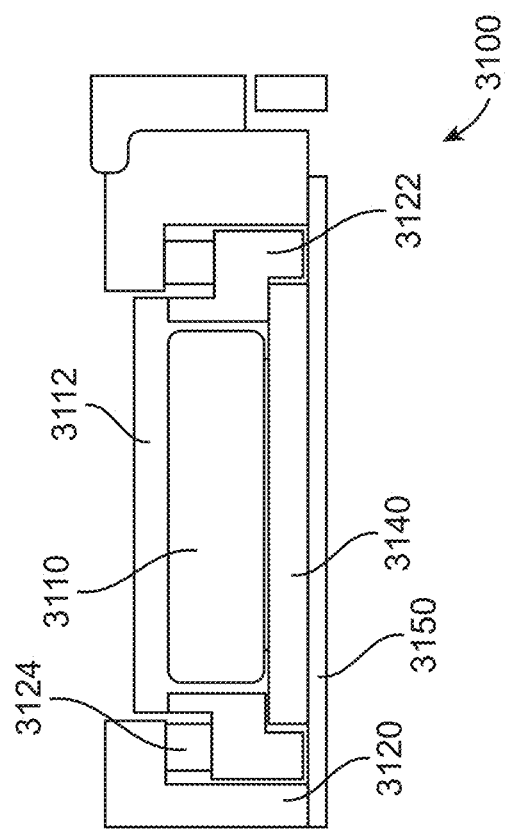

FIGS. 31A and 31B illustrate a moving magnetic structure according to an embodiment of the present invention. In this example, first electronic device 3100 can be a wireless charger device or other device having a first magnet 3110 (which can be, e.g., any of the annular or rotational magnetic alignment components described herein). FIG. 31A illustrates a moving first magnet 3110 in a first electronic device 3100. First electronic device 3100 can include first magnet 3110, protective surface 3112, housings 3120 and 3122, compliant structure 3124, shield 3140, and return plate 3150. In this figure, first magnet 3110 is not attracted to a second magnet (not shown), and therefore shield 3140 is magnetically attracted to or attached to return plate 3150. In this position, compliant structure 3124 can be expanded or relaxed. Compliant structure 3124 can be formed of an elastomer, silicon rubber open cell foam, silicon rubber, polyurethane foam, or other foam or other compressible material.

In FIG. 31B, second electronic device 3160 has been brought into proximity of first electronic device 3100. Second magnet 3170 can attract first magnet 3110, thereby causing shield 3140 and return plate 3150 to separate. Housings 3120 and 3122 can compress compliant structure 3124, thereby allowing protective surface 3112 of first electronic device 3100 to move towards or adjacent to housing 3180 of second electronic device 3160. Second magnet 3170 can be held in place in second electronic device 3160 by housing 3190 or other structure. As second electronic device 3160 is removed from first electronic device 3100, first magnet 3110 and shield 3140 can be magnetically attracted to return plate 3150, as shown in FIG. 31A.

Figure 32B:
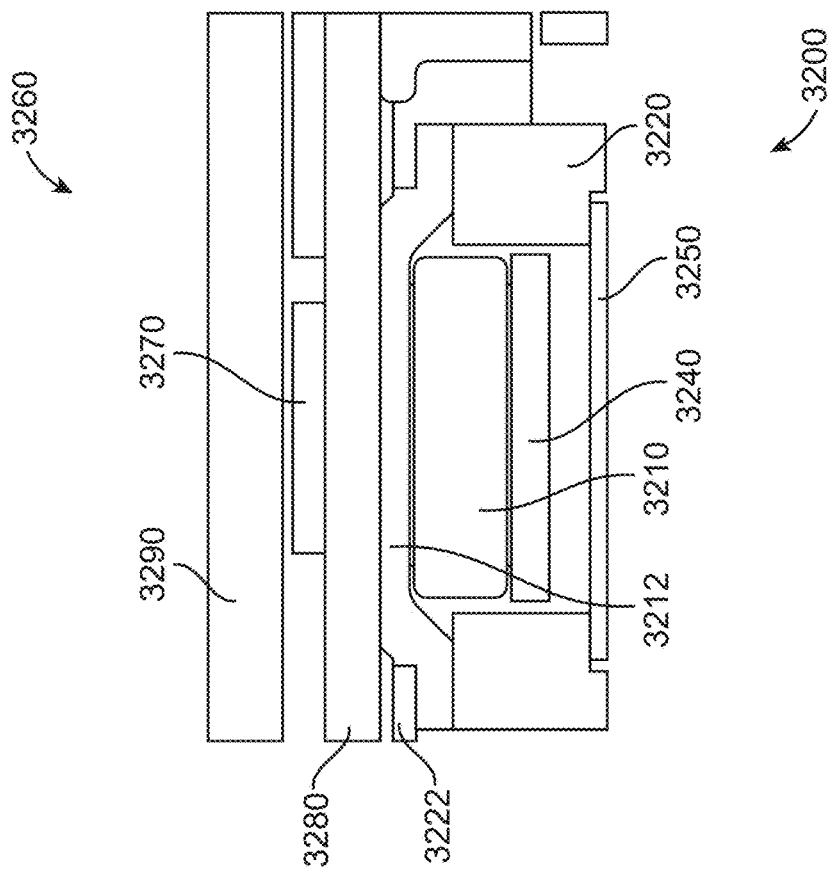
FIGS. 32A and 32B illustrate a moving magnetic structure according to an embodiment of the present invention.
Figure 32A:
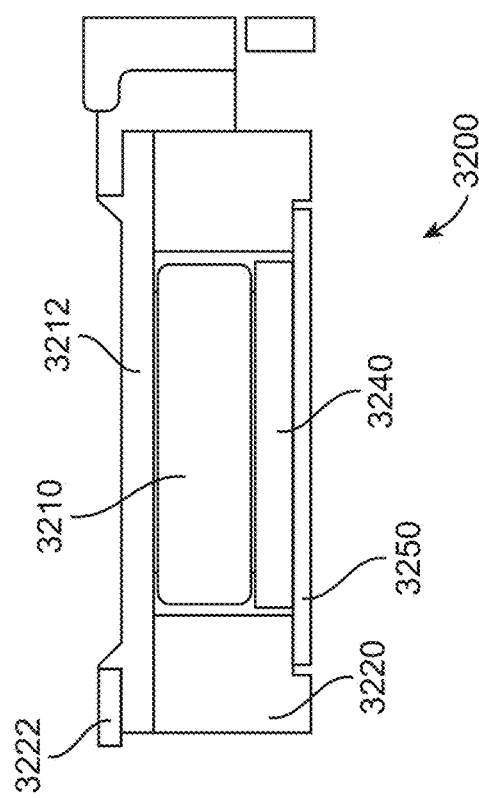

FIGS. 32A and 32B illustrate moving magnetic structures according to an embodiment of the present invention. In this example, first electronic device 3200 can be a wireless charger device or other device having a first magnet 3210 (which can be, e.g., any of the annular or rotational magnetic alignment components described herein). FIG. 32A illustrates a moving first magnet 3210 in a first electronic device 3200. First electronic device 3200 can include first magnet 3210, pliable surface 3212, housing portions 3220 and 3222, shield 3240, and return plate 3250. In this figure, first magnet 3210 is not attracted to a second magnet, and therefore shield 3240 is magnetically attached or attracted to return plate 3250. In this position, pliable surface 3212 can be relaxed. Pliable surface 3212 can be formed of an elastomer, silicon rubber open cell foam, silicon rubber, polyurethane foam, or other foam or other compressible material.

In FIG. 32B, second electronic device 3260 has been brought into the proximity of first electronic device 3200. Second magnet 3270 can attract first magnet 3210, thereby causing shield 3240 and return plate 3250 to separate from each other. First magnet 3210 can stretch pliable surface 3212 towards second electronic device 3260, thereby allowing first magnet 3210 of first electronic device 3200 to move towards housing 3280 of second electronic device 3260. Second magnet 3270 can be held in place in second electronic device 3260 by housing 3290 or other structure. As second electronic device 3260 is removed from first electronic device 3200, first magnet 3210 and shield 3240 can be magnetically attracted to return plate 3250 as shown in FIG. 32A.

Figure 33:
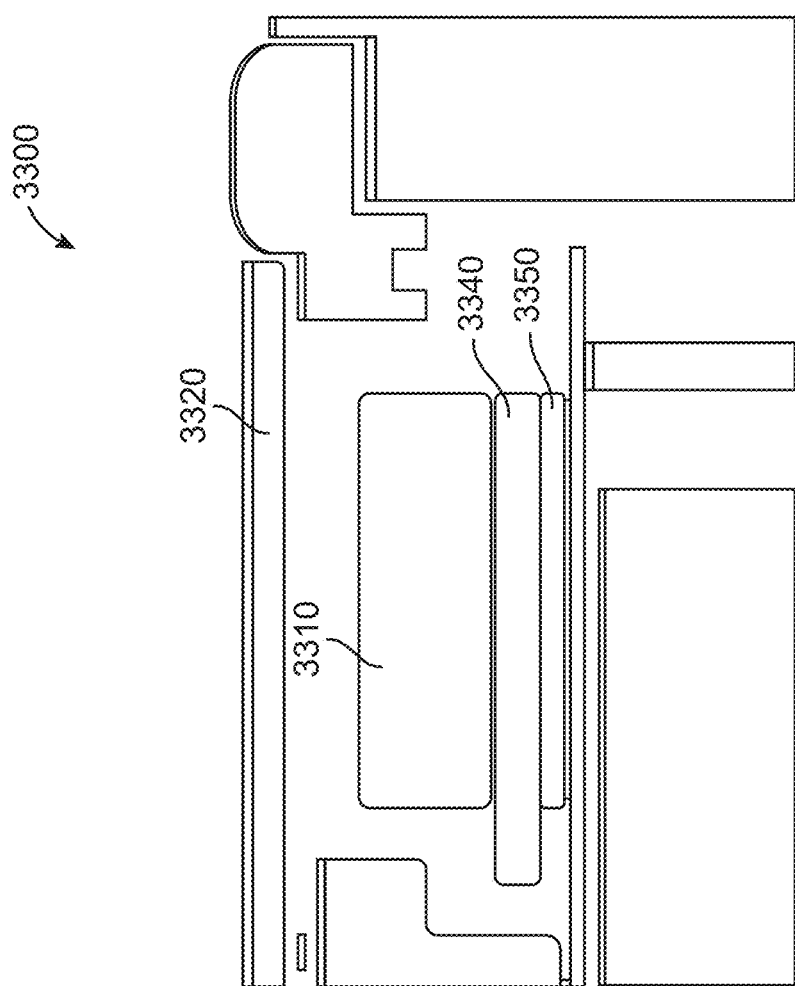
FIGS. 33-35 illustrate a moving magnetic structure according to an embodiment of the present invention.
Figure 34:
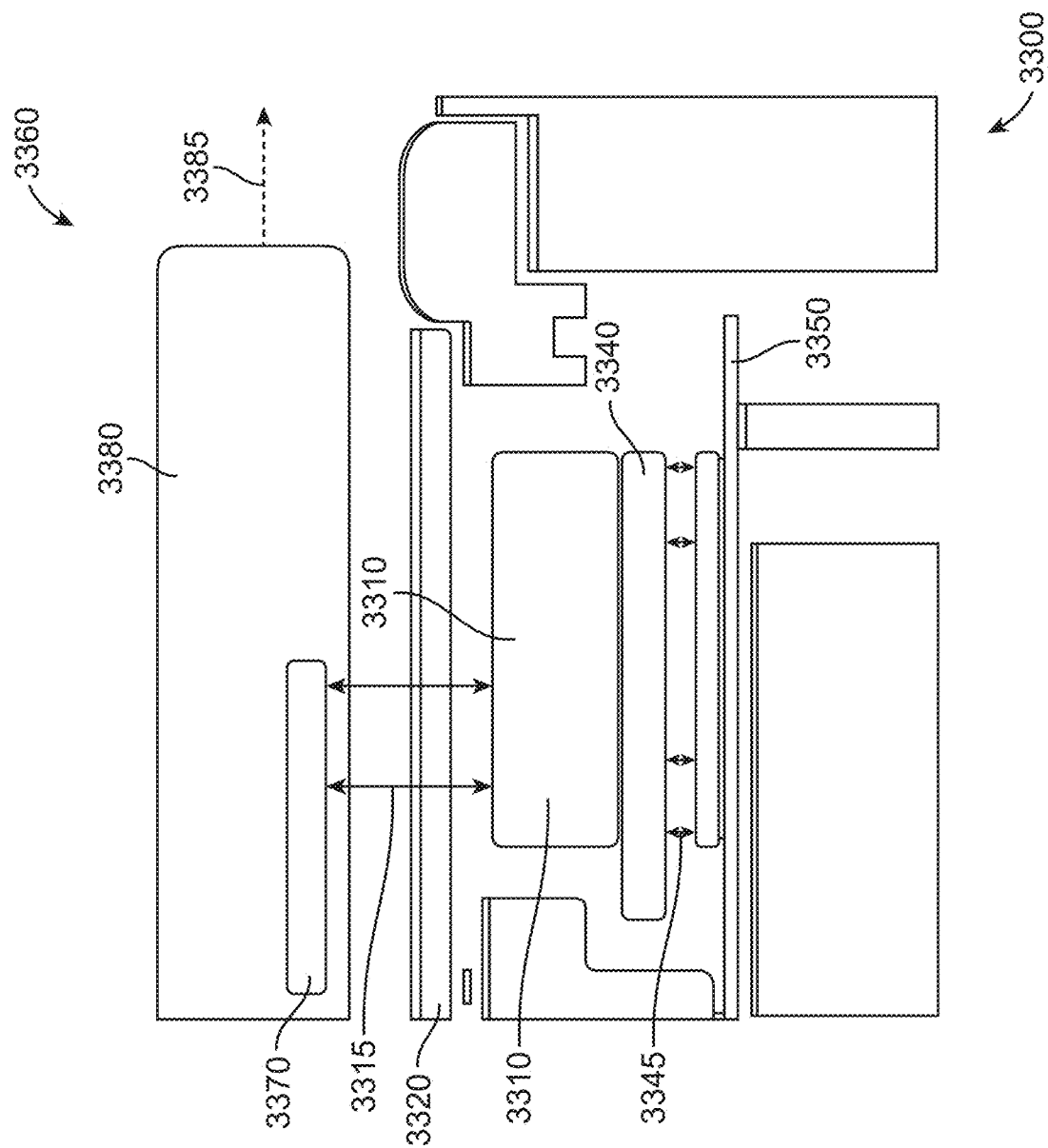
Figure 35:
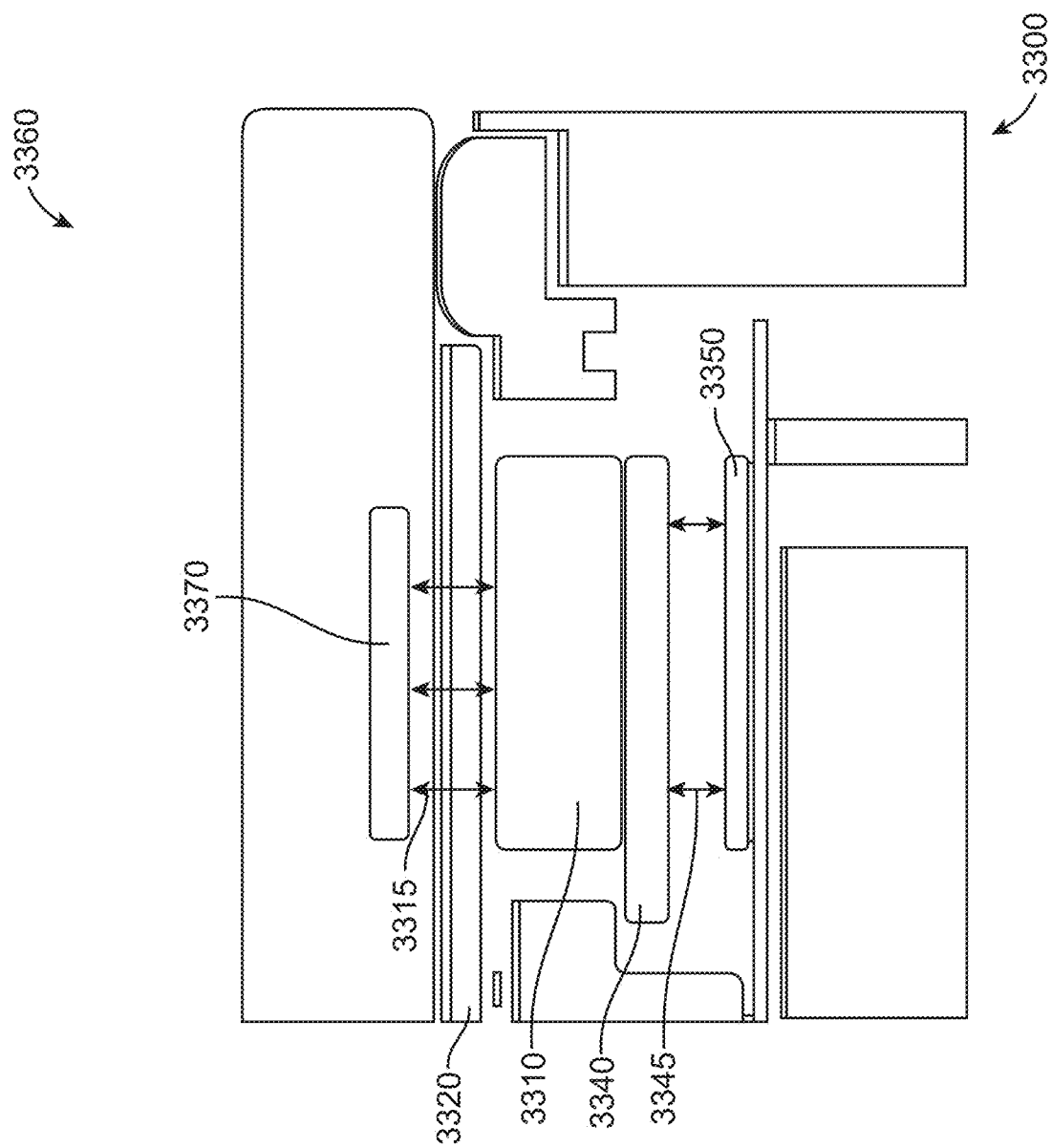

FIGS. 33-35 illustrate a moving magnetic structure according to an embodiment of the present invention. In this example, first electronic device 3300 can be a wireless charger device or other device having a first magnet 3310 (which can be, e.g., any of the annular or rotational magnetic alignment components described herein). In FIG. 33, first magnet 3310 and shield 3340 can be magnetically attracted or attached to return plate 3350 in first electronic device 3300. First electronic device 3300 can be at least partially housed in device enclosure 3320. In FIG. 34, housing 3380 of second electronic device 3360 can move laterally across a surface of device enclosure 3320 of first electronic device 3300 in a direction 3385. Second magnet 3370 in second electronic device 3360 can begin to attract first magnet 3310 in first electronic device 3300. This magnetic attraction 3315 can cause first magnet 3310 and shield 3340 to pull away from return plate 3350 by overcoming the magnetic attraction 3345 between shield 3340 and return plate 3350. In FIG. 35, second magnet 3370 in second electronic device 3360 has become aligned with first magnet 3310 in first electronic device 3300. First magnet 3310 and shield 3340 have pulled away from return plate 3350 thereby reducing the magnetic attraction 3345. First magnet 3310 has moved nearby or adjacent to device enclosure 3320, thereby increasing the magnetic attraction 3315 to second magnet 3370 in second electronic device 3360.

As shown in FIGS. 33-35, the magnetic attraction between first magnet 3310 in first electronic device 3300 and the second magnet 3370 in the second electronic device 3360 can increase when first magnet 3310 and shield 3340 pull away from return plate 3350. This is shown graphically in the following figures.

Figure 36:
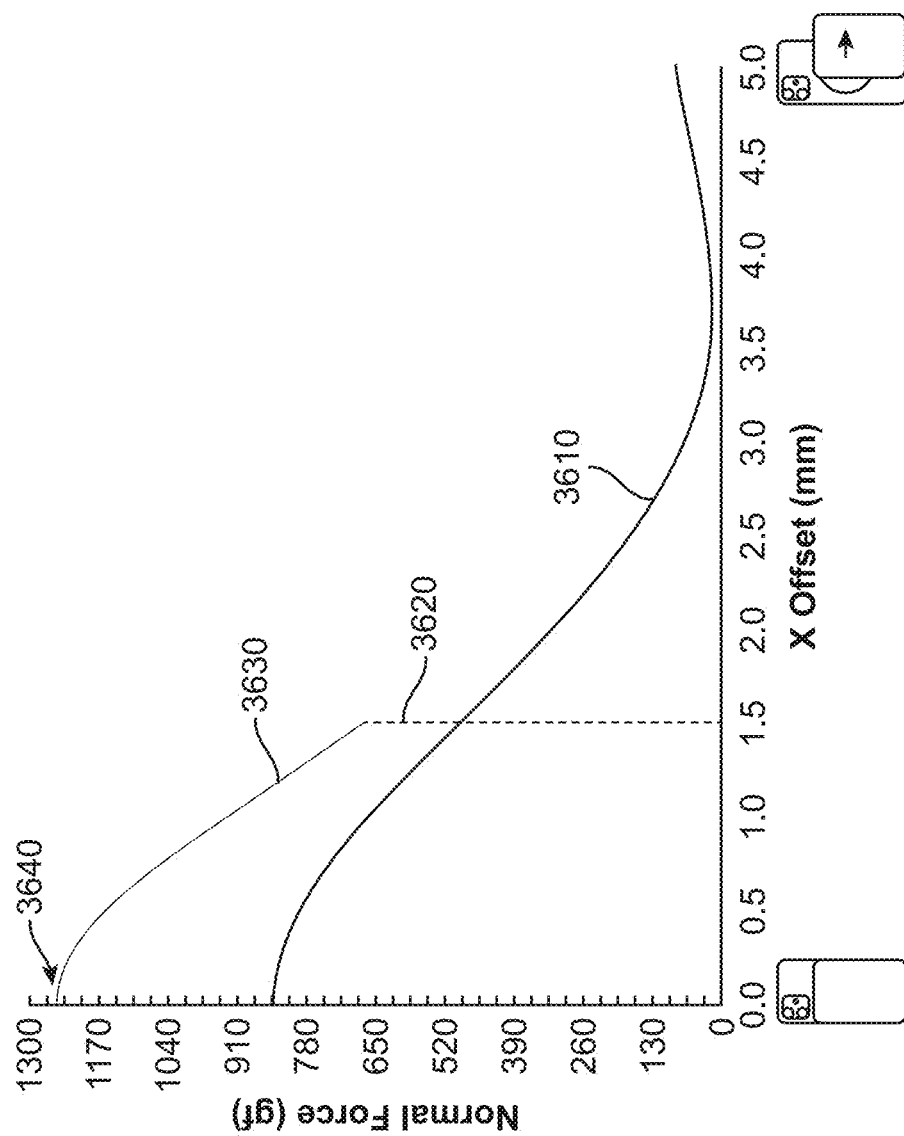
FIG. 36 illustrates a normal force between a first magnet in a first electronic device and a second magnet in a second electronic device.

FIG. 36 illustrates a normal force between a first magnet in first electronic device and a second magnet in a second electronic device as a function of a lateral offset between them. As shown in FIGS. 33-36, with a large offset between first magnet 3310 and second magnet 3570, first magnet 3310 and shield 3340 can remain attached to return plate 3350 in first electronic device 3300 and the magnetic attraction 3315 can be minimal. The shear force necessary to overcome this magnetic attraction is illustrated here as curve 3610. As shown in FIG. 34, as the offset or lateral distance between first magnet 3310 and second magnet 3370 decreases, first magnet 3310 and shield 3340 can pull away or separate from return plate 3350, thereby increasing the magnetic attraction 3315 between first magnet 3310 and second magnet 3370. This is illustrated here as discontinuity 3620. As shown in FIG. 35, as first magnet 3310 and second magnet 3370 come into alignment, the magnetic attraction 3315 increases along curve 3630 to a maximum 3640. The difference between curve 3610 and curve 3630 can show the increase in magnetic attraction between a phone or other electronic device, such as second electronic device 3360, and an attachable wireless charging device or other accessory device, such as first electronic device 3300, that results from first magnet 3310 being able to move axially. It should also be noted that in this example first magnet 3310 does not move in a lateral direction, though in other examples it is capable of such movement. Where first magnet 3310 is capable of moving in a lateral direction, curve 3630 can have a flattened peak from an offset of zero to an offset that can be overcome by a range of possible lateral movement of first magnet 3310.

Figure 37:
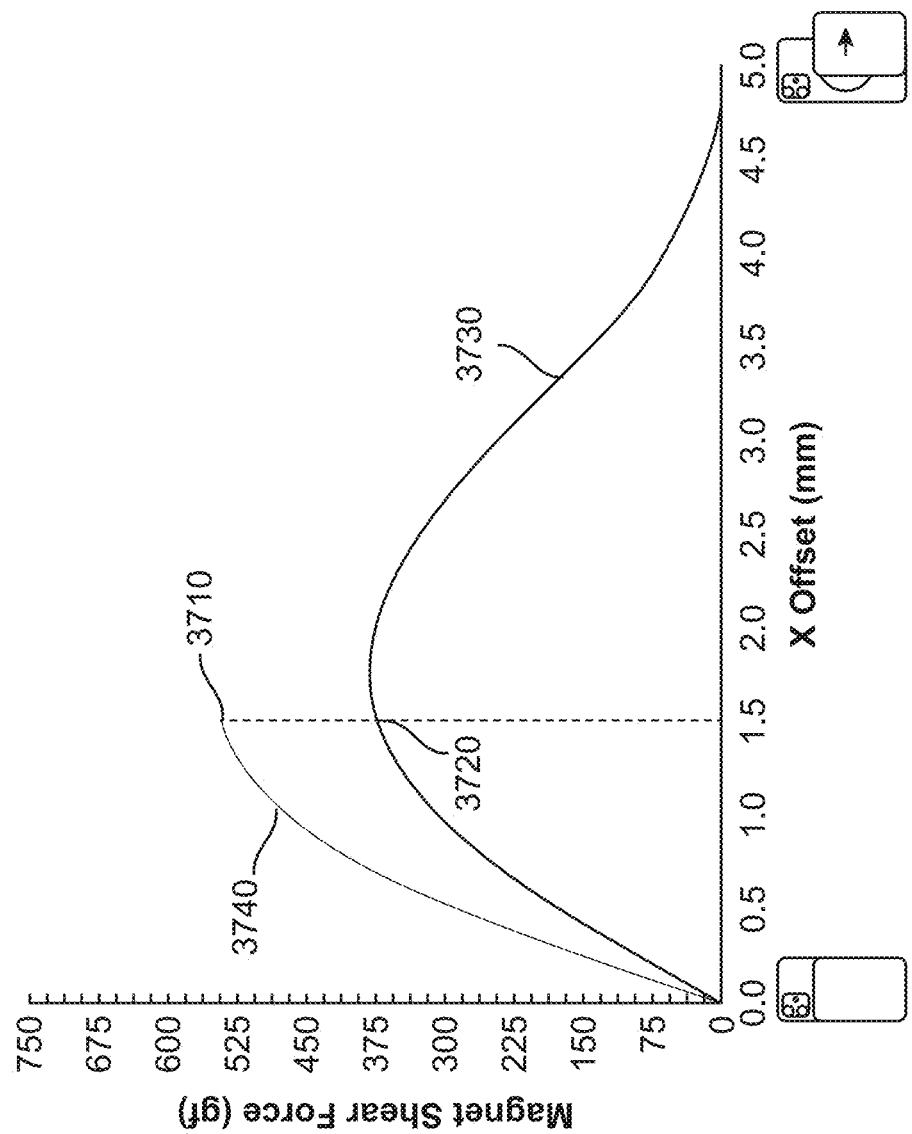
FIG. 37 illustrates a shear force between a first magnet in a first electronic device and a second magnet in a second electronic device.

FIG. 37 illustrates a sheer force between a first magnet in a first electronic device and a second magnet in a second electronic device as a function of a lateral offset between them. With no offset between first magnet 3310 and second magnet 3360, there it is no shear force to move second magnet 3370 relative to first magnet 3310, as shown in FIG.

33. As the offset is increased, the shear force, that is the force attempting to realign the magnets, can increase along curve 3740. At discontinuity 3710, first magnet 3310 and shield 3340 can return to return plate 3350 (as shown in FIGS. 33-42), thereby decreasing the magnetic shear force to point 3720. The magnetic sheer force can continue to drop off along curve 3730 as the offset increases. The difference between curve 3730 and curve 3740 can show the increase in magnetic attraction between a phone or other electronic device, such as second electronic device 3360 and an attachable wireless charging device or other accessory device, such as first electronic device 3300, that results from first magnet 3310 being able to move axially. It should also be noted that in this example first magnet 3310 does not move in a lateral direction, though in other examples it is capable of such movement. Where first magnet 3310 is capable of moving in a lateral direction, curve 3730 can remain at zero until the lateral movement of the second magnet 3370 overcomes the range of possible lateral movement of first magnet 3310.

In these and other embodiments of the present invention, it can be desirable to further increase this sheer force. Accordingly, embodiments of the present invention can provide various high friction or high stiction surfaces, suction cups, pins, or other structures to increase this sheer force. Examples are shown in the following figures.

Figure 38B:
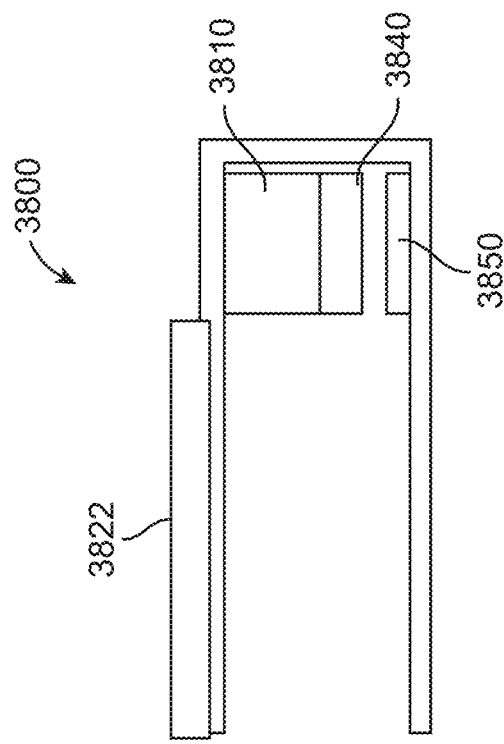
FIGS. 38A and 38B illustrate a moving magnet in conjunction with a high friction surface according to an embodiment of the present invention.
Figure 38A:
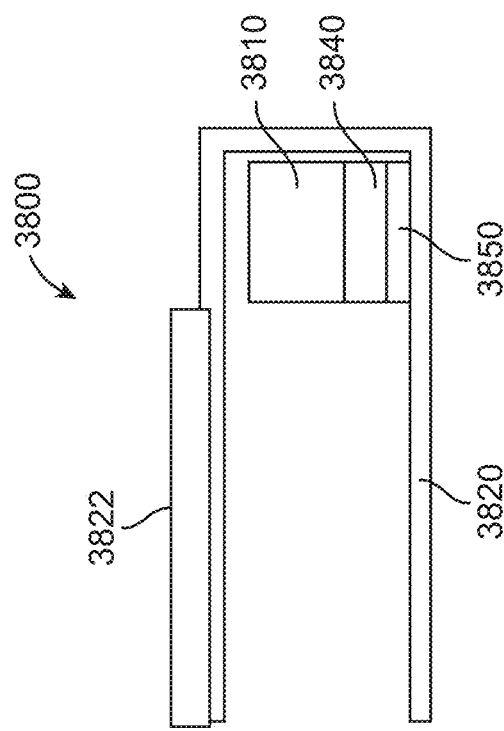

FIGS. 38A and 38B illustrate a moving magnet in conjunction with a high friction or high stiction surface according to an embodiment of the present invention. In this example, first electronic device 3800 can be a wireless charger device or other device having a first magnet 3810 (which can be, e.g., any of the annular magnetic alignment components described above). In FIG. 38A, first magnet 3810 and shield 3840 can be magnetically attracted or attached to return plate 3850 in first electronic device 3800. First electronic device 3800 can be housed in device enclosure 3820. Some or all of a surface of device enclosure 3820 can have a coating, layer, or other structure 3822. Structure 3822 can provide a high friction or high stiction surface. In FIG. 38B, first magnet 3810 and shield 3840 can be attracted to a second magnet (not shown) in a second electronic device (not shown). As before, the separation of first magnet 3810 and shield 3840 from return plate 3850 can provide an increased amount of magnetic flux to hold the second electronic device in place relative to first electronic device 3800. Structure 3822 can increase the friction or stiction between first electronic device 3800 and the second electronic device in a lateral or shear direction.

Figure 39B:
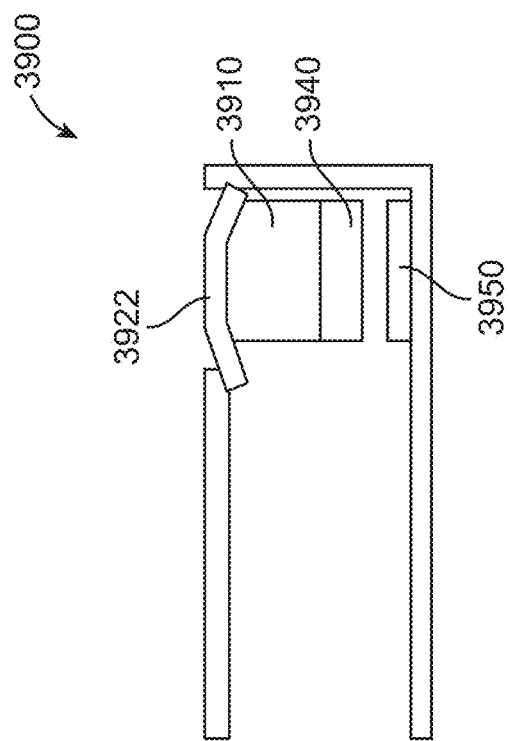
FIGS. 39A and 39B illustrate a moving magnet in conjunction with a high friction surface according to an embodiment of the present invention.
Figure 39A:
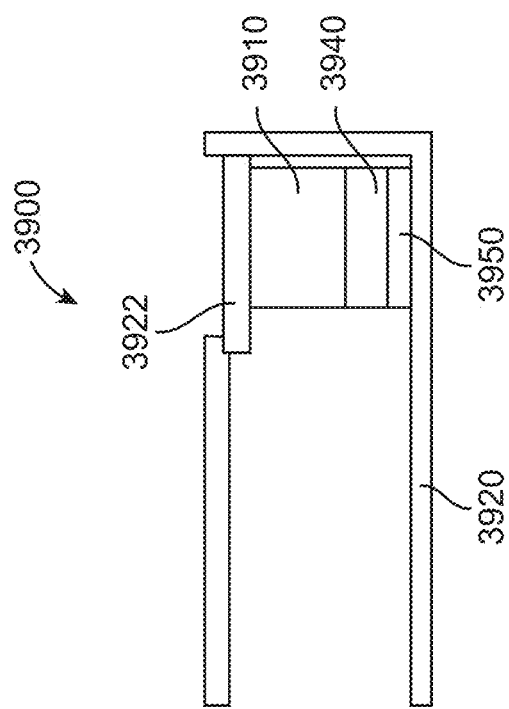

FIGS. 39A and 39B illustrate a moving magnet in conjunction with a high friction or high stiction surface according to an embodiment of the present invention. In this example, first electronic device 3900 can be a wireless charger device or other device having a first magnet 3910 (which can be, e.g., any of the annular or rotational magnetic alignment components described herein). In FIG. 39A, first magnet 3910 and shield 3940 can be magnetically attracted or attached to return plate 3950 in first electronic device 3900. First electronic device 3900 can be housed in device enclosure 3920. Some or all of a surface of device enclosure 3920 can have a coating, layer, or other structure 3922, in this example over first magnet 3910. Structure 3922 can provide a high friction or high stiction surface. In FIG. 39B, first magnet 3910 and shield 3940 can be attracted to a second magnet (not shown) in a second electronic device (not shown.) This can cause first magnet 3910 and shield 3940 to separate from return plate 3850, thereby deforming structure 3922, which can be pliable or compliant. As before, first magnet 3910 can provide an increased amount of magnetic flux to hold the second electronic device in place relative to first electronic device 3900. Structure 3922 can increase the friction or stiction between first electronic device 3900 and the second electronic device in a lateral or sheer direction.

Figure 40B:
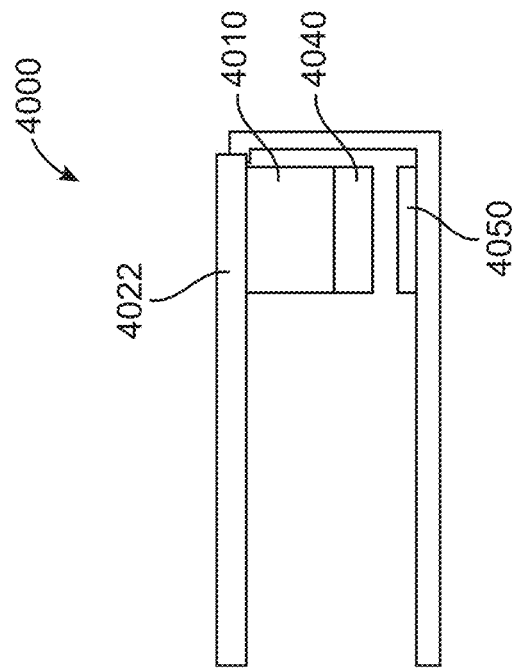
FIGS. 40A and 40B illustrate a moving magnet in conjunction with a high friction surface according to an embodiment of the present invention.
Figure 40A:
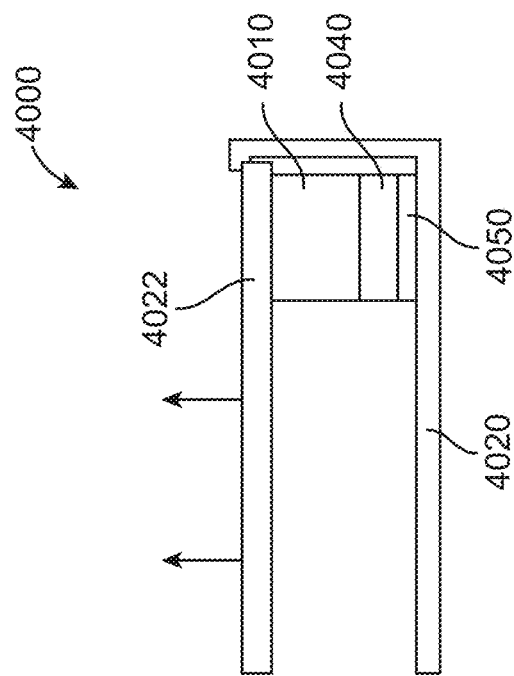

FIGS. 40A and 40B illustrate a moving magnet in conjunction with a high friction surface according to an embodiment of the present invention. In this example, first electronic device 4000 can be a wireless charger device or other device having a first magnet 4010 (which can be, e.g., any of the primary annular magnetic alignment components described above). In FIG. 40A, first magnet 4010 and shield 4040 can be magnetically attracted or attached to return plate 4050 in first electronic device 4000. First electronic device 4000 can be housed in device enclosure 4020. Some or all of a surface of device enclosure 4020 can have a coating, layer, or other structure 4022, in this example over a top surface of first electronic device 4000. Structure 4022 can provide a high friction or high stiction surface. In FIG. 40B, first magnet 4010 and shield 4040 can be attracted to a second magnet (not shown) in a second electronic device (not shown.) The separation of first magnet 4010 and shield 4040 from return plate 4050 can push the top surface formed by structure 4022 upward where it can engage the second electronic device with a high-friction surface. As before, first magnet 4010 can provide an increased amount of magnetic flux to hold the second electronic device in place relative to first electronic device 4000. Structure 4022 can increase the friction or stiction between first electronic device 4000 and the second electronic device in a lateral or sheer direction.

Figure 41B:
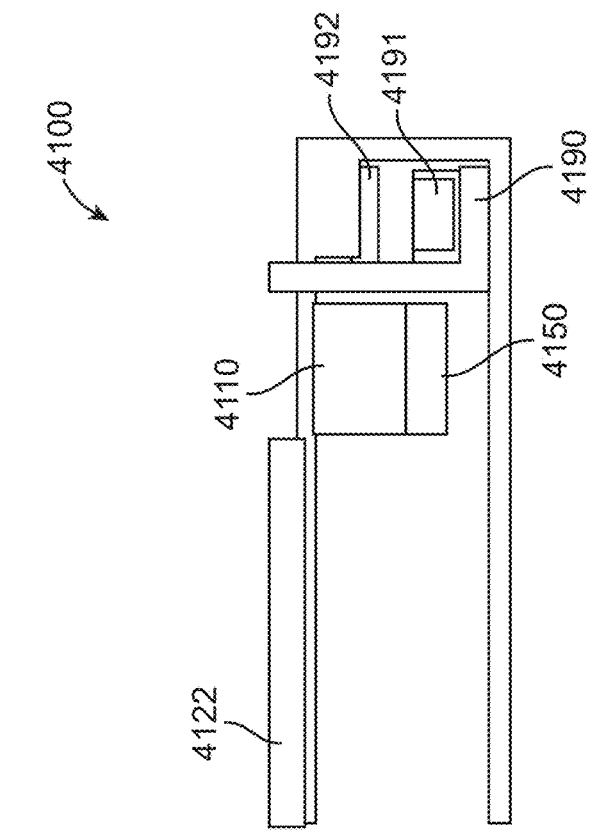
FIGS. 41A and 41B illustrate another moving magnet in conjunction with a high friction surface according to an embodiment of the present invention.
Figure 41A:
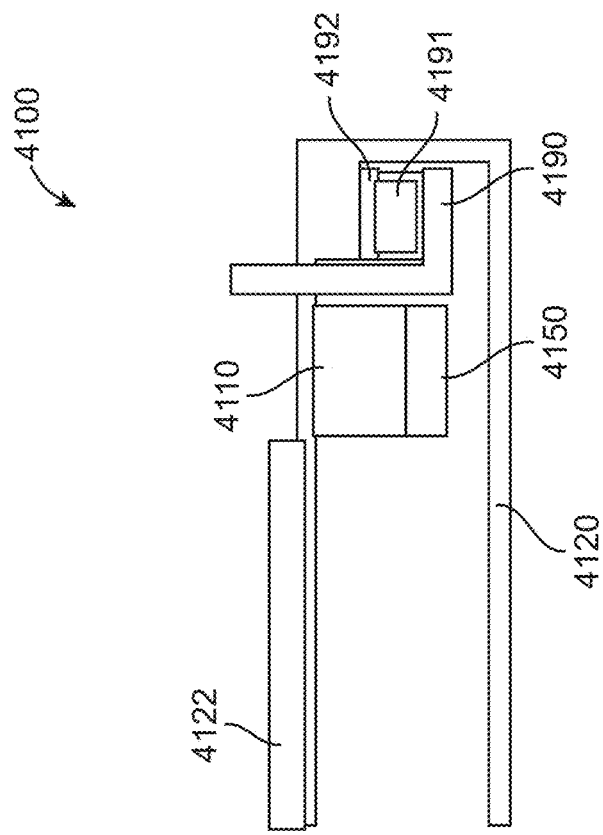

FIGS. 41A and 41B illustrate another moving magnet in conjunction with a high friction or high stiction surface according to an embodiment of the present invention. In this example, first electronic device 4100 can be a wireless charger device or other device having a first magnet 4110 (which can be, e.g., any of the annular magnetic alignment components described above). In FIG. 41A, first magnet 4110 and first shield 4150 can be fixed in place in device enclosure 4120 of first electronic device 4100. Some or all of a surface of device enclosure 4120 can have a coating, layer, or other structure 4122. Structure 4122 can provide a high friction or high stiction surface. First electronic device 4100 can further include a moving second magnet 4191 and second shield 4192, which can be attached to sliding mechanism 4190. In FIG. 41B, as a second electronic device (not shown) comes into contact with first electronic device 4100, sliding mechanism 4190 can be depressed, thereby moving second magnet 4191 away from second shield 4192 and the top surface of device enclosure 4120. The polarity of second magnet 4191 can be in opposition to, or the opposite of, the polarity of first magnet 4110, such that the net magnetic flux at a top surface of device enclosure 4120 is increased as sliding mechanism 4190 is depressed. Structure 4122 can increase the friction or stiction between first electronic device 4100 and the second electronic device in a lateral or sheer direction.

Figure 42:
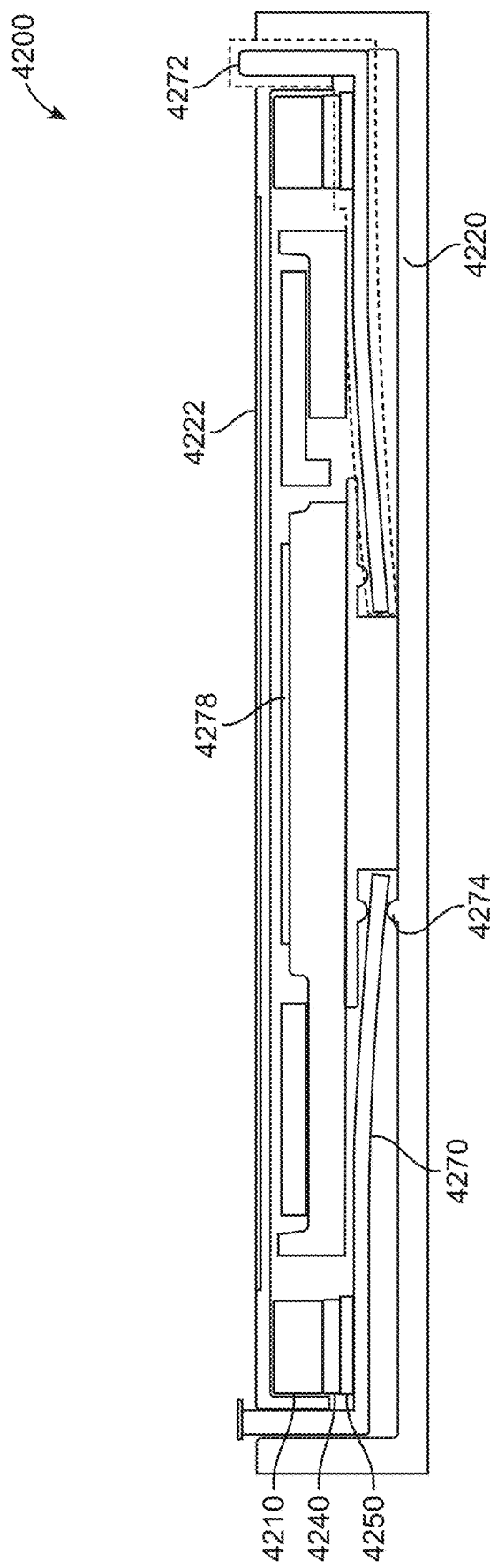
FIG. 42 illustrates a cutaway side view of another moving magnet structure according to an embodiment of the present invention.
Figure 43:
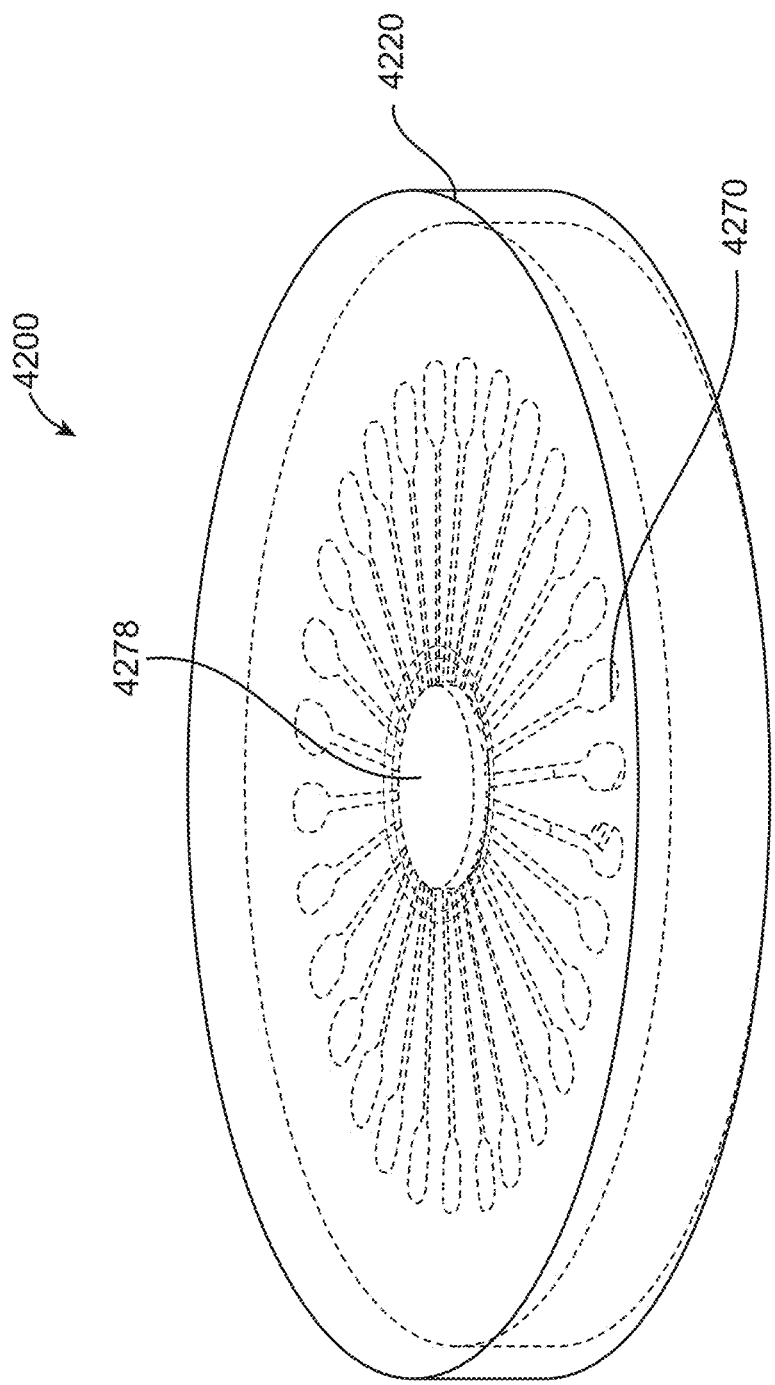
FIG. 43 is a partially transparent view of the moving magnet structure of FIG. 42.

FIG. 43 is a partially transparent view of the moving magnet structure of FIG. 42. First electronic device 4200 can be housed in device enclosure 4220. As before, first electronic device 4200 can include inductive charging, near field communication complements, or other electronic circuits for components 4278. Return plates 4250 (shown in FIG. 42) can be attached to beams 4270.

Figure 44:
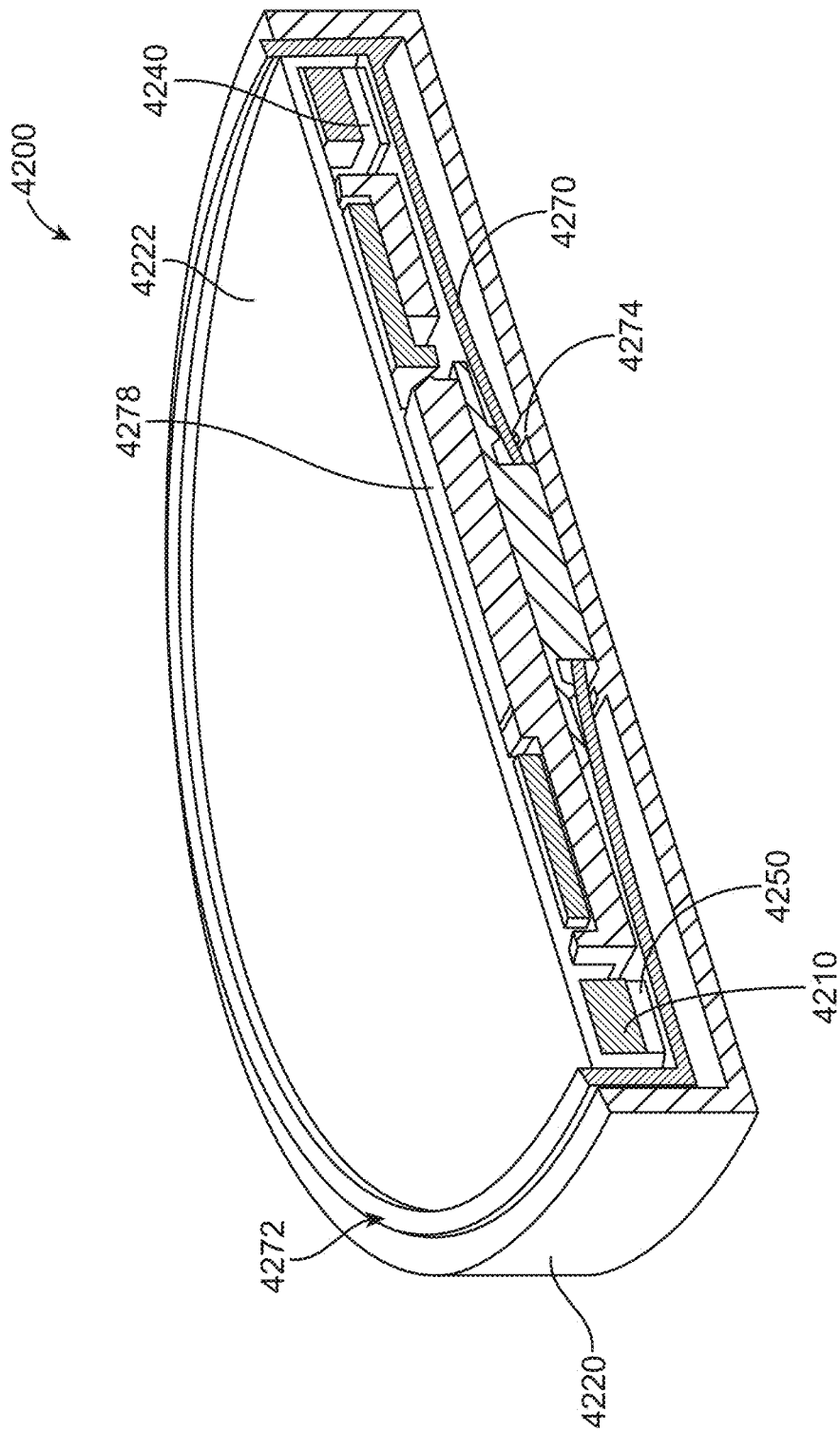
FIG. 44 is another cutaway side view of the electronic device of FIG. 42.

FIG. 44 is another cutaway side view of the electronic device of FIG. 42. First electronic device 4200 can be housed in device enclosure 4220. As before, first electronic device 4200 can include inductive charging, near field communication components, or other electronic circuits for components 4278. Return plates 4250 can be attached to beams 4270. First magnets 4210 and shield 4240 can be attracted or attached to return plate 4250. A high friction or high stiction structure 4222 can cover some or all of a top surface of first electronic device 4200. Beams 4270 can be attached to return plates 4250, can be anchored at points 4274, and can have a tip 4272 extending above top surface of device enclosure 4220.

Figure 45:
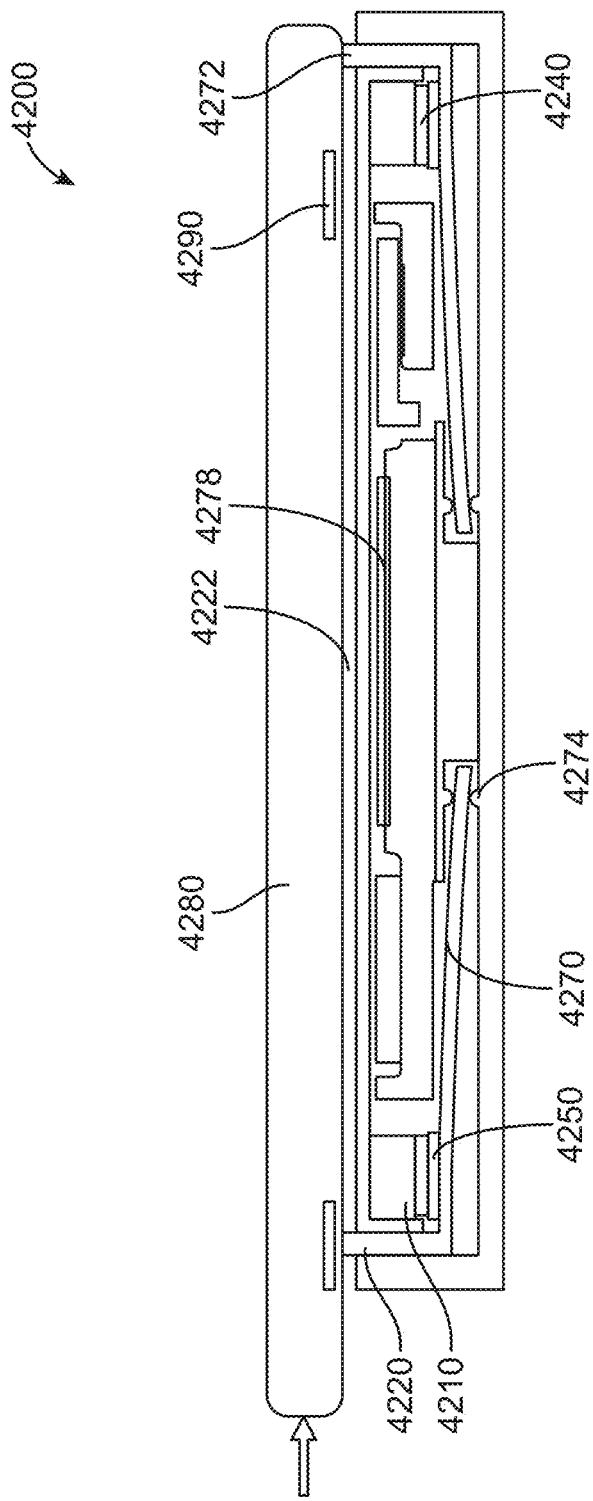
FIGS. 45 and 46 illustrate the electronic device of FIG. 42 as it engages with a second electronic device.
Figure 46:
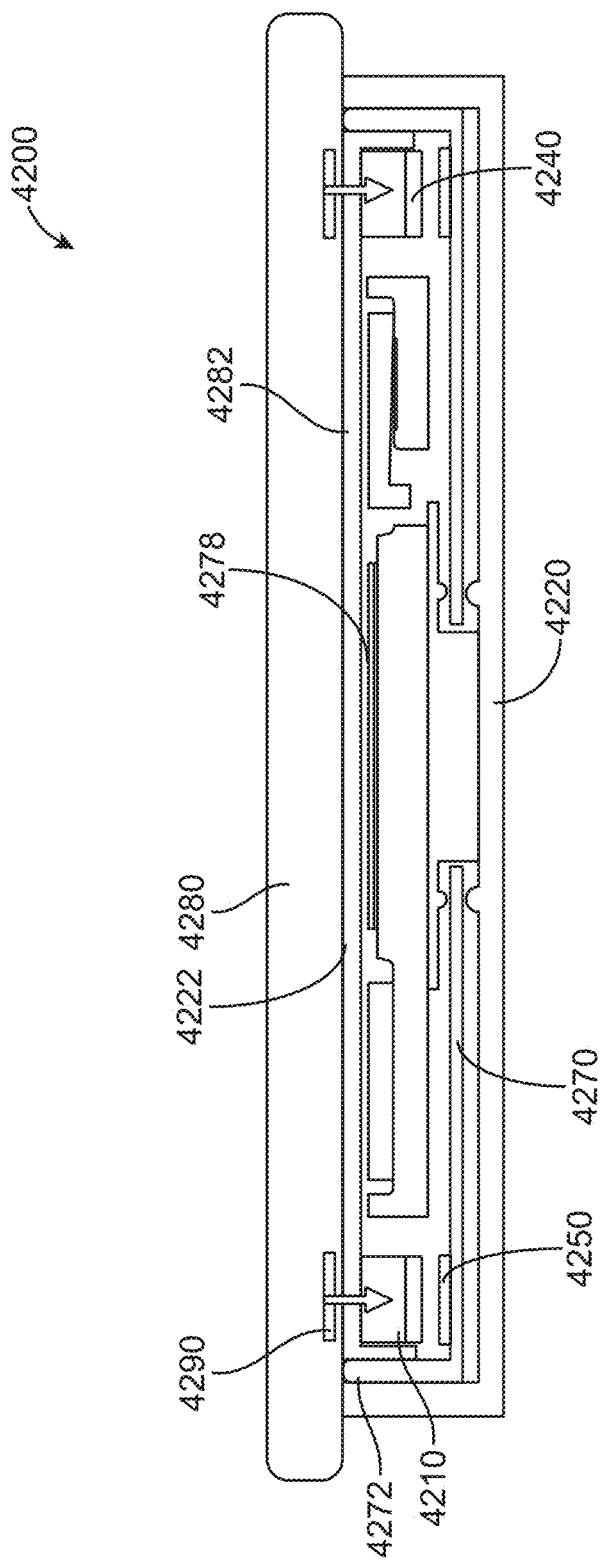

FIGS. 45 and 46 illustrate the electronic device of FIG. 42 as it engages with a second electronic device. In FIG. 45, second electronic device 4280 can include second magnets 4290. Second electronic device 4280 can engage with first electronic device 4200. First electronic device 4200 can include first magnets 4210, shields 4240, and return plates 4250. Return plates 4250 can be attached to beams 4270. Beams 4270 can include tips 4272 which can extend above a top surface of device enclosure 4220. Tips 4272 can prevent second electronic device 4280 from engaging with the high friction or high stiction structure 4222 of first electronic device 4200 until the second electronic device 4280 is aligned, or nearly aligned, with first electronic device 4200. Beams 4270 can be attached at points 4274 to device enclosure 4220. First electronic device 4200 can include components 4278.

In FIG. 46, second electronic device 4280 can be aligned with the first electronic device 4200. When this occurs, first magnets 4210 and shields 4240 can detach from return plates 4250. This can increase magnetic flux between second magnets 4290 in second electronic device 4280 and first magnets 4210 and first electronic device 4200. Tips 4272 can become depressed into device enclosure 4220 due to this increase magnetic attraction, thereby further pushing return plates 4250 away from shields 4240. High friction or high stiction structure 4222 can engage with second electronic device 4280 to increase the shear force necessary for a detachment of second electronic device 4280 from first electronic device 4200.

In these and other embodiments of the present invention, various structures can be used to constrain movement of magnets in an electronic device. Examples are shown in the following figures.

Figure 47B:
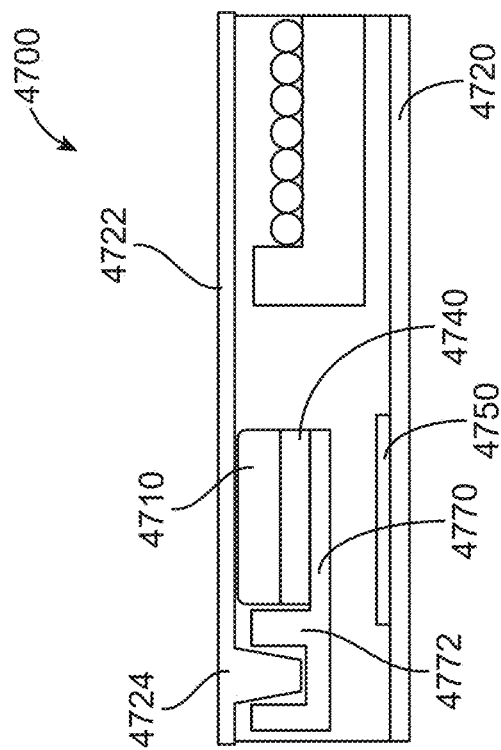
FIGS. 47A and 47B illustrate structures for constraining motions of magnets in an electronic device according to an embodiment of the present invention.
Figure 47A:
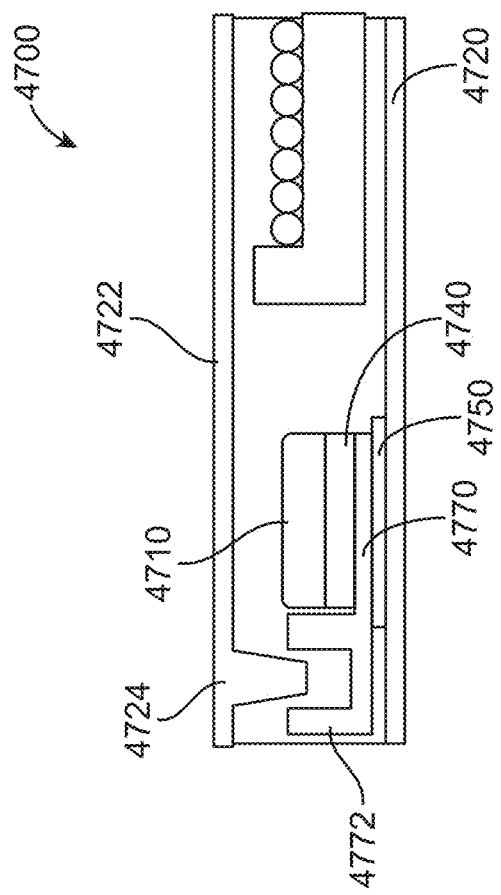

FIGS. 47A and 47B illustrate structures for constraining motions of magnets in an electronic device according to an embodiment of the present invention. In this example, first electronic device 4700 can be a wireless charger device or other device having a first magnet 4710 (which can be, e.g., any of the annular magnetic alignment components described above). In FIG. 47A, magnet 4710, shield 4740, and structure 4770 can be housed by device enclosure 4720 in electronic device 4700. Structure 4770 can include notch 4772, which can fit in tab 4724. In FIG. 47B, magnet 4710 has moved, taking along with it shield 4740 and structure 4770. Notch 4772 accepts tab 4724 as shield 4740 detaches from return plate 4750. This can constrain the motion of magnets 4710 in electronic device 4700. Electronic device 4700 can include a top device enclosure portion 4722. Tab 4724 can be formed as part of or separate from top device enclosure portion 4722.

Figure 48B:
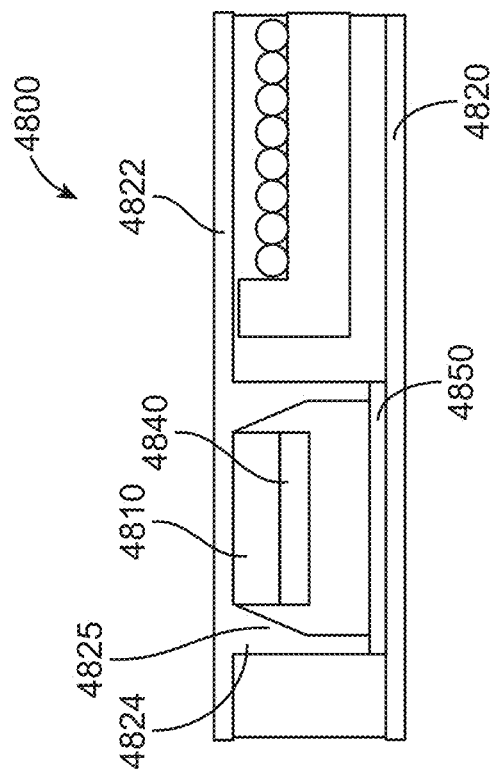
FIGS. 48A and 48B illustrate structures for constraining motions of magnets in an electronic device according to an embodiment of the present invention.
Figure 48A:
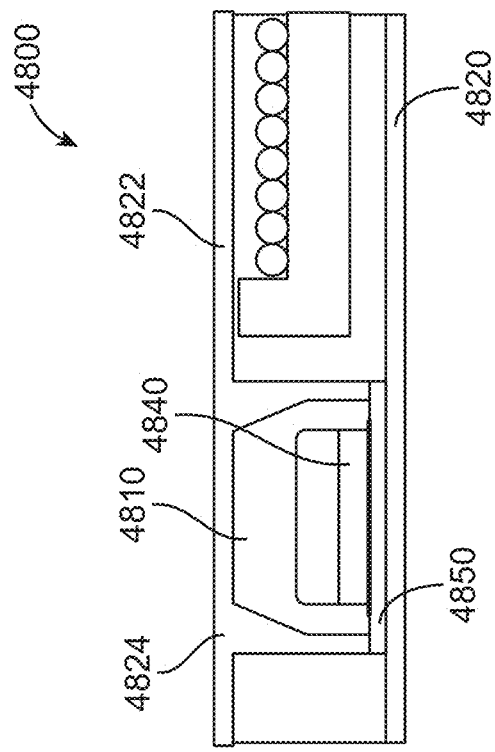

FIGS. 48A and 48B illustrate structures for constraining motions of magnets in an electronic device according to an embodiment of the present invention. In this example, first electronic device 4800 can be a wireless charger device or other device having a first magnet 4810 (which can be, e.g., any of the annular magnetic alignment components described above). In FIG. 48A, magnet 4810, shield 4840, and return plate 4850 can be housed in device enclosure 4820 of electronic device 4800. Top device enclosure portion 4822 can include guide 4824. Guide 4824 can constrain motion of magnet 4810 in electronic device 4800. In FIG. 48B, magnet 4810 and shield 4840 have detached from return plate 4850 and have been guided into position by guide 4824. Guide 4824 can include one or more chamfered edges 4825. Again, guide 4824 can be formed along with or separate from top device enclosure portion 4822 of electronic device 4800.

Figure 49B:
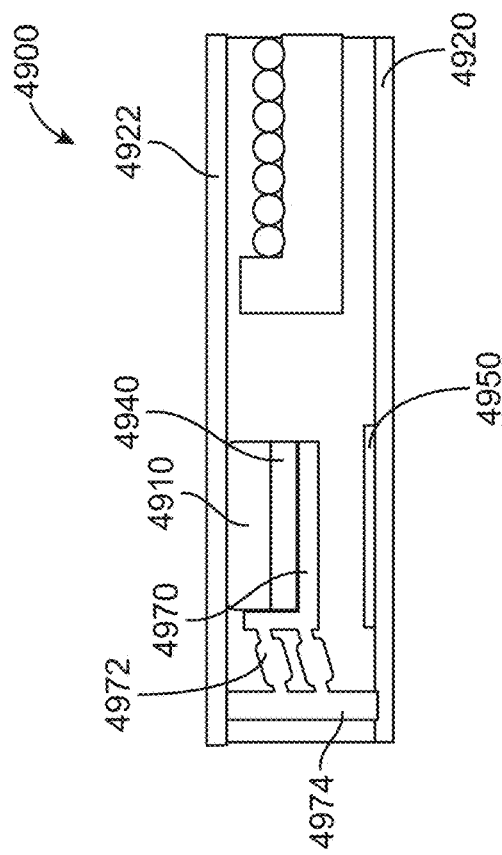
FIGS. 49A and 49B illustrate structures for constraining motions of magnets an electronic device according to an embodiment of the present invention.
Figure 49A:
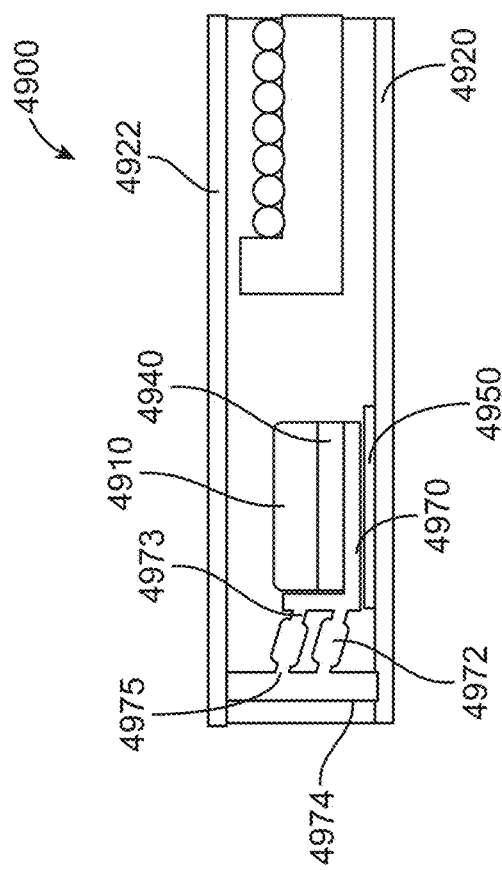

FIGS. 49A and 49B illustrate structures for constraining motions of magnets in an electronic device according to an embodiment of the present invention. In this example, first electronic device 4900 can be a wireless charger device or other device having a first magnet 3010 (which can be, e.g., any of the annular magnetic alignment components described above). In FIG. 49A, magnet 4910, shield 4940, and return plate 4950 can be housed in device enclosure 4920 of electronic device 4900. Magnet 4910 and shield 4940 can be supported by structure 4970. Structure 4970 can be attached to anchor 4974 through actuators 4972. Actuators 4972 can have hinges 4973 and 4975 at each end to allow structure 4970 to move relative to anchor 4974. Anchor 4974 can be attached to, or formed as either part of, top device enclosure portion 4922 or device enclosure 4920. In FIG. 49B, magnet 4910 and shield 4940 have detached from return plate 4950. Actuators 4972 have changed positions but continued to connect structure 4970 to anchor 4974. Anchor 4974 can be attached to, or formed as either part of, top device enclosure portion 4922 or device enclosure 4920.

5. Additional Embodiments

While the invention has been described with reference to specific embodiments, those skilled in the art will appreciate that variations and modifications are possible. For instance, although the annular alignment modules are described as being made from arcuate magnets that form sectors, it will be understood that if the magnets are sufficiently small relative to the dimensions of the annular structure, trapezoidal or square magnets can approximate the behavior of arcuate magnets. Magnetic alignment components can have any dimensions, and annular magnetic alignment components can be used with or without rotational alignment. Magnetic alignment components can be used with an inductive charging coil to facilitate alignment of the coils as described above, or a magnetic alignment component can be present in a device that does not have an inductive charging coil. Further, a portable electronic device that has a magnetic alignment component around an inductive charging coil can be charged by a wireless charger device that does not have a magnetic alignment component, and conversely, a wireless charger device that has a magnetic alignment component can be used to charge a portable electronic device that has an inductive charging coil but not a magnetic alignment component. In these situations, the magnetic alignment component may not facilitate alignment between the devices, but it need not interfere with wireless power transfer.

In addition, while a portable electronic device has been described as receiving power wirelessly, those skilled in the art will appreciate that an inductive power coil may be operable to transmit as well as receive power wirelessly, and in some embodiments a portable electronic device can be reconfigurable to operate either as a transmitter or receiver for wireless power transfer.

Further, while it is contemplated that magnetic alignment components of the kind described herein can be used to facilitate alignment between transmitter and receiver coils for wireless power transfer between devices, use of magnetic alignment components is not so limited, and magnetic alignment components can be used in a variety of contexts to hold one device in relative alignment with another, regardless of whether either or both devices have wireless charging coils. Thus, for instance, a tripod (or other type of stand), which can hold a portable electronic device in a particular positon and orientation, can include a primary annular magnetic alignment component (and a rotational alignment component) to hold the portable electronic device in place; the magnetic alignment component can be used in addition to or instead of mechanical retention features to secure the portable electronic device to the tripod.

Accordingly, ecosystems of devices are contemplated. The ecosystem can include a variety of portable electronic devices having various form factors, such as smart phones, tablets, or other devices that can operate on battery power and can receive power via wireless power transfer. The ecosystem can also include a variety of wireless charger devices such as pucks, mats, docks, or the like. The ecosystem can also include "charge-through" accessories (such as cases) that may be interposed between a portable electronic device and a wireless charger device; the charge-through accessory is designed to permit magnetic flux to pass through the interposed portion of the accessory to allow wireless charging while the accessory is present. In such an ecosystem, each portable electronic device can be manufactured to include a secondary annular magnetic alignment component (e.g., having a radial or transverse magnetic orientation as described above) having dimensions of radial width and outer diameter that are constant across the ecosystem. Each wireless charger device can be manufactured to include a primary annular magnetic alignment component complementary to the secondary annular magnetic alignment components of the portable electronic devices (e.g., having a quad-pole configuration as described above), allowing wireless charger devices to be used interchangeably with different portable electronic devices. Each charge-through accessory can be manufactured to include an auxiliary annular magnetic alignment component complementary to the primary and secondary annular magnetic alignment components, again allowing interchangeable use of wireless charger devices with different charge-through accessories (and portable electronic devices).

Such ecosystems can also include other passive accessory devices (i.e., accessory devices that do not include inductive charging coils) that may be designed to attach to a portable electronic device using magnetic alignment components but that do not support charge-through operation. Examples include tripods or other stands, attachable accessory cases that may hold credit cards or other magnetized items that may be susceptible to demagnetization during wireless power transfer, or other accessories that are intended for use with a portable electronic device that is not being charged. Such accessory devices can be manufactured to include either a secondary annular magnetic alignment component or an auxiliary annular magnetic alignment component and may or may not include a rotational alignment component.

Such ecosystems can also include a "retrofitting" accessory device that may be used to provide magnetic alignment capability for a portable electronic device that was originally manufactured without a magnetic alignment component. A retrofitting accessory can have one or more mechanical retention features (e.g., sides and lips of a case shaped as a tray) that hold the smart phone (or other portable electronic device) in a fixed relative alignment with the housing of the accessory. The accessory can include a secondary magnetic alignment component (matching the specifications of the secondary alignment component for the ecosystem), and the secondary magnetic alignment component can be positioned in the retrofitting accessory so that when the portable electronic device is held in place by the mechanical retention feature(s), the inductive charging coil is centered within the secondary magnetic alignment component. Such an accessory can allow a portable electronic device that was manufactured without a magnetic alignment component to enjoy the benefits of magnetic alignment when used with devices in the magnetic alignment ecosystem.

It should be understood that, within a given ecosystem, any or all of the devices that include annular alignment components may also include rotational alignment components as described above. For instance, within an ecosystem, all portable electronic devices having a secondary annular alignment component that are large enough to accommodate a rotational alignment component outboard of the secondary annular alignment component can have a rotational alignment component. Devices having a primary alignment component or auxiliary alignment component might or might not have a rotational alignment component, depending on form factor and intended use.

It should also be understood that some devices may include multiple annular alignment components. For instance, a wireless charger device may be designed with two or more separate wireless charging coils spaced apart from each other to allow multiple portable electronic devices to be charged at the same time. Each wireless charging coil can have a surrounding primary annular alignment component, and each primary alignment component can have an associated rotational alignment component.

In some embodiments, an alignment module that includes an annular alignment component can be packaged for easy installation into an accessory device, wireless charger device, or portable electronic device. For example, an alignment module can include a primary, secondary, or auxiliary annular magnetic alignment component as described above in an enclosing structure (or housing) that protects the magnets and holds them in position In some embodiments, a rotational magnetic alignment component can be included along with the annular magnetic alignment component. The enclosing structure can be, for instance, a plastic structure, at least part of which can be transparent. As another example, the alignment module can include a wireless charging coil (e.g., a transmitter coil) centered within the annular alignment component. The enclosing structure can provide exposed electrical contacts for making electrical connections to the wireless charging coil. Such alignment modules can be made by one entity and sold to a different entity to incorporate into devices such as cases, wireless charging docks, or the like.

Various features described herein related to detection of devices and exchange of information can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa. Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium). Further, in regard to any collection or exchange of information or data by or between devices, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the invention include but are not limited to any of the following.

In some embodiments, an electronic device (e.g., a portable electronic device) can comprise: a housing having an interface surface; an inductive coil disposed within the housing and having an axis normal to the interface surface, the inductive coil being configured to transfer power wirelessly through the interface surface; and an annular magnetic alignment component disposed within the housing coaxial with and outboard of the inductive coil. The annular magnetic alignment component can have a magnetic orientation in a radial direction. The annular magnetic alignment component can comprise a plurality of arcuate magnets, and each of the arcuate magnets can have a magnetic polarity that is oriented in a radially inward (or radially outward) direction. The annular magnetic alignment component can include a gap, and an electrically conductive path connected to the inductive coil can pass through the gap. The annular magnetic alignment component can include a first gap and a second gap on opposite sides of the annular magnetic alignment component. A battery can be disposed within the housing, and the inductive coil can be coupled to the battery. The inductive coil can be configured to receive and/or transmit power wirelessly through the interface surface.

In some embodiments, an electronic device (e.g., a wireless charger device) can comprise: a housing having a charging surface; an inductive coil disposed within the housing and having an axis normal to the charging surface, the inductive coil being configured to transfer power wirelessly through the charging surface; and an annular magnetic alignment component disposed within the housing coaxial with and outboard of the inductive coil. The annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. The annular magnetic alignment component can comprise a plurality of arcuate magnets, and each arcuate magnet can have a first region with a magnetic polarity oriented in the first axial direction, a second region with a magnetic polarity oriented in the second axial direction, and a non-magnetized region between the first region and the second region. The annular magnetic alignment component can include a gap, and an electrically conductive path connected to the inductive coil can pass through the gap. The inductive coil can be configured to transmit and/or receive power wirelessly through the charging surface.

In some embodiments, an accessory for use with a portable electronic device can comprise: a housing having a first interface surface and a second interface surface opposite the first interface surface; an annular magnetic alignment component disposed within the housing and having an axis normal to the first interface surface and the second interface surface. The annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. The annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region. The annular magnetic alignment component can include a gap. The annular magnetic alignment component can include a first gap and a second gap on opposite sides of the annular magnetic alignment component.

In some embodiments, a magnetic alignment system can comprise: a primary alignment component formed of a plurality of primary arcuate magnets arranged in an annular configuration defining an axis and a secondary alignment component formed of a plurality of secondary arcuate magnets arranged in an annular configuration. Each primary arcuate magnet can comprise: a primary inner arcuate magnetic region having a magnetic orientation in a first direction along the axis; a primary outer arcuate magnetic region having a magnetic orientation in a second direction opposite the first direction; and a non-magnetized primary central arcuate region disposed between the primary inner arcuate region and the primary outer arcuate region. Each secondary arcuate magnet having a magnetic orientation that is in a radial direction with respect to a center of the secondary alignment component. The primary alignment component can be disposed in a first electronic device surrounding a first inductive charging coil, and the secondary alignment component can be disposed in a second electronic device surrounding a second inductive charging coil; when the primary alignment component and the secondary alignment component are aligned along a common axis, the first inductive charging coil and the second inductive charging coil can be also aligned along the common axis.

In some embodiments, an electronic device (e.g., a portable electronic device) can comprise: a housing having an interface surface; an inductive coil disposed within the housing and having an axis normal to the interface surface, the inductive coil being configured to transfer power wirelessly through the interface surface; an annular magnetic alignment component disposed within the housing coaxial with and outboard of the inductive coil, the annular magnetic alignment component having a magnetic orientation in a radial direction; and a rotational alignment component comprising a magnet disposed outside an outer perimeter of the annular magnetic alignment component. The rotational alignment component can comprises a magnet having at least two different regions of opposing magnetic orientations. In these and other embodiments, the magnet can have a rectangular shape in a plane transverse to an axis defined by the annular magnetic alignment component. For example, the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets, each having a magnetic polarity that is oriented in a radially inward direction. In these and other embodiments, a battery can be disposed within the housing, and the inductive coil can be coupled to the battery. In these and other embodiments, the inductive coil can be configured to receive and/or transmit power wirelessly through the interface surface.

In some embodiments, an electronic device (e.g., a wireless charger device) can comprise: a housing having a charging surface; an inductive coil disposed within the housing and having an axis normal to the charging surface, the inductive coil being configured to transfer power wirelessly through the charging surface; an annular magnetic alignment component disposed within the housing coaxial with and outboard of the inductive coil; and a rotational alignment component comprising a magnet disposed outside a perimeter of the annular magnetic alignment component. In these and other embodiments, the annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the rotational alignment component can comprise a magnet having at least two different regions of opposing magnetic orientations. For example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region. In these and other embodiments, the inductive coil can be configured to transmit power wirelessly through the charging surface.

In some embodiments, an accessory for use with a portable electronic device can comprise: a housing having a first interface surface and a second interface surface opposite the first interface surface; an annular magnetic alignment component disposed within the housing and having an axis normal to the first interface surface and the second interface surface; and a rotational alignment component comprising a magnet disposed outside a perimeter of the annular magnetic alignment component. In these and other embodiments, the annular magnetic alignment component can comprise: an inner arcuate region having a magnetic polarity oriented in a first axial direction; an outer arcuate region having a magnetic polarity oriented in a second axial direction opposite the first axial direction; and a non-magnetized central arcuate region disposed between the inner arcuate region and the outer arcuate region. In these and other embodiments, the rotational alignment component comprises a magnet having at least two different regions of opposing magnetic orientations. For example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; and a second region extending along a second long side of the rectangular shape and having a second magnetic orientation opposite the first magnetic orientation. As another example, the magnet can have a rectangular shape in a plane transverse to an axis defined by the annular magnetic alignment component, and the at least two different regions of opposing magnetic orientations can include: a first region extending along a first long side of the rectangular shape and having a first magnetic orientation; a second region extending along a second long side of the rectangular shape and having the first magnetic orientation; and a third region extending along the rectangular shape and positioned midway between the first region and the second region, the third region having a second magnetic orientation opposite the first magnetic orientation. In these and other embodiments, the annular magnetic alignment component can comprise a plurality of arcuate magnets. Each arcuate magnet can have a first region with a magnetic polarity oriented in the first axial direction, a second region with a magnetic polarity oriented in the second axial direction, and a non-magnetized region between the first region and the second region.

Accordingly, although the invention has been described with respect to specific embodiments, it will be appreciated that the invention is intended to cover all modifications and equivalents within the scope of the following claims.

What is claimed is:

1. An accessory device comprising:
   a housing having a first interface surface; and
   an annular magnetic alignment component disposed within the housing and having an axis normal to the first interface surface, the annular magnetic alignment component including:

an inner annular region having a magnetic polarity oriented in a first axial direction;
an outer annular region having a magnetic polarity oriented in a second axial direction opposite the first axial direction; and
a non-magnetized central annular region disposed between the inner annular region and the outer annular region,
wherein a region inboard of the annular magnetic alignment component is filled with a material that is transparent to a time-varying magnetic flux passing through the first interface surface.

2. The accessory device of claim 1 wherein the housing of the accessory is shaped as a protective case for an active electronic device and wherein the annular magnetic alignment component is positioned such that, when the active electronic device is placed in the protective case, the region inboard of the annular magnetic alignment component aligns with an inductive charging coil of the active electronic device.

3. The accessory device of claim 1 wherein the housing of the accessory has a second interface surface parallel to the first interface surface and wherein the annular magnetic alignment component is positioned to align along the axial direction with a first inductive charging coil of a first electronic device placed adjacent to the first interface surface and with a second inductive charging coil of a second electronic device placed adjacent to the second interface surface.

4. The accessory device of claim 1 further comprising:
a rotational alignment component comprising an additional magnet disposed within the housing outside a perimeter of the annular magnetic alignment component.

5. The accessory device of claim 4 wherein the additional magnet has at least two different regions of opposing magnetic orientations.

6. The accessory device of claim 5 wherein the additional magnet has a rectangular shape in a plane transverse to the axis and wherein the at least two different regions of opposing magnetic orientations include:
a first region extending along a first long side of the rectangular shape and having a first magnetic orientation; and
a second region extending along a second long side of the rectangular shape and having a second magnetic orientation opposite the first magnetic orientation.

7. The accessory device of claim 5 wherein the additional magnet has a rectangular shape in a plane transverse to the axis and wherein the at least two different regions of opposing magnetic orientations include:
a first region extending along a first long side of the rectangular shape and having a first magnetic orientation;
a second region extending along a second long side of the rectangular shape and having the first magnetic orientation; and
a third region extending along the rectangular shape and positioned midway between the first region and the second region, the third region having a second magnetic orientation opposite the first magnetic orientation.

8. An accessory device comprising:
a housing having a first interface surface and a second interface surface opposite the first interface surface;
an annular magnetic alignment component disposed within the housing and having an axis normal to the first interface surface and the second interface surface, the annular magnetic alignment component including:
an inner annular region having a magnetic polarity oriented in a first axial direction;
an outer annular region having a magnetic polarity oriented in a second axial direction opposite the first axial direction; and
a non-magnetized central annular region disposed between the inner annular region and the outer annular region; and
a block of magnetic material positioned inboard of the annular magnetic alignment component to guide an externally-produced time-varying magnetic flux between the first interface surface and the second interface surface.

9. The accessory device of claim 8 wherein the housing of the accessory is shaped to hold an active electronic device and wherein the annular magnetic alignment component is positioned such that, when the active electronic device is held by the housing, the block of magnetic material positioned inboard of the annular magnetic alignment component aligns with an inductive charging coil of the active electronic device.

10. The accessory device of claim 8 wherein the second interface surface is parallel to the first interface surface and wherein the annular magnetic alignment component is positioned to align along the axial direction with a first inductive charging coil of a first electronic device placed adjacent to the first interface surface and with a second inductive charging coil of a second electronic device placed adjacent to the second interface surface.

11. The accessory device of claim 8 further comprising:
a rotational alignment component comprising an additional magnet disposed within the housing outside a perimeter of the annular magnetic alignment component.

12. The accessory device of claim 11 wherein the additional magnet has at least two different regions of opposing magnetic orientations.

13. The accessory device of claim 12 wherein the additional magnet has a rectangular shape in a plane transverse to the axis and wherein the at least two different regions of opposing magnetic orientations include:
a first region extending along a first long side of the rectangular shape and having a first magnetic orientation; and
a second region extending along a second long side of the rectangular shape and having a second magnetic orientation opposite the first magnetic orientation.

14. The accessory device of claim 12 wherein the additional magnet has a rectangular shape in a plane transverse to the axis and wherein the at least two different regions of opposing magnetic orientations include:
a first region extending along a first long side of the rectangular shape and having a first magnetic orientation;
a second region extending along a second long side of the rectangular shape and having the first magnetic orientation; and
a third region extending along the rectangular shape and positioned midway between the first region and the second region, the third region having a second magnetic orientation opposite the first magnetic orientation.

15. An accessory device comprising:
a housing having a first interface surface and a second interface surface opposite the first interface surface;

an annular magnetic alignment component disposed within the housing and having an axis normal to the first interface surface and the second interface surface, the annular magnetic alignment component including:
  an inner annular region having a magnetic polarity oriented in a first axial direction;
  an outer annular region having a magnetic polarity oriented in a second axial direction opposite the first axial direction; and
  a non-magnetized central annular region disposed between the inner annular region and the outer annular region;
a first inductive coil inboard of and coaxial with the annular magnetic alignment component and proximate to the first interface surface; and
a second inductive coil inboard of and coaxial with the annular magnetic alignment component and proximate to the second interface surface, the second inductive coil axially spaced apart from and electrically coupled to the first inductive coil.

16. The accessory device of claim 15 further comprising:
a rotational alignment component comprising an additional magnet disposed within the housing outside a perimeter of the annular magnetic alignment component.

17. The accessory device of claim 16 wherein the additional magnet has at least two different regions of opposing magnetic orientations.

18. The accessory device of claim 17 wherein the additional magnet has a rectangular shape in a plane transverse to the axis and wherein the at least two different regions of opposing magnetic orientations include:
  a first region extending along a first long side of the rectangular shape and having a first magnetic orientation; and
  a second region extending along a second long side of the rectangular shape and having a second magnetic orientation opposite the first magnetic orientation.

19. The accessory device of claim 17 wherein the additional magnet has a rectangular shape in a plane transverse to the axis and wherein the at least two different regions of opposing magnetic orientations include:
  a first region extending along a first long side of the rectangular shape and having a first magnetic orientation;
  a second region extending along a second long side of the rectangular shape and having the first magnetic orientation; and
  a third region extending along the rectangular shape and positioned midway between the first region and the second region, the third region having a second magnetic orientation opposite the first magnetic orientation.

20. The accessory device of claim 15 wherein the annular magnetic alignment component is positioned to align the first inductive charging coil with a transmitter coil of a first electronic device placed adjacent to the first interface surface and with a receiver coil of a second electronic device placed adjacent to the second interface surface.

* * * * *